(12) United States Patent
Abi-Antoun et al.

(10) Patent No.: US 8,584,099 B1
(45) Date of Patent: Nov. 12, 2013

(54) APPARATUSES AND METHODS FOR PRODUCING RUNTIME ARCHITECTURES OF COMPUTER PROGRAM MODULES

(75) Inventors: Marwan Elia Abi-Antoun, Pittsburgh, PA (US); Jonathan Erik Aldrich, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 1312 days.

(21) Appl. No.: 12/215,476

(22) Filed: Jun. 27, 2008

Related U.S. Application Data

(60) Provisional application No. 60/937,704, filed on Jun. 29, 2007.

(51) Int. Cl.
*G06F 9/45* (2006.01)

(52) U.S. Cl.
USPC ............................ 717/131; 717/132; 717/133

(58) Field of Classification Search
USPC .......................................... 717/131, 132, 133
See application file for complete search history.

(56) References Cited

U.S. PATENT DOCUMENTS

| | | | |
|---|---|---|---|
| 7,613,594 B2 * | 11/2009 | Lechine ............................ | 703/1 |
| 2007/0016894 A1 * | 1/2007 | Sreedhar ...................... | 717/131 |
| 2009/0319993 A1 * | 12/2009 | Denver et al. ................. | 717/121 |

OTHER PUBLICATIONS

Aldrich, Jonathan et al., "Arch Java: Connecting Software Architecture to Implementation", ICSE'02, May 19-25, 2002, pp. 187-197.
Schaefer, Jan et al., "Linking Programs to Architectures: An Object-Oriented Hierarchical Software Model base on Boxes", The Common Component Modeling Example: Comparing Software Component Models, LNCS, 2007, Springer.
Sefika, Mohlalefi et al., "Architecture-oriented visualization", OOPSLA 1996, pp. 389-405.
Flanagan, Cormac et al., "Dynamic Architecture Extraction", FATES/RV 2006, pp. 1-15.
Schmerl, Bradley, et al., "Discovering architectures from running systems", IEEE Transactions on Software Engineering, vol. 32, No. 7, Jul. 2006, pp. 454-466.
Abi-Antoun, Marwan et al., "Ownership domains in the real world", International Workshop on Aliasing, Confinement and Ownership in object oriented programming (JWACO) 2007, pp. 1-12.
O'Callahan, Robert, "Generalized Aliasing as a Basis for Program Analysis Tools", PhD thesis, CMU, 2001, pp. 1-294.
Jackson, Daniel, "Lightweight Extraction of Object Models from Bytecode", IEEE Transactions on Software Engineering, vol. 27, No. 2, Feb. 2001, pp. 156-169.
Spiegel, Andre, "Automatic Distribution of Object-Oriented Programs", PhD thesis, FU Berlin, 2002, pp. 1-128.

(Continued)

*Primary Examiner* — Li B Zhen
*Assistant Examiner* — Viva Miller
(74) *Attorney, Agent, or Firm* — Fox Rothschild LLP; Dennis M. Carleton

(57) ABSTRACT

Apparatuses and methods for producing run-time architectures of computer program modules. One embodiment includes creating an abstract graph from the computer program module and from containment information corresponding to the computer program module, wherein the abstract graph has nodes including types and objects, and wherein the abstract graph relates an object to a type, and wherein for a specific object the abstract graph relates the specific object to a type containing the specific object; and creating a runtime graph from the abstract graph, wherein the runtime graph is a representation of the true runtime object graph, wherein the runtime graph represents containment information such that, for a specific object, the runtime graph relates the specific object to another object that contains the specific object.

22 Claims, 49 Drawing Sheets

(56) References Cited

OTHER PUBLICATIONS

Lam, Patrick, et al., "A Type System and analysis for the automatic extraction and enforcement of design information", ECOOP 2003, LNCS 2743, pp. 275-302, 2003.
Bokowski, Boris, "Confined Types", OOPSLA, 1999, pp. 82-96.
Clarke, David G. et al., "Ownership Types for Flexible Alias Protection", OOPSLA 1998, pp. 48-64.
Boyapati, Chandrasekhar, et al., "Ownership Types for Object Encapsulation", POPL, 2003, pp. 213-223.
Abi-Antoun, Marwan, et al., "Compile-Time Views of Execution Structure Based on Ownership", International Workshop on Aliasing, Confinement and Ownership in object-oriented programming, IWACO (2007), pp. 1-12.
Fuhrer, Robert et al., "Efficiently Refactoring Java Applications to Use Generic Libraries", ECOOP 2005, LNCS 3586, pp. 71-96, 2005.
Bacon, David F. et al., "Fast Static Analysis of C++ Virtual Function Calls", OOPSLA 1996, pp. 324-341.
Abi-Antoun, Marwan, et al., "Differencing and merging of architectural views", Proceeding of the 21st IEEE International Conference on Automated Software Engineering, pp. 47-58 (2007).
Abi-Antoun, Marwan, et al., "Checking and Measuring the Architectural Structural Conformance of Object-Oriented Systems", CMU-ISRI-07-119, 2007, pp. 1-49.
McCamant, Stephen et al., "Early Identification of Incompatibilities in Multi-component Upgrades", ECOOP, 2004, pp. 1-25.
Flanagan, Cormac, et al., "Extended Static Checking for Java", PLDI, Jun. 17-19, 2002, pp. 234-245.
Gansner, Emden R., et al., "An open graph visualization system and its applications to software engineering", Softw. Pract. Exper. 00(SI), 1-5 (1999), pp. 1-29.
Gamma, Erich, "Advanced Design with Patterns and Java", JAOO 1998, pp. 1-67.
Ma, Kin-Keung, et al., "Inferring Aliasing and Encapsulation Properties for Java", OOPSLA, Oct. 21-25, 2007, pp. 423-440.
Lu, Yi, et al., "Validity Invariants and Effects", ECOOP 2007, LNCS 4609, pp. 202 226, 2007.
Abi-Antoun, Marwan, et al., "A case study in re-engineering to enforce architectural control flow and data sharing", Proceedings of the 5th Working, IEEE/IFIP Conference on Software Architecture (WICSA) Pittsburgh, PA 2005, pp. 159-168.
Rayside, Derek, et al., "An analysis and visualization for revealing object sharing", Eclipse, Oct. 16-17, 2005, pp. 11-15.
Bowman, Ivan T., et al., "Linux as a Case Study: Its Extracted Software Architecture", ICSE 1999, pp. 555-563.
Richner, Tamar et al., "Recovering High-Level Views of Object-Oriented Applications from Static and Dynamic Information", ICSM, 1999.
Kazman, Rick et al., "Playing Detective: Reconstructing Software Architecture from Available Evidence", Automated Software Engineering 6, pp. 107-138 (1999).
Liu, Yin, et al., "Ownership and Immutability Inference for UML-based Object Access Control", ICSE 2007.
Murphy, Gail C., et al., "Software Reflexion Models: Bridging the Gap between Design and Implementation", IEEE Transactions on Software Engineering, vol. 27, No. 4, Apr. 2001, pp. 364-380.
Depauw, Wim et al., "Visualizing the Execution of Java Programs", Software Visualization, 2002.
Rayside, Derek et al., "A Dynamic Analysis for Revealing Object Ownership and Sharing", WODA, May 23, 2006, pp. 57-63.
Mitchell, Nick, "The Runtime Structure of Object Ownership", ECOOP 006, LNCS 4067, pp. 74-98, 2006.
Aldrich, Jonathan, et al., "Alias Annotations for Program Understanding", OOPSLA, Nov. 4-8, 2002, pp. 311-330.
Riehle, Dirk, "Framework Design: A Role Modeling Approach", PhD thesis, 2000.
Garlan, D., et al., "Acme: Architectural Description of Component-Based Systems", Leavens, G.T., and Sitaraman, M., Eds., Cambridge University Press, 2000, pp. 47-67.
Sangal, N. et al., Using Dependency Models to Manage Complex Software Architecture, OOPSLA, Oct. 16-20, 2005.
Medvidovic, N. et al., A Classification and Comparison Framework for Software Architecture Description Languages, IEEE TSE 26(1), 2000.
Aldrich, J. et al., Ownership Domains: Separating Aliasing Policy from Mechanism, In ECOOP, 2004.
Kaiser, W. et al., Become a Programming Picasso with JHotDraw, Javaworld 2001.
Magee, J. et al., Dynamic Structure in Software Architectures, In FSE, 1996.
Hill, T. et al., Scalable Visualizations of Object-Orientated Systems with Ownership Trees, Journal of Visual Languages & Computing, vol. 13(3): 319-39, Jun. 2002.
Oreizy, P. et al., Architecture-Based Runtime Software Evolution, Software Engineering, Proceedings of the 1998 International Conference, Apr. 19-25, 1998, p. 177-86.

\* cited by examiner

```
class DataAccess<PENV> /* PENV is a formal domain parameter */ {
    domain STATE; /* STATE is a private domain */

STATE Integer int1;
    STATE Number num1;

/* Nested PENV annotation is for the ArrayList elements */
    PENV ArrayList<PENV Integer> v2;
} class UnitTest {
    domain DATA, ENV; /* ENV and DATA are top-level domains */

DATA DataAccess<ENV> dataAccess;

static void main(lent String[shared] args) {
        lent UnitTest test = new UnitTest();
    }
}
``` d T o: declare object o of type T in domain d;
[public] domain a: declare private [or public] domain;
class C<d>: declare formal domain parameter d on class C;
C<actual> cObj: provide actual for domain parameter;
link b -> d: give domain b access to domain d;
Special Annotations. A few special annotations add expressiveness to the type system [?]:
- unique: indicates an object to which there is only one reference, such as newly created objects. Unique objects can be passed linearly from one object to another;
- lent: one ownership domain can temporarily lend an object to another domain and ensure that the second domain does not create persistent references to the object;
- shared: the object may be aliased globally. shared references may not alias non-shared references.

Fig. 4a $h \in$ AbstractGraph ::= (RootObject = $o$; AbstractTypes = $\{t\ldots\}$).

$t \in$ AbstractType ::= (Id = $t_{id}$, Domains = $\{d\ldots\}$, Edges = $\{e\ldots\}$, Links = $\{s\ldots\}$)

$d \in$ AbstractDomain ::= (Id = $d_{id}$; Objects = $\{o\ldots\}$; DeclaringType = $t_{id}$)

$o \in$ AbstractObject ::= (Id = $o_{id}$, Domain = $d_{id}$, DeclaredType = $t_{id}$, Bindings = $\{b\ldots\}$)

$b \in$ Binding ::= ( FormalDomain = $d_{id_{Formal}} \mapsto$ ActualDomain = $d_{id_{Actual}}$ )

$e \in$ AbstractEdge ::= (FromType = $t_{src_{id}}$; ToDomain = $d_{dst_{id}}$; ToType = $t_{dst_{id}}$)

$s \in$ AbstractLink ::= (FromDomain = $d_{src_{id}}$; ToDomain = $d_{dst_{id}}$)

$\gamma \in$ RuntimeGraph ::= (RootObject = $\theta_{id}$, Objects = $\{\theta_{id}\ldots\}$, Edges = $\{\eta_{id}\ldots\}$, Links = $\{\sigma_{id}\ldots\}$)

$\theta \in$ RuntimeObject ::= (Id = $\theta_{id}$, MergedAbstractObjects = $\{o_{id}\ldots\}$; OwnerAbstractDomain = $d_{owner_{id}}$)

$\eta \in$ RuntimeEdge ::= (FromPath = $[d_{src_{id}}\ldots]$; FromType = $t_{src_{id}}$, ToPath = $[d_{dst_{id}}\ldots]$; ToType = $t_{dst_{id}}$)

$\sigma \in$ RuntimeLink ::= (FromPath = $[d_{src_{id}}\ldots]$, ToPath = $[d_{dst_{id}}\ldots]$)

Fig. 8a $$\frac{\text{AbstractObject}(o,\ d,\ t,\ \{b\ldots\})}{\text{try}(\{o\};\ d)}\ [\text{R-Convert-Object}]$$

$$\frac{\text{try}(\{o\ldots\};\ d) \quad \text{no RuntimeObject}(\{o_1\ldots\};\ d)\ \text{with compat}(\text{typeof}(o),\ \text{typeof}(o_1))}{\text{RuntimeObject}(\{o\ldots\};\ d)}\ [\text{R-New-Object}]$$

$$\frac{\text{try}(\{o\ldots\};\ d) \quad \text{exists RuntimeObject}(\{o_1\ldots\};\ d) \quad \text{compat}(\text{typeof}(o),\ \text{typeof}(o_1))}{\text{replace RuntimeObject}(\{o_1\ldots\};\ d)\ \text{with RuntimeObject}(\{o\ldots o_1\ldots\};\ d)}\ [\text{R-Merge-Objects}]$$

$$\frac{\text{exists RuntimeObject}(\{o_1\ldots\};\ d) \quad \text{exists RuntimeObject}(\{o_2\ldots\};\ d) \quad \text{compat}(\text{typeof}(o_1),\ \text{typeof}(o_2))}{\text{replace RuntimeObject}(\{o_1\ldots\};\ d)\ \text{and RuntimeObject}(\{o_2\ldots\};\ d)\ \text{with RuntimeObject}(\{o_1\ldots o_2\ldots\};\ d)}\ [\text{R-Merge-Existing}]$$

$$\frac{\text{RuntimeObject}(\{o_{pull}\ldots\};\ d_{param}) \quad \text{RuntimeObject}(\{o_{parent}\ldots\};\ d_{parent})}{\text{AbstractDomain}(d_{param},\text{typeof}(o_{parent}))\quad\text{aparam}(o_{parent},d_{param},d_{actual})}\ [\text{R-Pull-Object}]$$
$$\text{try}(\{o_{pull}\ldots\};\ d_{actual})$$

$$\frac{\text{AbstractObject}(o,\ d,\ t,\ \{d_{param}\mapsto d_{actual},\ldots\})}{\text{aparam}(o,d_{param},d_{actual})}$$

$$\frac{\text{AbstractObject}(o,\ d,\ t,\ \{b\ldots\})}{\text{typeof}(o)=t}\ [\text{R-Aux-Compat}]$$

$\text{compat}(t_1,\ t_2)$ iff $t_1 <: t_2$ or $t_2 <: t_1$ or $\text{existsNonTrivialLUB}(t_1,\ t_2)$

Fig. 8b $$\frac{\mathsf{RuntimeObject}(\{o...\};d) \quad \mathsf{AbstractObject}(o_{id};d_{id},t_{src_{id}},\{b...\}) \quad \mathsf{AbstractEdge}(t_{src_{id}},d_{dst_{id}},t_{dst_{id}})}{\mathsf{try}\{o...\};d)@([d_{id}],t_{src_{id}}) \to ([d_{id},d_{dst_{id}}],t_{dst_{id}})} \text{[R-TRY-EDGE]}$$

$$\frac{\mathsf{try}\{o...\};d)@([d_{src_{id}}...],t_{src_{id}}) \to ([d_{dst_{id}}...],t_{dst_{id}})}{\mathsf{RuntimeEdge}([d_{src_{id}}...],t_{src_{id}},[d_{dst_{id}}...],t_{dst_{id}})} \text{[R-NEW-EDGE]}$$

$$\frac{\mathsf{try}\{o...\};d)@([...,d,d_{id},...],t_{src_{id}}) \to ([...],t_{dst_{id}}) \quad \mathsf{AbstractObject}(o,d,t,\{d_{id} \mapsto d'_{id},...\})}{\mathsf{try}\{o...\};d)@([...,d'_{id},...],t_{src_{id}}) \to ([...,d,d_{id},...],t_{dst_{id}})} \text{[R-PATH-SUBST-L]}$$

$$\frac{\mathsf{try}\{o...\};d)@([...],t_{src_{id}}) \to ([...,d,d_{id},...],t_{dst_{id}}) \quad \mathsf{AbstractObject}(o,d,t,\{d_{id} \mapsto d'_{id},...\})}{\mathsf{try}\{o...\};d)@([...],t_{src_{id}}) \to ([...,d'_{id},...],t_{dst_{id}})} \text{[R-PATH-SUBST-R]}$$

Fig. 8c $(o_{num1}, d_{STATE}, t_{Number}, \{\})$    $(o_{int1}, d_{STATE}, t_{Integer}, \{\})$    (1) Field decl. num1 and int1

$(d_{STATE}, \{o_{num1}, o_{int1}\}, t_{DataAccess})$    (2) Domain decl. STATE and PENV $(d_{PENV}, \{o_{v2}\}, t_{DataAccess})$    (3) Domain decl. STATE and PENV $(o_{v2}, d_{PENV}, t_{ArrayList<Integer>}, \{d_{ELTS} \mapsto d_{PENV}\})$    (4) Field decl. v2

$e_1 := ([\,], t_{DataAccess}, [d_{PENV}], t_{ArrayList<Integer>})$    (5) Field ref. DataAccess $\to$ v2

$e_2 := ([\,], t_{DataAccess}, [d_{STATE}], t_{Integer})$    (6) Field ref. DataAccess $\to$ int1

$e_3 := ([\,], t_{DataAccess}, [d_{STATE}], t_{Number})$    (7) Field ref. DataAccess $\to$ num1

$(t_{DataAccess}, \{d_{STATE}, d_{PENV}\}, \{e_1, e_2, e_3\})$    (8) Type decl. DataAccess $(o_{dataAccess}, d_{DATA}, t_{DataAccess}, \{d_{PENV} \mapsto d_{ENV}\})$    (9) Field decl. dataAccess $(d_{DATA}, \{o_{dataAccess}\}, t_{UnitTest})$    $(d_{ENV}, \{\}, t_{UnitTest})$    (10) Domain decl. DATA and ENV $e_4 := ([\,], t_{UnitTest}, [d_{DATA}], t_{DataAccess})$    (11) Field ref. UnitTest$\to$dataAccess $(t_{UnitTest}, \{d_{DATA}, d_{ENV}\}, \{e_4\})$    (12) Type decl. UnitTest $(t_{Integer}, \{\}, \{\})$    $(t_{Number}, \{\}, \{\})$    (13) Type decl. Integer and Number $(o_{obj}, d_{ELTS}, t_{Integer}, \{\})$    (14) Field decl. for ArrayList element $(d_{ELTS}, \{o_{obj}\}, t_{ArrayList<Integer>})$    (15) Domain to store ArrayList elements $e_5 := ([\,], t_{ArrayList<Integer>}, [d_{ELTS}], t_{Integer})$    (16) Field ref. to ArrayList elements $(t_{ArrayList<Integer>}, \{d_{ELTS}\}, \{e_5\})$    (17) Type decl. for ArrayList<Integer>

$(o_{test}, d_{test}, t_{UnitTest}, \{\})$    (18) Variable decl. for test $RootObject := o_{test}$    (19) Root object (user selected)

Fig. 11a

Sample rewrites to convert a few AbstractObjects into RuntimeObjects:

R-CONVERT-OBJECT($o_{test}$) ↬ R-NEW-OBJECT($o_{test}$) ↬ RuntimeObject({$o_{test}$}, $d_{test}$)   (vo1)

R-CONVERT-OBJECT($o_{num1}$) ↬ R-NEW-OBJECT($o_{num1}$) ↬ RuntimeObject({$o_{num1}$}, $d_{STATE}$)   (vo2)

R-CONVERT-OBJECT($o_{int1}$) ↬ exists RuntimeObject({$o_{num1}$}, $d_{STATE}$)
and $o_{num1}$ : $Number$ and $o_{int1}$ : $Integer$ and $Integer$ <: $Number$
↬ R-MERGE-OBJECTS($o_{int1}$) ↬ replace RuntimeObject({$o_{num1}$}, $d_{STATE}$) with RuntimeObject({$o_{num1}$, $o_{int1}$}, $d_{STATE}$)   (vo3)

R-CONVERT-OBJECT($o_{data.Access}$) ↬ RuntimeObject({$o_{data.Access}$}, $d_{DATA}$)   (vo4)

R-PULL-OBJECT(({$o_{v2}$}, $d_{PENV}$)) and RuntimeObject({$o_{data.Access}$}, $d_{DATA}$) and AbstractDomain($d_{PENV}$, $t_{Data.Access}$)
and aparam($o_{data.Access}$, $d_{PENV}$, $d_{ENV}$) ↬ try({$o_{v2}$}, $d_{ENV}$) ↬* RuntimeObject({$o_{v2}$}, $d_{ENV}$)   (vo5)

Sample rewrites to convert a few AbstractEdges into RuntimeEdges:

$(\{o_{data.Access}\}, d_{DATA})$ and AbstractEdge(5) (21)

↪ RuntimeEdge($[d_{DATA}], t_{DataAccess}, [d_{DATA}, d_{PENV}], t_{ArrayList<Integer>}$) (ve1)

Binding $d_{PENV} \mapsto d_{ENV}$ on (9) and R-PATH-SUBST-R maps $[d_{DATA}, d_{PENV}]$ to $[d_{ENV}]$ (newpath1)

↪* RuntimeEdge($[d_{DATA}], t_{DataAccess}, [d_{ENV}], t_{ArrayList<Integer>}$) (ve1.1)

$(\{o_{v2}\}, d_{PENV})$ and AbstractEdge on (16) (22)

↪ RuntimeEdge($[d_{PENV}], t_{ArrayList<Integer>}, [d_{PENV}, d_{ELTS}], t_{Integer}$) (ve2)

Binding $d_{ELTS} \mapsto d_{PENV}$ on (4) and R-PATH-SUBST-R maps $[d_{PENV}, d_{ELTS}]$ to $[d_{PENV}]$ (newpath2)

↪* RuntimeEdge($[d_{PENV}], t_{ArrayList<Integer>}, [d_{PENV}], t_{Integer}$) (ve2.1)

Fig. 11c

*T-Store*

$$\frac{\ldots \quad S[\ell] = C{<}\overline{\ell'.n}{>}(\overline{v}) \iff \Sigma[\ell] = C{<}\overline{\ell'.n}{>}}{\Sigma \vdash S} \quad \ldots$$

Fig. 12

1. For each type declaration $C$ in the program
   (a) Create AbstractType $t$ and add it to $Types$
   (b) For each actual or formal domain in $C$
      i. Create corresponding AbstractDomain $d$
      ii. Add $d$ to $t.Domains$
   (c) Create default owned domain in $t$
   (d) For each domain link between $d_1$ and $d_2$ in $C$
      i. Create AbstractLink between the AbstractDomain of $d_1$ and the AbstractDomain of $d_2$
      ii. Add AbstractLink to $t.Links$
   (e) For each declaration $d\ C'\langle\bar{a}\rangle\ o$ in $C$ (DBV) or else
   (f) For each creation $new\ C'\langle\bar{a}\rangle(\ldots)$ in $C$ (IBV)
      i. If $C'$ has no AbstractType, create $t'$ for $C'$
      ii. If AbstractType $t$ of Type $C$ has no AbstractDomain $d$, create $d$ and add $d$ to $t.Domains$
      iii. Create AbstractObject $o$ and add to $d.Objects$
      iv. Create bindings $\{b\ldots\}$ from formals $\bar{f}$ of AbstractType $t'$ to actuals $\bar{a}$ of $t$ and add to $o.Bindings$
      v. If declaration is a field declaration (DBV) or assigned to a field (IBV)
         A. Create AbstractEdge $e$ from AbstractType $t$ to AbstractDomain $a_1$ and AbstractType $t'$
         B. Add $e$ to $t.Edges$
2. Unify domains related in an inheritance hierarchy
   (a) If $C <: T$, unify domains $C::d$ and $T::d$
   (b) If interface $I$ declares public domain $I::d$, unify with $C::d$ if $C$ implements $I$
3. Expand generic types (perform type substitutions)
4. Synthesize AbstractEdges from array type to array element

Fig. 13

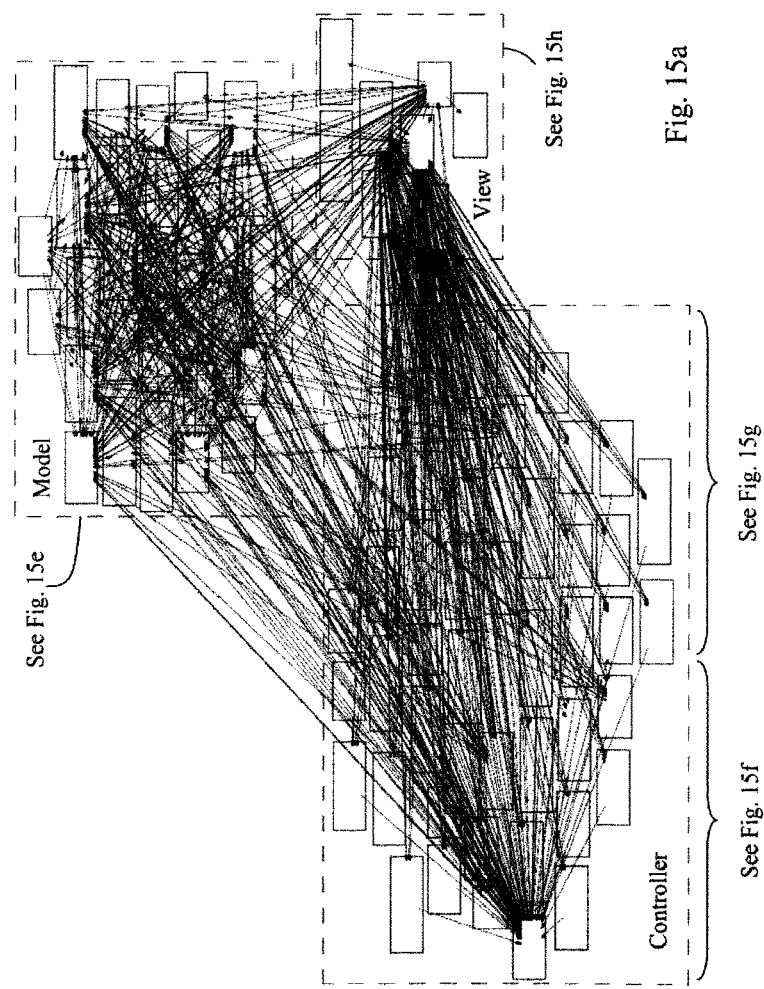

Object
1500

Object 1510

Object 1520

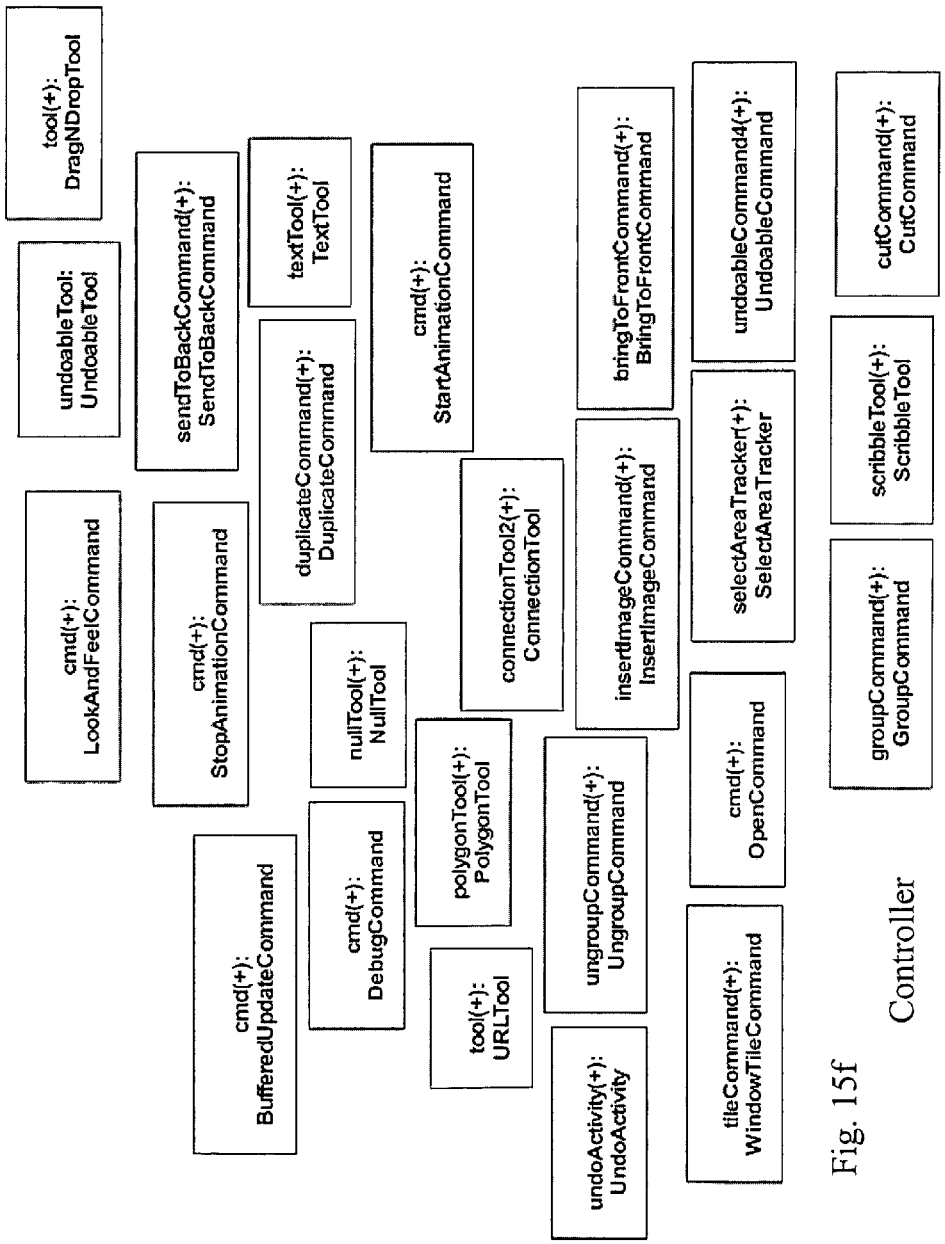
Fig. 15f  Controller

Controller

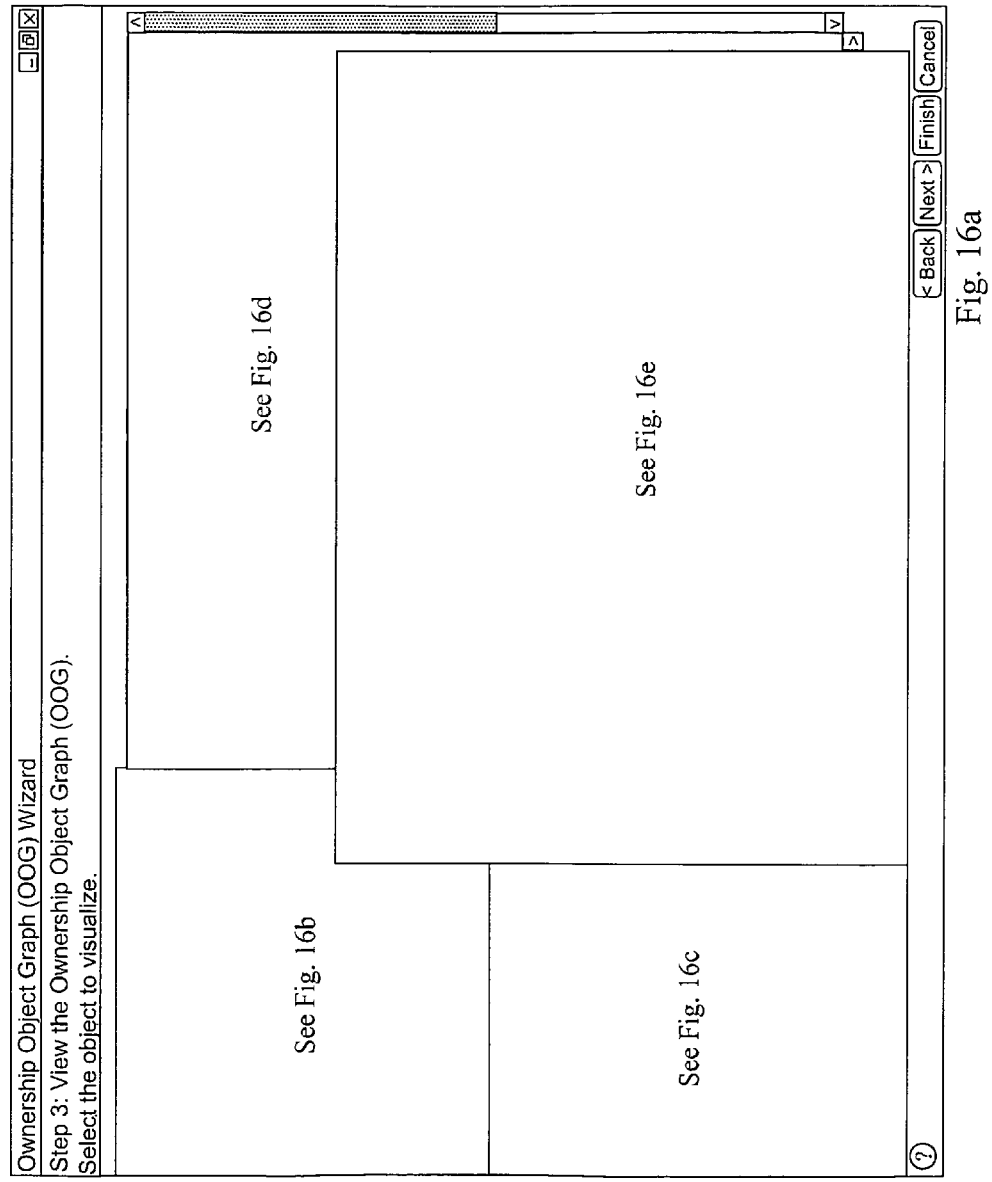

Display options:

☐ Domain Links

☑ Variable Names    ☑ Object Types

☑ Private Domains

☐ Top-Level Object

☑ Bi-Directional Edges

Graph Layout:      ⦿ DOT  ○ FDP

Layout Option:     ○ TB  ⦿ LR

Projections Depth

Low |————————————▯| Hig

Type Abstraction        [Apply]

☑ Use Trivial Types     [Settings ...]

☐ Use Design Intent Types

☐ Generate Architecture on Finish

[Expand All]          [Collapse All]

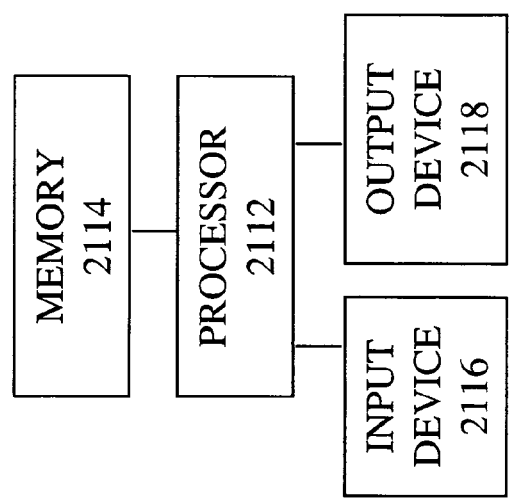
Fig. 21

APPARATUSES AND METHODS FOR PRODUCING RUNTIME ARCHITECTURES OF COMPUTER PROGRAM MODULES

CROSS-REFERENCE TO RELATED APPLICATIONS

This application claims priority from U.S. Provisional Patent Application No. 60/937,704, filed Jun. 29, 2007, which is incorporated herein by reference.

STATEMENT REGARDING FEDERALLY-SPONSORED RESEARCH AND DEVELOPMENT

This invention was made, at least in part, with government support under NSA number MDA904-03-C-1107, NASA number NNA05CS30A; NSF number CCF-0546550; and DARPA number HR00110710019. The United States government may have certain rights in this invention.

FIELD OF THE INVENTION

The present invention is directed generally to apparatuses and methods for producing run-time architectures of computer program modules.

BACKGROUND OF THE INVENTION

1 Introduction

Many architectural views are needed to describe a software system. The code architecture or module view organizes code entities in terms of classes, packages, layers and modules, and is useful for studying properties such as maintainability; another useful view is the runtime architecture of a system [P. Clements et al. *Documenting Software Architecture*. Addison-Wesley, 2003]. A runtime architecture, also known as a Component-and-Connector (C&C) view, models runtime entities and their potential interactions. A related notion is that of an object diagram, a diagram of object structures which shows object instances exclusively. Gamma et al. use object diagrams extensively to explain the Gang of Four design patterns [E. Gamma, R. Helm, R. Johnson, and J. Vlissides. *Design Patterns: Elements of Reusable Object-Oriented Software*. Addison-Wesley, 1994.].

A runtime component is a unit of computation and state that has a runtime presence. Thus, in an object-oriented system, a component is an object or a group of objects [P. Clements et al. *Documenting Software Architecture*. Addison-Wesley, 2003.]. A connector is an abstraction of a runtime interaction. In an object-oriented system, a connector models one or more object relations. Architectures often organize components into tiers. A tier is a conceptual partitioning of functionality. A layer denotes a partition in the code architecture or a module view [P. Clements et al. *Documenting Software Architecture*. Addison-Wesley, 2003]; it can be represented as a package and enforced using dependency rules [N. Sangal, E. Jordan, V. Sinha, and D. Jackson. Using Dependency Models to Manage Complex Software Architecture. In *OOPSLA*, 2005.]. A tier denotes a partition in a runtime view [P. Clements et al. *Documenting Software Architecture*. Addison-Wesley, 2003.]. Finally, architectures are often hierarchical whereby a component can have a nested sub-architecture consisting of lower-level components and connectors [N. Medvidovic and R. N. Taylor. A Classification and Comparison Framework for Software Architecture Description Languages. *IEEE TSE*, 26(1), 2000.].

While the above definitions are consistent with formal Architecture Description Languages (ADLs) and software architecture research, developers intuitively draw such runtime architectures on whiteboards. FIG. 1 is a runtime architecture drawn by the developer of a system we study in Section 5.3. The runtime architecture illustrated in FIG. 1 is an 8,000-line subject system, Aphyds, and the developer who made the illustration in FIG. 1 is an experienced programmer with a Ph.D. in computer science but no formal training in software architecture. The drawing follows the Model-View design pattern with the user interface above the line in the middle of the diagram and the circuit and computational code below the line. Notice node and net inside circuit's sub-architecture. The unlabeled arrows (including the thick arrows) represent data flow while the arrows labeled call represent control flow.

Architectural-level analyses for properties such as performance, reliability or security require runtime views. Moreover, having an up-to-date as-built runtime architecture enables checking the conformance of a system with its as-designed architecture. Despite receiving much research attention, architectural extraction remains a hard problem.

Recovering meaningful runtime architectures statically is hard for object-oriented systems since their runtime architecture often bears little resemblance to their code architecture. In fact, most recovery approaches employ a mix of static and dynamic information. To simplify the problem of relating architecture to code, previous research mandated specific implementation frameworks [N. Medvidovic and R. N. Taylor. A Classification and Comparison Framework for Software Architecture Description Languages. *IEEE TSE*, 26(1), 2000.] or extended the language to specify a component-and-connector architecture directly in code [J. Aldrich, C. Chambers, and D. Notkin. ArchJava: Connecting Software Architecture to Implementation. In *ICSE*, 2002.], [J. Schäfer, M. Reitz, J.-M. Gaillourdet, and A. Poetzsch-Heffter. Linking Programs to Architectures: An Object-Oriented Hierarchical Software Model based on Boxes. In The Common Component Modeling Example: Comparing Software Component Models, 2008.]. Such proposals require re-engineering existing implementations. Embodiments of the present invention will support existing object-oriented languages, design idioms and existing libraries and frameworks.

Intuitively, many have preferred dynamic analyses to extract the as-built runtime architecture. Such an analysis monitors one or more program runs and shows snapshots of the system's runtime architecture for those runs [M. Sefika, A. Sane, and R. Campbell. Architecture Oriented Visualization. In *OOPSLA*, 1996.], [C. Flanagan and S. N. Freund. Dynamic Architecture Extraction. In *FLoC FATES-RV*, 2006.], [B. Schmerl, J. Aldrich, D. Garlan, R. Kazman, and H. Yan. Discovering Architectures from Running Systems. *IEEE TSE*, 32(7), 2006.]. But these descriptions are partial and cover only a few representative interactions between objects, based on particular inputs and exercised use cases. A true architecture is meant to capture a complete description of the system's runtime structure. To meet this goal, a static analysis is preferred.

A static analysis must also be sound and not fail to reveal entities and relationships that actually exist at runtime. For instance, an architectural-level security analysis requires a complete architectural description to handle the worst, not the typical, case of runtime component communication.

Accordingly, many existing object-oriented systems would benefit from having an up-to-date documented runtime architecture, which would enable several software assurance techniques. It is hard, with the prior art, to statically extract a sound runtime architecture from an object-oriented system written in an existing programming language and that follows common design idioms, so many have preferred dynamic analyses.

BRIEF SUMMARY OF THE INVENTION

The present invention is directed generally to apparatuses and methods for producing run-time architectures of computer program modules. In particular, ownership domain annotations specify in code some architectural intent related to object encapsulation and communication; the present invention shows they also enable the static extraction of a sound runtime architecture. The present invention also describes the core analysis first informally, then formally, and proves key soundness theorems. It is also shown how the present invention improves the precision of the analysis based on knowledge gained from applying the method on real object-oriented code. Furthermore, the present invention evaluates the analysis on several extended examples of medium-sized representative programs that we annotated manually. Those and other advantages of the present invention will be described herein.

According to one embodiment, the present invention includes a method for producing a representation of a true runtime object graph from a computer program module. In general, the method includes creating an abstract graph and creating a runtime graph from the abstract graph. More specifically, one embodiment of the method includes creating an abstract graph from the computer program module and from containment information corresponding to the computer program module, wherein the abstract graph has nodes including types and objects, and wherein the abstract graph relates an object to a type, and wherein for a specific object the abstract graph relates the specific object to a type containing the specific object. The method also includes creating a runtime graph from the abstract graph, wherein the runtime graph is a representation of the true runtime object graph, wherein the runtime graph represents containment information such that, for a specific object, the runtime graph relates the specific object to another object that contains the specific object.

Many variations and modifications are possible with the present invention. For example, The present invention also includes apparatuses. For example, the present invention may be embodied as a computer, a plurality of computers or a computer system, computer-readable instructions, or other variations thereof. In one embodiment, the present invention is an apparatus including a processor and memory. The memory includes computer readable instructions which, when executed by the processor, cause the processor to create an abstract graph from the computer program module and from containment information corresponding to the computer program module, wherein the abstract graph has nodes including types and objects, and wherein the abstract graph relates an object to a type, and wherein for a specific object the abstract graph relates the specific object to a type containing the specific object. The computer readable instructions also cause the processor to create a runtime graph from the abstract graph, wherein the runtime graph is a representation of the true runtime object graph, wherein the runtime graph represents containment information such that, for a specific object, the runtime graph relates the specific object to another object that contains the specific object.

In another embodiment, the present invention is embodied as computer readable instructions (apart from any computer) which, when executed, cause a processor to perform the steps, or variations of the steps, described above.

Many variations are possible with the present invention, and these and other teachings, variations, and advantages of the present invention will become apparent from the following detailed description of the invention.

BRIEF DESCRIPTION OF THE SEVERAL VIEWS OF THE DRAWING

Embodiments of the present invention will now be described, by way of example only, with reference to the accompanying drawings for the purpose of illustrating the embodiments, and not for purposes of limiting the invention, wherein:

FIG. 4a illustrates an example of DataAccess code with annotations.

FIGS. 8a-8c illustrate data type declarations and rewriting rules to convert an AbstractGraph into a RuntimeGraph.

FIGS. 11a-11c illustrate the rewriting rules on the DataAccess example.

FIG. 12 illustrates the partial store typing rule.

FIG. 13 illustrates the visitor to generate the abstract graph.

FIGS. 15a and 15e-15h illustrate illustrates the JHotDraw OOG based on object instantiations but without type abstraction.

FIGS. 16a-16e illustrate a snapshot of the OOG tool.

FIG. 21 illustrates one embodiment of a system according to the present invention.

DETAILED DESCRIPTION OF THE INVENTION

Figure 1:
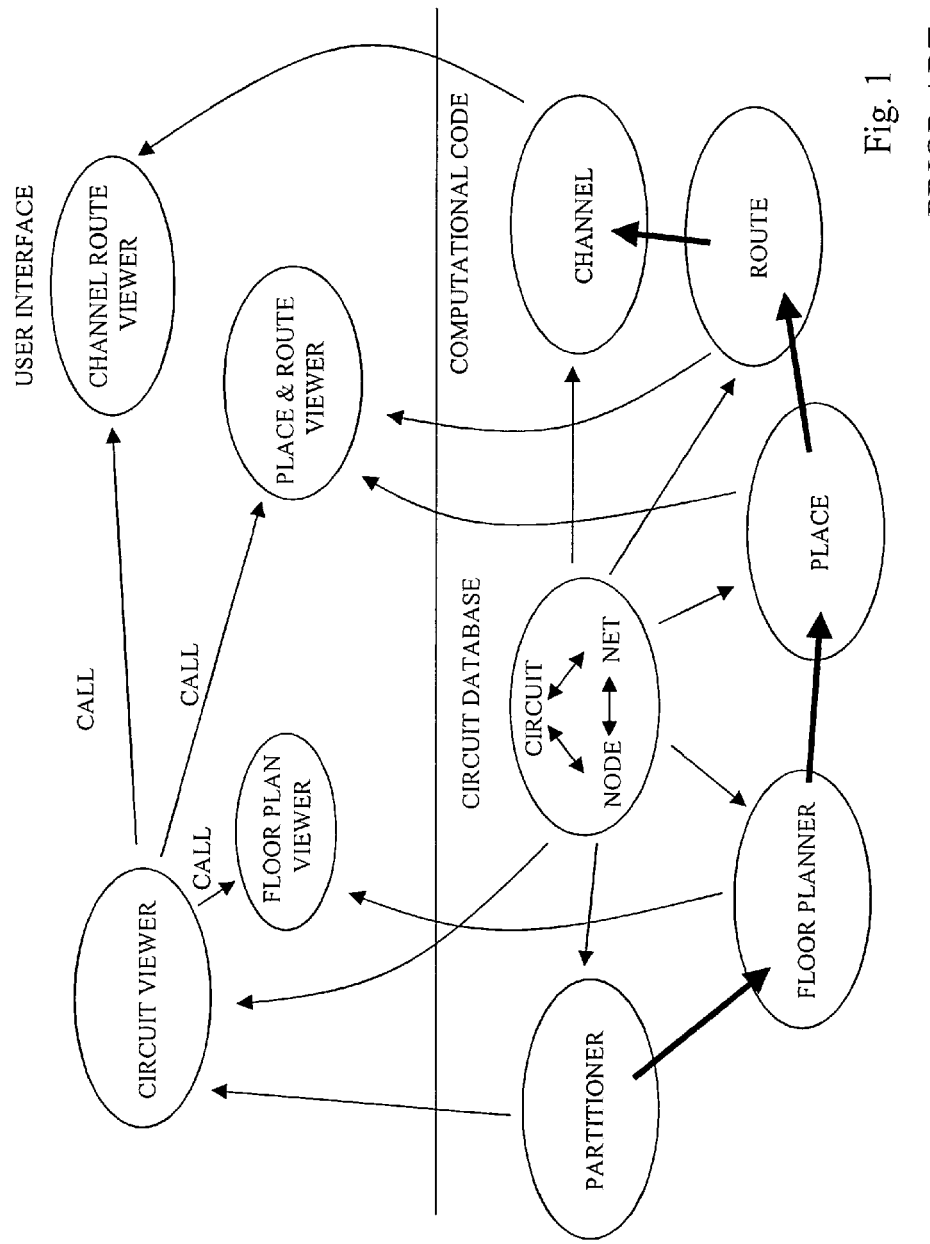
FIG. 1 illustrates a runtime architecture of an 8,000-line system.

The present invention relates generally to apparatuses and methods for producing runtime architectures of computer programs. The present invention may be, for example, particular methods for producing results as described herein (including, but not limited to, computer software, for accomplishing those results), and apparatuses for performing the invention such as one or more computers or computer systems for performing the invention. The computers may, for example, execute software embodying the invention. Although the present invention will generally be described in terms of computer software, the present invention may also be embodied as, and may operate on, programs in forms other than computer software such as, for example, firmware, hardware, and other forms.

In general, the present invention will be described in terms of a method for producing a hierarchical representation of a runtime object graph that corresponds to a computer program module. The method includes creating an abstract graph from the computer program module and from containment information corresponding to the computer program module, wherein the abstract graph has nodes including types and objects, and wherein the abstract graph relates an object to a type, and wherein for a specific object the abstract graph relates the specific object to a type containing the specific object. The method also includes creating a runtime graph from the abstract graph, wherein the runtime graph is a representation of the true runtime object graph, wherein the runtime graph represents containment information such that, for a specific object, the runtime graph relates the specific object to another object that contains the specific object. Although the present invention is described in terms of specific examples and embodiments, the present invention is not limited to the particular details of these examples and embodiments.

The present invention is directed to the static extraction of a runtime view of an object-oriented system with a two-pronged approach: a) assume that annotations encode and enforce the architectural intent in code [J. Aldrich and C. Chambers. Ownership Domains: Separating Aliasing Policy from Mechanism. In *ECOOP,* 2004.; M. Abi-Antoun and J. Aldrich. Ownership Domains in the Real World. In *IWACO,* 2007.]; and b) leverage the annotations in a static analysis to extract a sound runtime architecture from an annotated program. In the software architecture literature, a sound architecture often means an architecture with desirable quality attributes. In the present invention, a sound architecture shows the actual system structure at runtime notwithstanding tight coupling between components or other undesirable quality attributes. Embodiments of the present invention may include one or more the following features:

a. A static analysis for extracting an instance-based hierarchical runtime architecture based on program annotations;

b. A soundness proof of the extracted architecture;

c. An evaluation of the analysis on several representative medium-sized object-oriented systems.

Outline.

The description of the present invention is organized as follows. We first discuss the requirements on a runtime architecture (Section 2) and how the annotations help with architectural extraction. In Section 3, we describe the core analysis both informally and formally, and prove a key soundness result. In Section 4, we improve the precision of the analysis based on knowledge gained from applying the method on real object-oriented code. Section 5 presents highlights of our evaluation on several real systems. We conclude with a discussion (Section 6) and a survey of related work (Section 7).

The present invention will sometimes be described in terms of "code", "programs", "software", and similar terms. Those terms are understood in the art to mean "computer programs", and those terms are used as such in this document. Similarly, the term "computer program module" is understood to mean part or all of a computer program, and that term is used as such in this document. For example, the present invention may be applied to a computer program module, which means that the present invention may be applied to an entire computer program, or the present invention may be applied to only a portion of a computer program, even if the entire computer program is present.

2 Overall Strategy

A runtime object graph represents a running object-oriented program where nodes correspond to runtime objects, and edges correspond to relations between objects. A sound runtime architecture must statically approximate all the runtime object graphs that any program run may generate.

Figure 2:
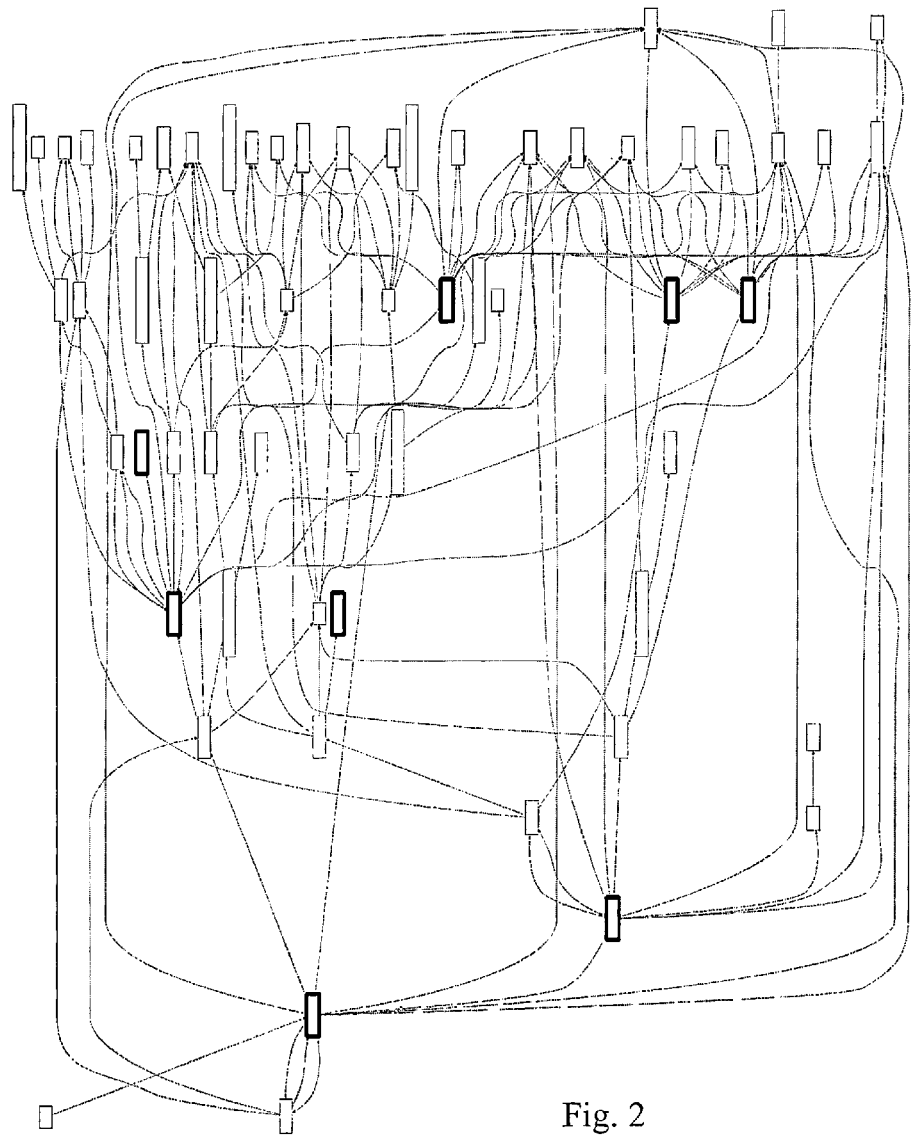
FIG. 2 illustrates a thumbnail of the JHotDraw object graph obtained at compile-time by Womble.

Existing static analyses that extract a system's execution structure produce low-level, non-hierarchical object graphs that explain runtime interactions in detail but convey little architectural abstraction [R. W. O'Callahan. *Generalized Aliasing as a Basis for Program Analysis Tools. PhD thesis, CMU,* 2001], [D. Jackson and A. Waingold. Lightweight Extraction of Object Models from Bytecode. *TSE,* 27(2), 2001], [A. Spiegel. *Automatic Distribution of Object-Oriented Programs.* PhD thesis, FU Berlin, 2002.]. FIG. 2 shows the output of a static object graph analysis, WOMBLE [D. Jackson and A. Waingold. Lightweight Extraction of Object Models from Bytecode. *TSE,* 27(2), 2001.], on a 15,000-line program, JHotDraw (http://www.jhotdraw.org (Version 5.3)). Low-level objects such Dimension and Rectangle appear at the same level as the root application object, JavaDrawApp. Such a view is a far cry from what a developer might draw for a runtime architecture (See FIG. 1).

2.1 Requirements on Solution

We listed earlier several requirements on a solution, namely that it be a static analysis and not require language extensions. Furthermore, an analysis for object-oriented code must also handle aliasing, recursion and inheritance. Some key properties of a runtime architecture include:

a. Component=Objects.

An architecture must show components that correspond to runtime entities. For object-oriented systems, a component represents an object or a group of objects. A group of objects must be a meaningful abstraction, such as the circuit or viewer in FIG. 1.

b. Connector=Object Relations.

An architecture has connectors that correspond to relations between runtime entities. For object-oriented systems, a connector represents a runtime interaction between some object in one component and some object in another component.

c. Tier=Group.

An architecture often groups conceptually related components into runtime tiers or partitions.

d. Hierarchy.

A component can have a nested sub-architecture consisting of lower-level components and connectors. Hierarchy also provides abstraction since it enables both high-level understanding and detail.

e. Summarization.

Different executions generate a different number of objects. Furthermore, the number of objects in the runtime object graph is unbounded. The architecture must be a finite representation of the runtime object graph. It is common practice to represent multiple objects at runtime with one canonical component.

f. Scalability.

Meaningful architectures would be most helpful for large systems. An architecture must scale, i.e., the size of top-level diagram should remain mostly constant as the program size increases arbitrarily.

g. Aliasing.

Ignoring aliasing may produce a misleading architecture. For instance, WOMBLE sometimes shows multiple nodes for the same runtime object. In FIG. 2, there are multiple JavaDrawApp nodes illustrated as thick-lined boxes. FIG. 2 also shows a separate DrawingEditor instance when it is the same object as the JavaDrawApp instance at runtime (JavaDrawApp extends DrawingEditor). If two components are shown as distinct when they are the same, an architectural analysis may assign them different values for a key trustLevel property. As a result, the validity of such an analysis may be suspect at best. Some object graph analyses do not ignore aliasing but use unscalable whole-program analyses [R. W. O'Callahan. *Generalized Aliasing as a Basis for Program Analysis Tools. PhD thesis, CMU*, 2001.].

h. Soundness.

An architecture must be sound and represent all objects and relations between objects that may exist at runtime. We define soundness as:

i. Component Soundness:

An architecture is sound if for every runtime object graph, there exists a map from objects to components, such that each runtime object o is mapped to exactly one component C in the architecture, i.e., the same runtime object must not map to multiple components in the architecture.

j. Connector Soundness:

If there is a runtime connection between object $o_1$ and object $o_2$ in the runtime object graph, then there is a connector between components $C_1$ and $C_2$ corresponding to $o_1$ and $o_2$.

k. Tier Soundness:

If object o is in a runtime tier d in the runtime object graph, then component C corresponding to o is in tier D in the architecture.

l. Precision.

An architecture is precise if it shows two runtime entities that represent different conceptual design elements as two different architectural entities. An architecture is imprecise if its elements are too coarse grained and lump together runtime elements that serve different conceptual purposes in the design. For instance, an architecture with one component that represents the entire system is sound but imprecise. This definition of precision can be refined as:

m. Component Precision:

The architecture shows two runtime entities that represent two different conceptual design elements as two different components.

n. Connector Precision:

The architecture shows two runtime relations that represent two different conceptual interactions as two different connectors.

Although these properties are important and one might desire to achieve all such properties in a particular embodiment of the present invention, it is not required that the present invention include all, or even most, of these properties. On the contrary, advantages of the present invention can be realized with less than all of these properties, and different applications and different product constraints will influence the number and combination of properties embodied in a particular example of the present invention.

2.2 Strategy: Ownership Annotations

According to some embodiments, the present invention includes a principled two-pronged approach for extracting statically a runtime architecture of a system: a) assume developers add to the source code annotations to clarify some architectural intent; and b) use a sound static analysis that leverages the annotations and the code to extract a sound runtime architecture.

For adoptability, the annotations we propose to use are not radical language changes and do not affect the system's runtime semantics. The annotations support existing object-oriented languages, design idioms, frameworks and libraries. Instead of specifying components and connectors directly in code [J. Aldrich, C. Chambers, and D. Notkin. ArchJava: Connecting Software Architecture to Implementation. In *ICSE*, 2002.], the annotations specify and enforce the sharing of data between objects and constrain how the program can alias objects [J. Aldrich and C. Chambers. Ownership Domains: Separating Aliasing Policy from Mechanism. In ECOOP, 2004.], which is a significant problem in creating architectural models.

In object-oriented programs, this state sharing is often not explicit but instead is implicit in the structure of references created at runtime. The idea of using annotations to recover a design from the code is not new [P. Lam and M. Rinard. A Type System and Analysis for the Automatic Extraction and Enforcement of Design Information. In *ECOOP*, 2003.]. But previous annotation-based systems did not specify the runtime instance structure or data sharing precisely and did not handle inheritance [P. Lam and M. Rinard. A Type System and Analysis for the Automatic Extraction and Enforcement of Design Information. In *ECOOP*, 2003.].

Ownership type annotations are appealing because they track objects not classes (related to ownership types, confined types track classes not objects [B. Bokowski and J. Vitek. Confined Types. In *OOPSLA*, 1999.]) and provide some precision about aliasing [D. Clarke, J. Potter, and J. Noble. Ownership Types for Flexible Alias Protection. In *OOPSLA*, 1998.], [C. Boyapati, B. Liskov, and L. Shrira. Ownership Types for Object Encapsulation. In *POPL*, 2003.], [J. Aldrich and C. Chambers. Ownership Domains: Separating Aliasing Policy from Mechanism. In *ECOOP*, 2004.]. Moreover, a type system checks the annotations at compile-time. Different ownership type systems have various degrees of expressiveness, but all support making an object owned by, i.e., part of another object's representation, to enforce instance encapsulation. This is a stronger guarantee than changing the visibility of a field by marking it private; the latter does not prevent a developer from defining a public method that returns an alias.

Ownership is one form of containment. There are several notions of ownership. For instance, shallow ownership stops an object from referencing another object, whereas deep ownership stops an object from referencing other another object's transitive representation. We describe an embodiment of the present invention in terms of ownership, but the underlying ideas apply to other forms of containment.

2.3 Ownership Domains Overview

The ownership domains type system uses annotations on the reference types in the program to make the state sharing between objects more explicit. A developer indicates what domain an object is part of by annotating each reference to that object in the program [J. Aldrich and C. Chambers. Ownership Domains: Separating Aliasing Policy from Mechanism. In ECOOP, 2004.].

Brief Review.

An ownership domain is a conceptual groups of objects with an explicit name and explicit policies that govern how it can reference objects in other domains. Each object belongs to a single ownership domain that does not change at runtime.

Ownership domains may be declared at the top level of the application or within an object. Each object can declare one or more public or private domains to hold its internal objects, thus supporting hierarchy. Permission to access an object implies permission to access its public domains. Two objects can access objects in the same domain by declaring a formal domain parameter on one object and binding that formal domain parameter to another domain as long as the permissions allow that access. Finally, objects inside a private domain are encapsulated—unless a policy explicitly links a domain parameter to the private domain.

Figure 3A:
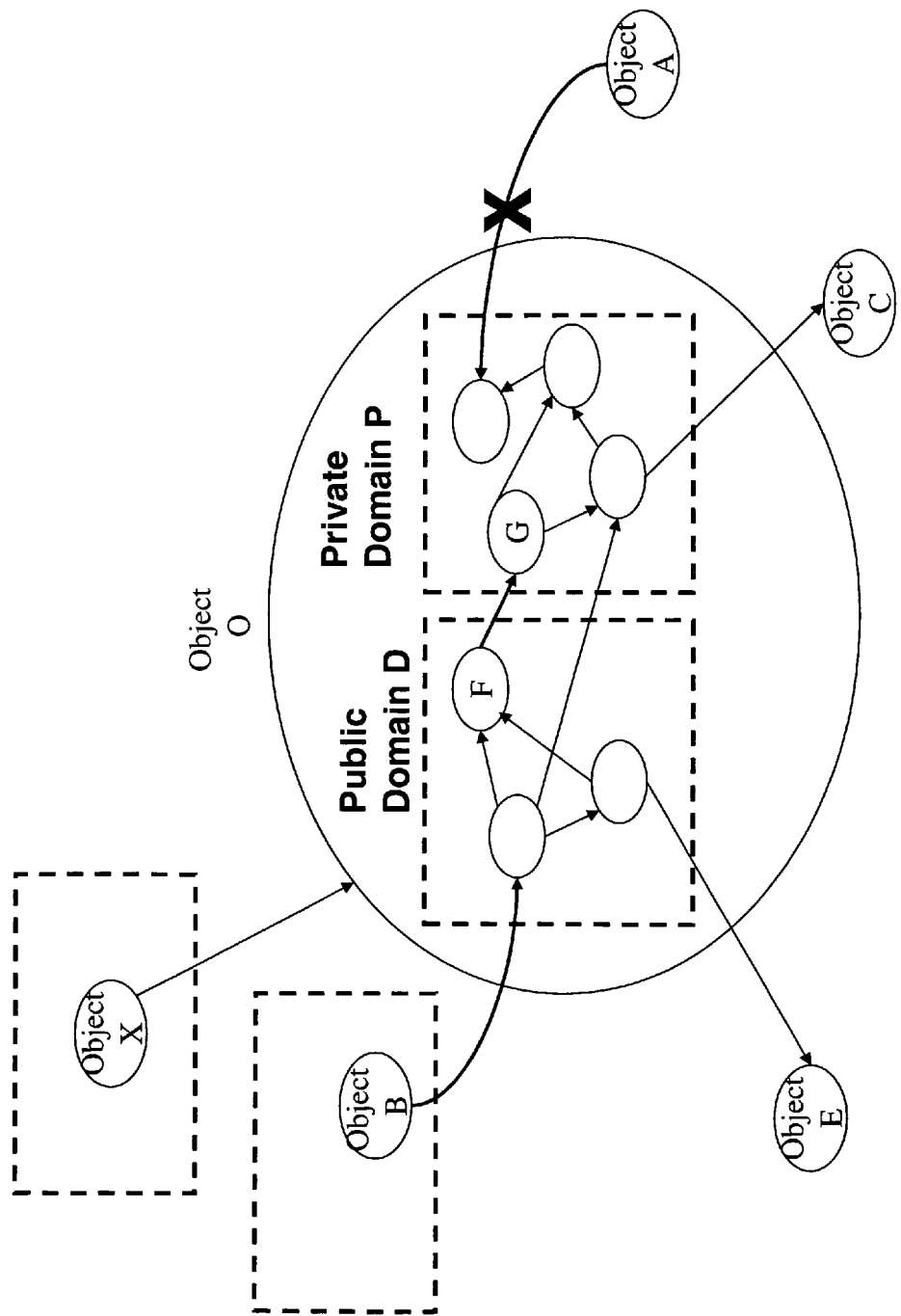
FIG. 3a illustrates one embodiment of ownership domains.

FIG. 3a shows object O declaring a private domain P and a public domain D. Another object B can access objects inside domain D. An object A cannot access objects inside domain P. But within object O, object F inside domain D can access object G inside domain P. Objects in both the public and the private domain can access external objects.

Ownership domains can enforce a strict owner-as-dominator discipline as follows: a) declare a domain as private; and b) do not declare a domain link from a formal domain parameter to a private domain [5]. In that case, the object is fully encapsulated.

Ownership domains generalize ownership types [D. Clarke, J. Potter, and J. Noble. Ownership Types for Flexible Alias Protection. In OOPSLA, 1998.], by separating the mechanism for dividing objects into hierarchical groups, and the policy for constraining references between objects in those groups. In previous ownership systems, ownership is a relation between objects, such that one object owns another. The ownership domains system generalizes this so that an object defines multiple domains in which other objects reside. For the purposes of the present invention, we consider the ownership relation in previous systems to be a special case of ownership domains in which there is a single distinguished domain declared per object, in which we place all the objects that in the previous system are are owned by the current object "this." The "this" variable, also called "self" in some computer programming languages, is used to refer to the current object, i.e. the receiver of a method.

Relevance to Architectures.

We propose a straightforward mapping between ownership domains and the architectural concepts we discussed earlier. Ownership domain annotations support abstract reasoning about data sharing by assigning each object in the runtime object graph to a single ownership domain.

The ownership domains declared at the top level map to the system's runtime tiers. Ownership domains declared within an object express a sub-architecture within the object, one that consists of other objects that represent its parts. This hierarchical containment relation enables architectural abstraction: the top-level domains may have only a few architecturally relevant objects, i.e., components. And each of those components can be made up of more objects representing subcomponents and so on, until low-level, less architecturally relevant objects are reached. No programming language has an explicit tier construct, but ownership domain annotations can express and enforce a tiered architecture in code [J. Aldrich and C. Chambers. Ownership Domains: Separating Aliasing Policy from Mechanism. In ECOOP, 2004.], [M. Abi-Antoun and J. Aldrich. Ownership Domains in the Real World. In IWACO, 2007.].

The annotations also describe policies that govern references between ownership domains. Objects within the same ownership domain can refer to one another. But references can only cross domain boundaries if there is a domain link between the two domains [J. Aldrich and C. Chambers. Ownership Domains: Separating Aliasing Policy from Mechanism. In ECOOP, 2004.]. Each object can declare a policy to describe the permitted aliasing among objects in its internal domains, and between its internal domains and external domains. ADLs typically express such policies using constraints.

In short, the annotations specify and enforce in code, architectural intent related to object encapsulation, logical containment (hierarchy), architectural tiers and object communication permissions.

EXAMPLE

FIG. 4a shows two classes with ownership domain annotations. In the description of the present invention, we use a simplified syntax similar to Java generics, but the concrete syntax uses existing language-support for annotations [M. Abi-Antoun and J. Aldrich. Ownership Domains in the Real World. In IWACO, 2007.]. Domain names are arbitrary (except for a few special annotations); we use capital letters to distinguish them from other identifiers.

A DataAccess instance holds Integer and Number objects that must be accessible to other objects that have access to it. So class DataAccess declares a public domain STATE and declares those objects inside STATE. In addition, DataAccess requires some environment state that it does not own, so it declares a domain parameter PENV. Domain parameter PENV declares a field v2, a reference to a list of Integer objects. The outer PENV annotation is for the list object itself; the inner PENV annotation is for the list elements, the Integer objects. Some other object of type UnitTest, which has the ENV domain, binds its ENV domain to DataAccess's PENV domain parameter so that both objects can share the same environment state.

Next, we use the ownership domain annotations to extract statically a sound runtime architecture of a system.

3 Analysis

The analysis uses one or more different intermediate representations to extract the runtime architecture. According to one embodiment, the present invention first builds an abstract graph, converts it into a runtime graph, and the runtime graph is used as the representation of the runtime architecture. According to another embodiment, the runtime graph is used as an intermediate representation and the runtime graph is used to build an Ownership Object Graph (OOG) (the OOG will also be referred to as a display graph). Other variations and embodiments are also possible with the present invention.

3.1 Abstract Graph

The abstract graph is created from the computer program for which a runtime architecture is to be created, as well as from containment information corresponding to the computer program. The abstract graph may be created from many forms of computer programs, such as, but not limited to, source code, executable code, and byte code. As will be described in more detail herein below, the abstract graph has nodes including types and objects, and the abstract graph has at least one edge connecting one node to another node (See FIG. 5(*a*)). The nodes connected by the edge may be the same node connected to itself, or the edge may connect different nodes. In addition to connecting nodes, the edges may also be between types, between objects, and between types and objects.

The abstract graph has the abstract domains declared in each abstract type. Each abstract domain represents fields and variables declared inside it as abstract objects. A visitor builds the abstract graph from the Abstract Syntax Tree (AST) of the annotated program (it must also account for certain characteristics discussed in Section 4).

Figure 4B:
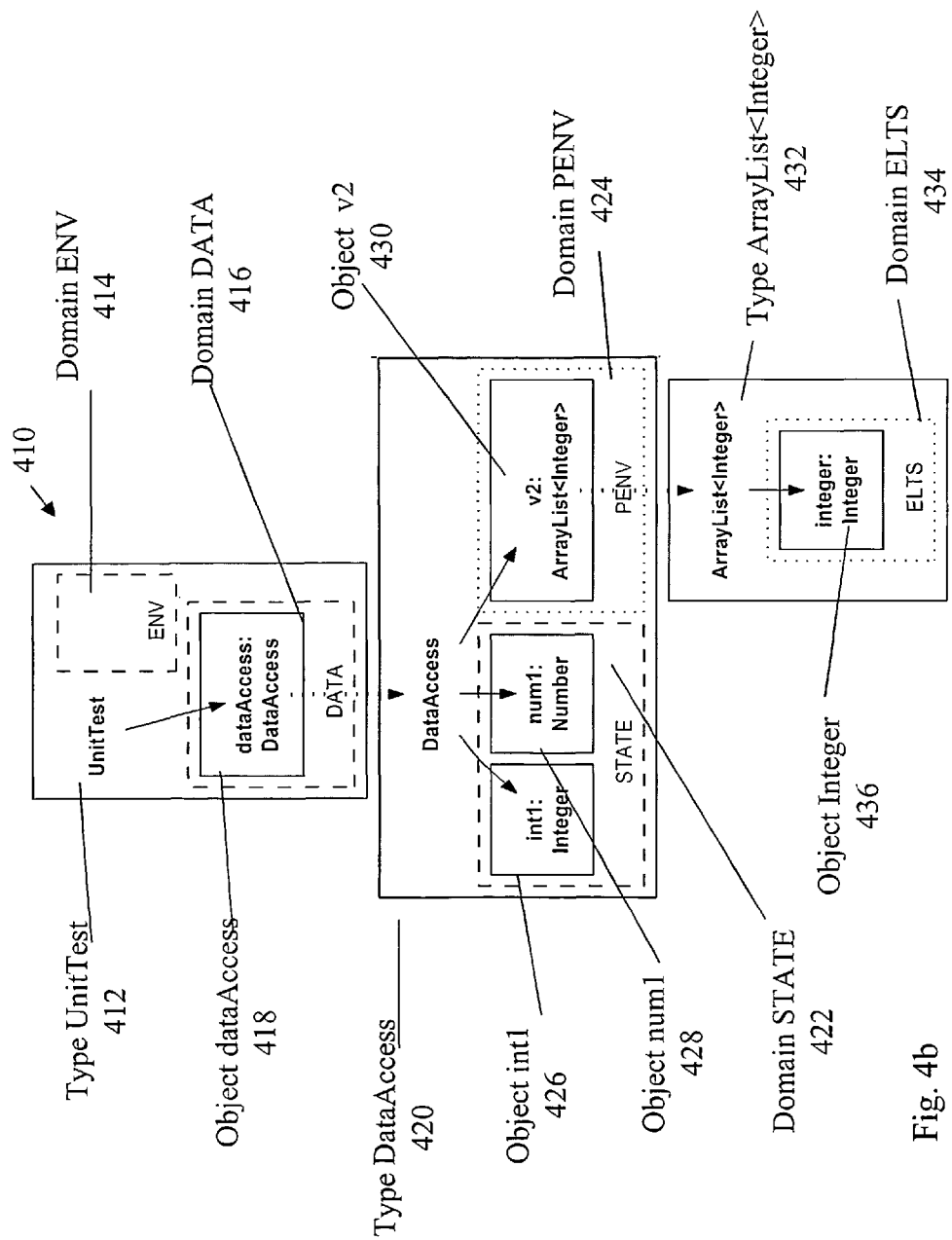
FIG. 4b illustrates an abstract graph for the DataAccess example.

FIG. 4*b* illustrates one embodiment of the abstract graph 410 of the DataAccess system. UnitTest, DataAccess, and ArrayList<Integer> each represent a type with white-filled domains (ENV, DATA, STATE, PENV, and ELTS) declared inside them, and grey objects declared inside each domain. A formal domain parameter such as PENV 424 has a dotted border. Actual ownership domains such as STATE 422 and ENV 414 have a dashed border. A thick dotted edge represents a type relationship (is-a). A solid edge represents a field reference (has-a).

The abstract graph 410 includes types, objects, and domains. UnitTest 412 is a type that declares two domains, ENV 414 and DATA 416. Domain DATA 416 declares object dataAccess 418 of type DataAccess 420. Type DataAccess 420 declares two domains, STATE 422 and PENV 424. STATE 422 is an actual domain that declares two objects, int1 426 of type Integer and num1 428 of type Number, respectively. PENV 424 is a formal domain parameter that declares an object v2 430 of type ArrayList<Integer> 432. Type ArrayList<Integer> 432 declares a formal domain parameter ELTS 434, that contains an object Integer 436 of type Integer. The declaration of ArrayList<Integer> 432 is based on java.util.ArrayList but is simplified. The types for Integer and Number are not shown. In some applications the abstract graph may adequate or useful in and of itself, while in other applications the abstract graph is only an intermediate step. For example:

No Instances.

An abstract graph is not hierarchical in the sense of an object having children. Rather, an abstract object has an abstract type, an abstract type has abstract domains, and an abstract domain has abstract objects. For example, abstract object dataAccess 418 has type DataAccess 420, and abstract type DataAccess 420 has domains STATE 422 and PENV 424, and abstract domain STATE 422 contains the abstract object int1:Integer 426.

Aliasing Unaware.

An abstract graph does not reflect possible aliasing. The ownership domains type system guarantees that two objects in different domains can never alias, but two objects in the same domain may alias. As discussed in Section 2.1, if two objects could be aliased, the architecture must show them as one. In abstract graph 410 above, int1:Integer 426 and num1:Number 428 in the STATE domain 422 may refer to the same object.

Incomplete.

An abstract domain in an abstract graph does not directly show all the objects that are in a given domain. It contains abstract objects only for the locally declared fields. E.g., the abstract graph 410, DataAccess 420 declares its v2:ArrayList field 430 in its domain parameter PENV 424. Such non-local fields do not appear where the domain is declared. Hence, the empty ENV 414 domain inside UnitTest 412.

So the analysis converts an abstract graph into a runtime graph to approximate the true runtime object graph (ROG). We will explicitly refer to the true runtime object graph (ROG) to avoid confusion with the runtime graph. A dynamic analysis take the runtime graph as input and does not have to compute it.

3.2 Runtime Graph

Figure 5:
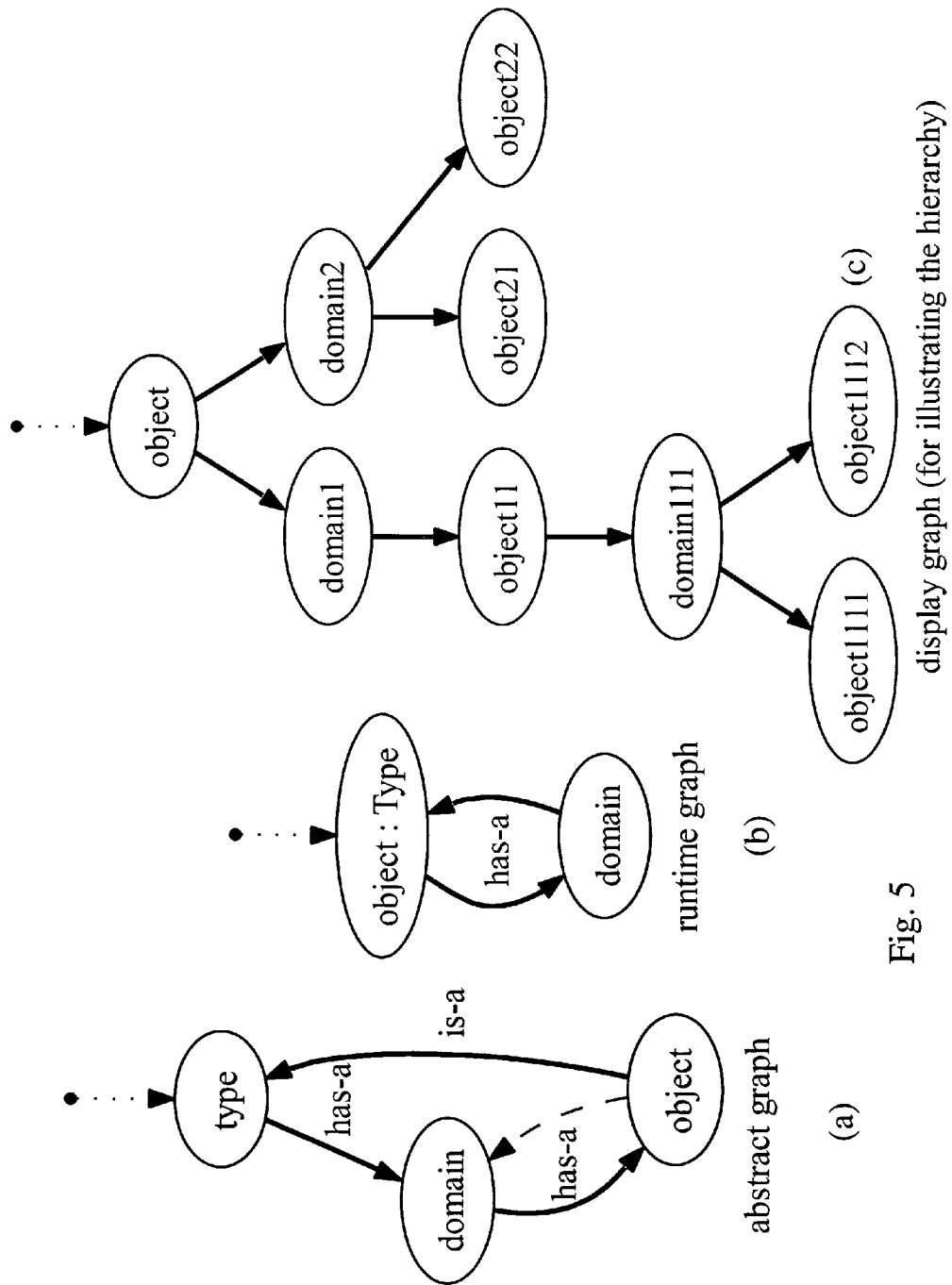
FIG. 5a illustrates one embodiment of an abstract graph.
FIG. 5b illustrates one embodiment of a runtime graph.
FIG. 5c illustrates one embodiment of a display graph.
FIG. 5d illustrates an abstract graph for the QuadTree example.
FIG. 5e illustrates a runtime graph for the QuadTree example.
FIG. 5f illustrates a display graph for the QuadTree example.
Figure 5:
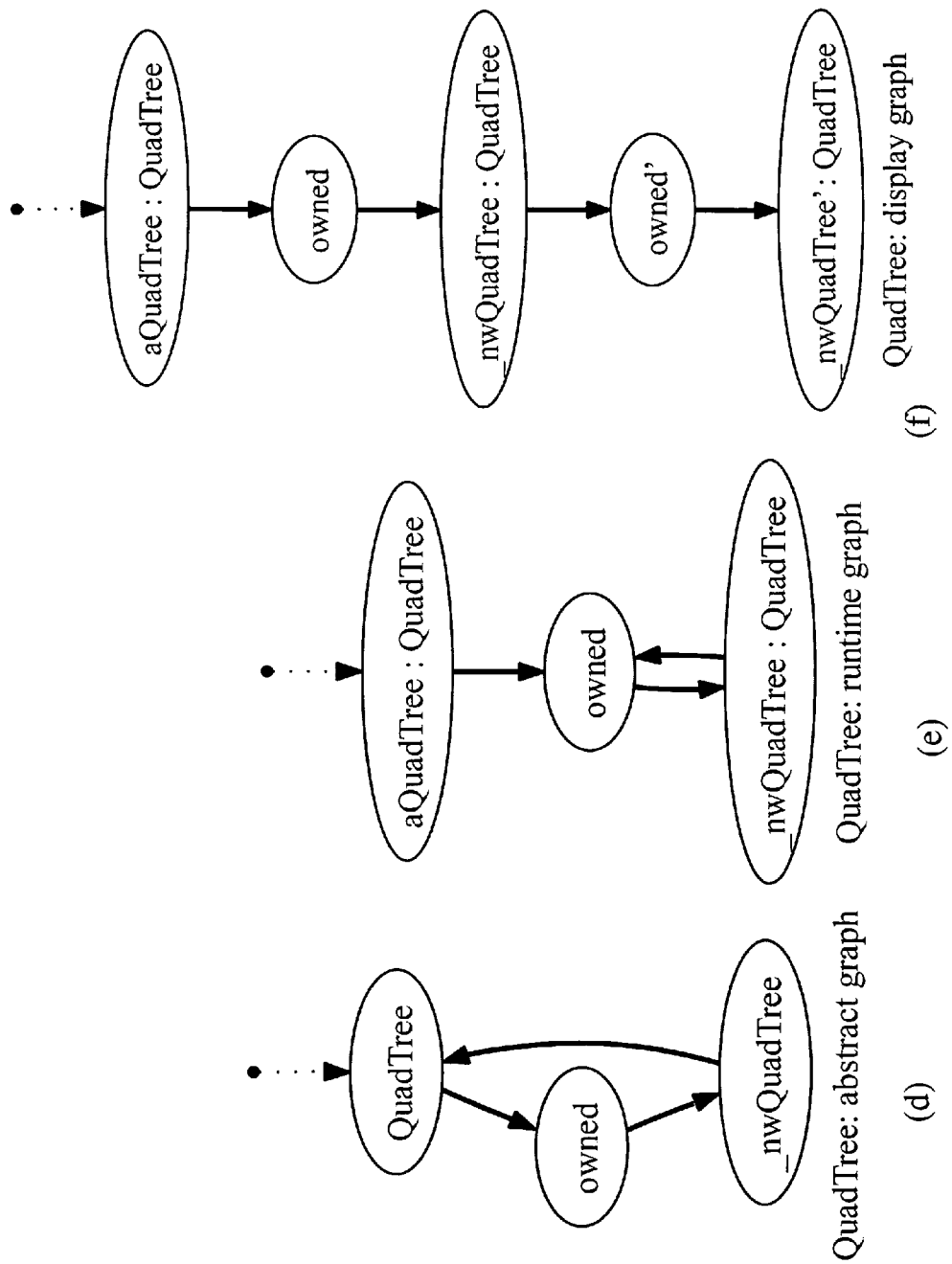

A runtime graph is created from an abstract graph and it includes at least one object including information from at least one of the types in the abstract graph (See FIG. 5(*b*)).

The runtime graph may be created, for example, by creating a runtime object from an object type and a containing object type, and by creating a containment edge associated with one or more runtime objects. In other words, creating a containment edge with two endpoints, wherein each endpoint is associated with a runtime object. The endpoints of the containment edge may both be associated with the same runtime object, or the containment edges may be associated with different runtime objects.

For example, one containment edge may be associated with runtime object A, and the other containment edge may be associated with runtime object B, and runtime objects A and B may be the same runtime object or different runtime objects. Creating a containment edge may, for example, include creating a containment edge between runtime object A and runtime object B (which may be the same runtime object or different runtime objects) when the type corresponding to runtime object A in the abstract graph contains the abstract object corresponding to runtime object B.

In other words, a runtime graph instantiates the types in an abstract graph and shows only objects and domains. Each runtime object contains runtime domains and each runtime domain contains runtime objects. Thus, in a runtime graph, one can view the children of an object without going through its declared type. Furthermore, to support the goals in Section 2.1, a runtime graph must address object merging, object aliasing, object pulling and object edges. We discuss each one in turn.

Figure 3B:
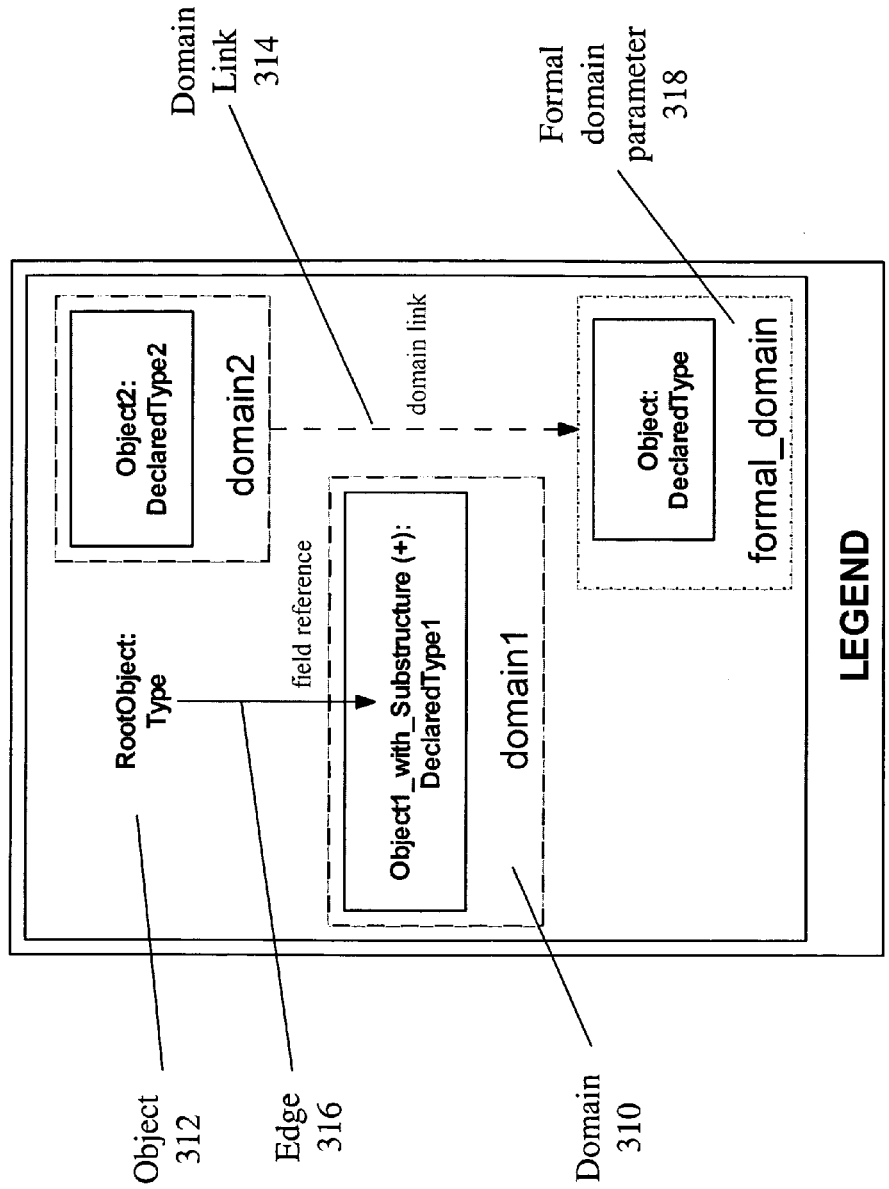
FIG. 3b illustrates the legend used to represent ownership domains.

We represent ownership domains as in FIG. 3*b*. A dashed border white-filled rectangle represents an actual ownership domain 310. A solid border grey-filled rectangle with a bold label represents an object 312. A dashed edge represents a link permission 314 between two ownership domains. A solid edge represents a creation, usage, or reference relation 316 between two objects. A dotted border white filled rectangle represents a formal domain 318. An object labeled "obj: T" indicates an object of name "obj" and type T as in UML object diagrams. The symbol (+) is appended to an object's label when its substructure is elided, as will be discussed later.

Figure 6A:
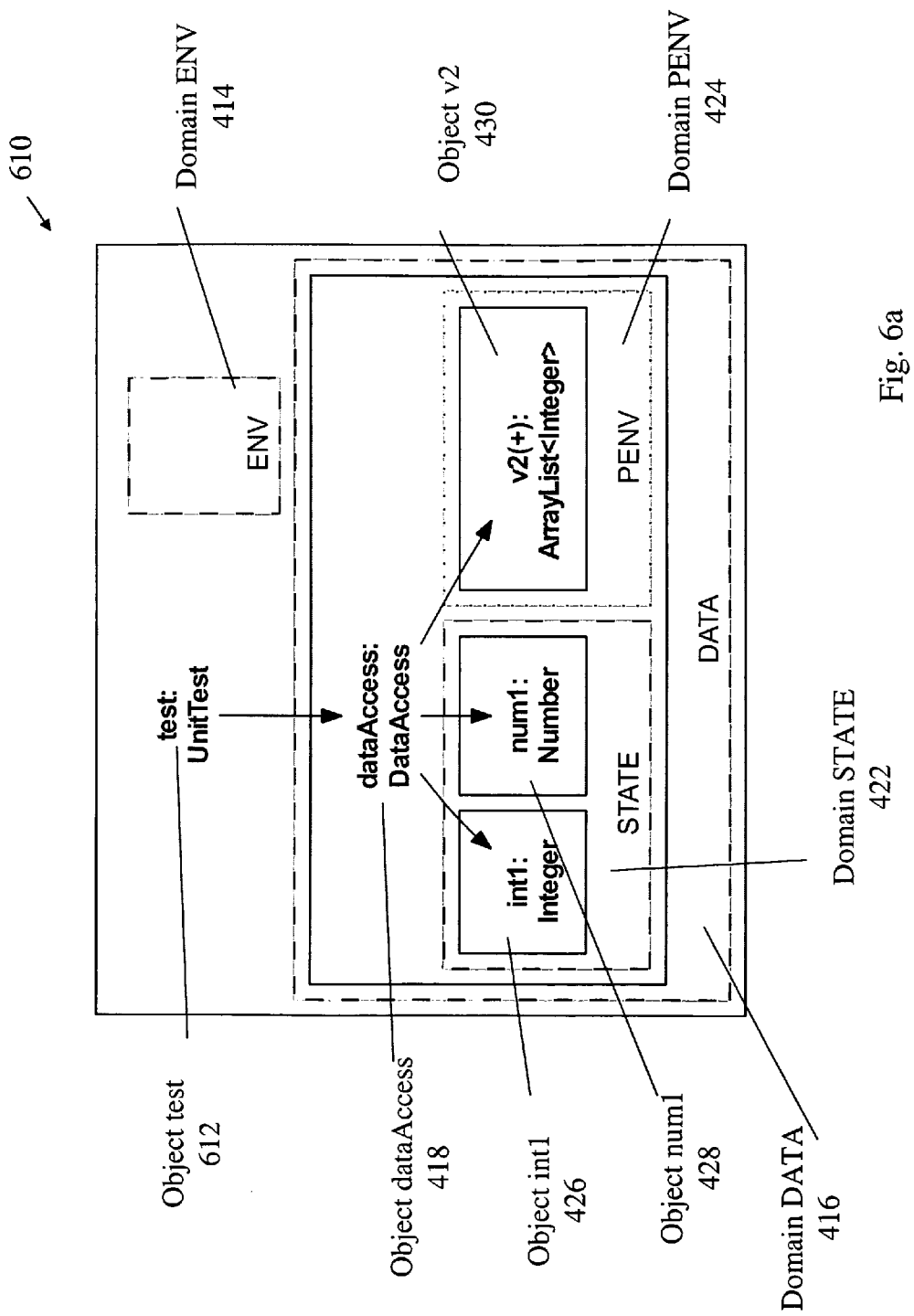
FIG. 6a illustrates a partial runtime graph for the DataAccess example without merging and without pulling.

Before discussing merging and pulling, we discuss FIG. 6a which illustrates one embodiment of a partial runtime graph 610 for DataAccess OOG without merging and without pulling. Object test 612 is an instance of the UnitTest type (412 in FIG. 4b) from the abstract graph 410. Object test 612 declares two domains DATA 416 and ENV 414. Domain DATA 416 contains an object dataAccess 418 of type DataAccess. Object dataAccess 418 declares two domains, STATE 422 and PENV 424. Domain STATE 422 contains two objects, int1 426 and num1 428. The formal domain parameter PENV 424 contains an object v2 430. In this intermediate representation 610, objects Int1 426 and num1 428 are not merged yet, even though they may alias because Integer is a subtype of Number. In addition, object v2 430 is not yet pulled from the formal domain parameter 424. Merging, Aliasing, and Pulling will now be discussed.

Object Merging.

Different executions may generate a different number of objects, but an architecture must represent all possible executions. To address this, a runtime graph summarizes multiple runtime objects with a canonical runtime object. Further, exactly one object in a runtime graph represents each object in the ROG.

Figure 7:
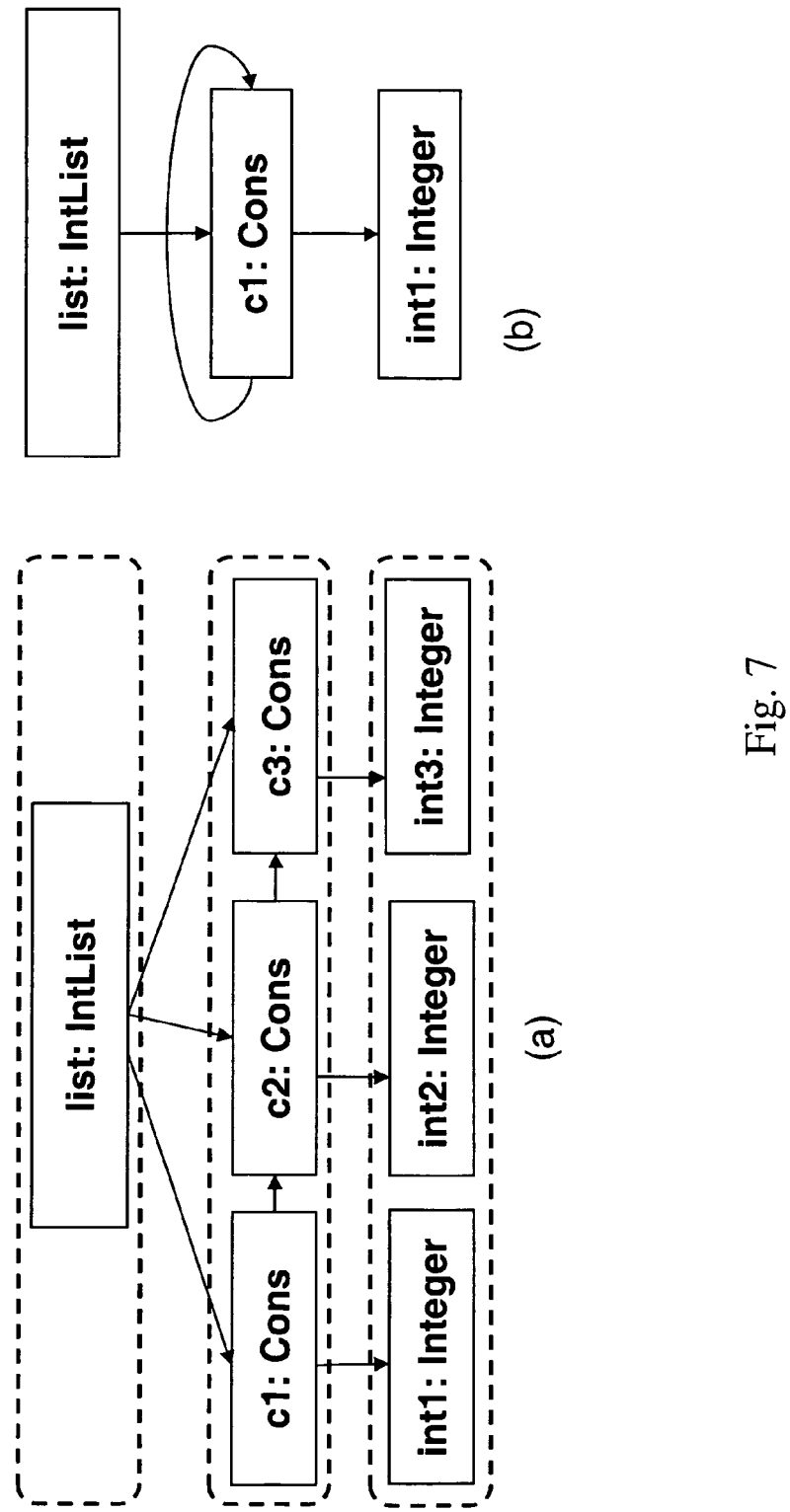
FIG. 7a illustrates an output of a dynamic analysis on an IntList example.
FIG. 7b illustrates object summarization on an IntList example.
FIG. 7c illustrates an OOG for an IntList example.
FIG. 7d illustrates summary edges for an IntList example.
Figure 7:
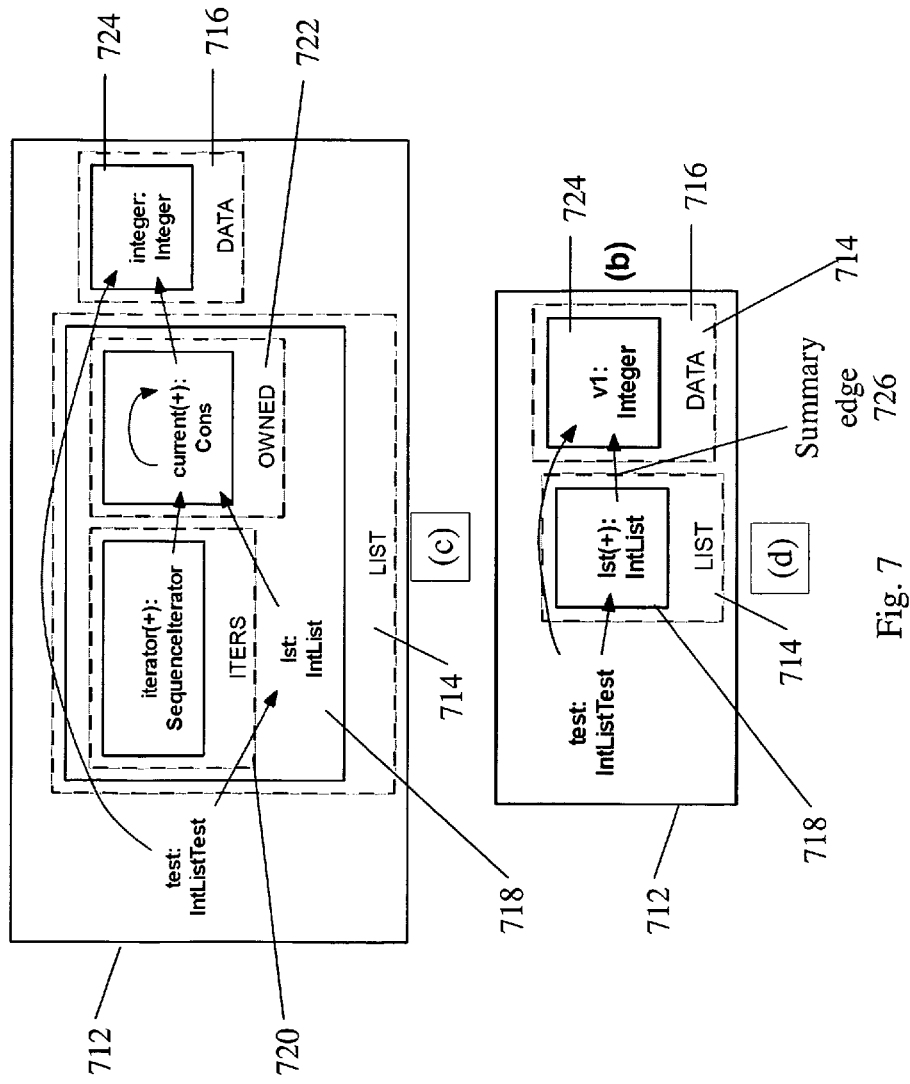

For instance, a dynamic analysis might display individual cells in a linked list of Integer objects, as cons1:Cons, cons2:Cons, as shown in FIG. 7(a). In our approach, all the Cons cells would get unified into a cons1:Cons object and a self-edge would represent the reference to the next cell, as shown in FIG. 7(b).

Object Aliasing.

What about Aliasing? When converting abstract objects from the abstract graph into runtime objects, the analysis merges two abstract objects in the same domain, if their types are related by inheritance. The ownership domains type system guarantees that two objects in different domains can never alias.

Figure 6B:
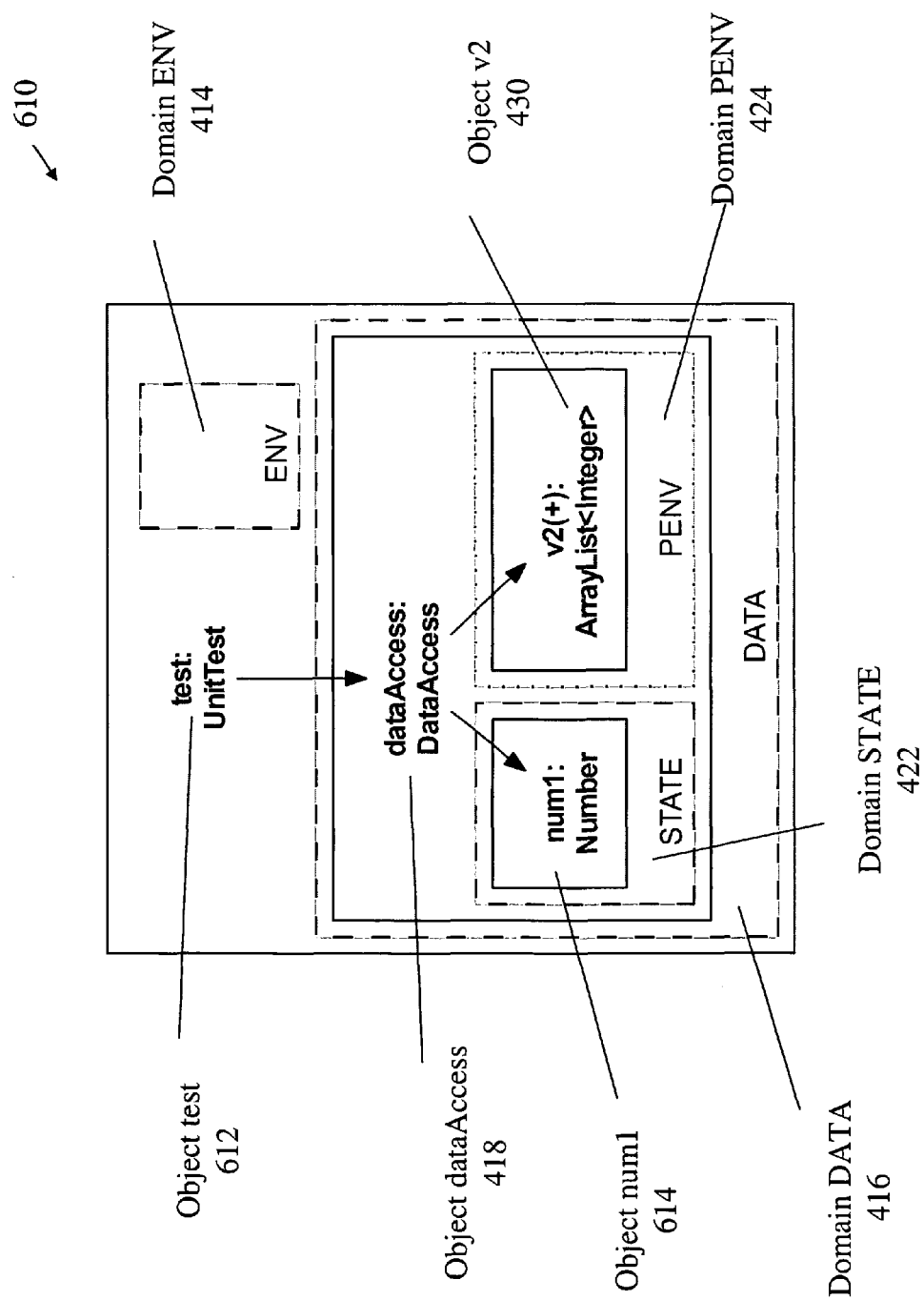
FIG. 6b illustrates a partial runtime graph for the DataAccess example with merging but without pulling.

FIG. 6b illustrates another embodiment of the runtime graph 610 for the annotated code in FIG. 4a in which two objects are merged. One runtime object 614, labeled with num1:Number, merges the abstract objects int1 and num1 (shown as 426 and 428, respectively, in FIG. 4b) in domain STATE 422. The merging is performed because Integer is a subtype of Number. The runtime graph 610 still shows object v2 430 in its formal domain parameter PENV 424, before it is pulled.

Object Pulling.

How to handle ownership domain parameters? For soundness, each runtime object that is actually in a domain must appear in that domain in the runtime graph. To ensure this property, an abstract object declared inside a formal domain is pulled into each actual domain that is bound to the formal domain parameter. The term pulling generally means copying (i.e., not moving) an object from one domain to another.

Figure 6C:
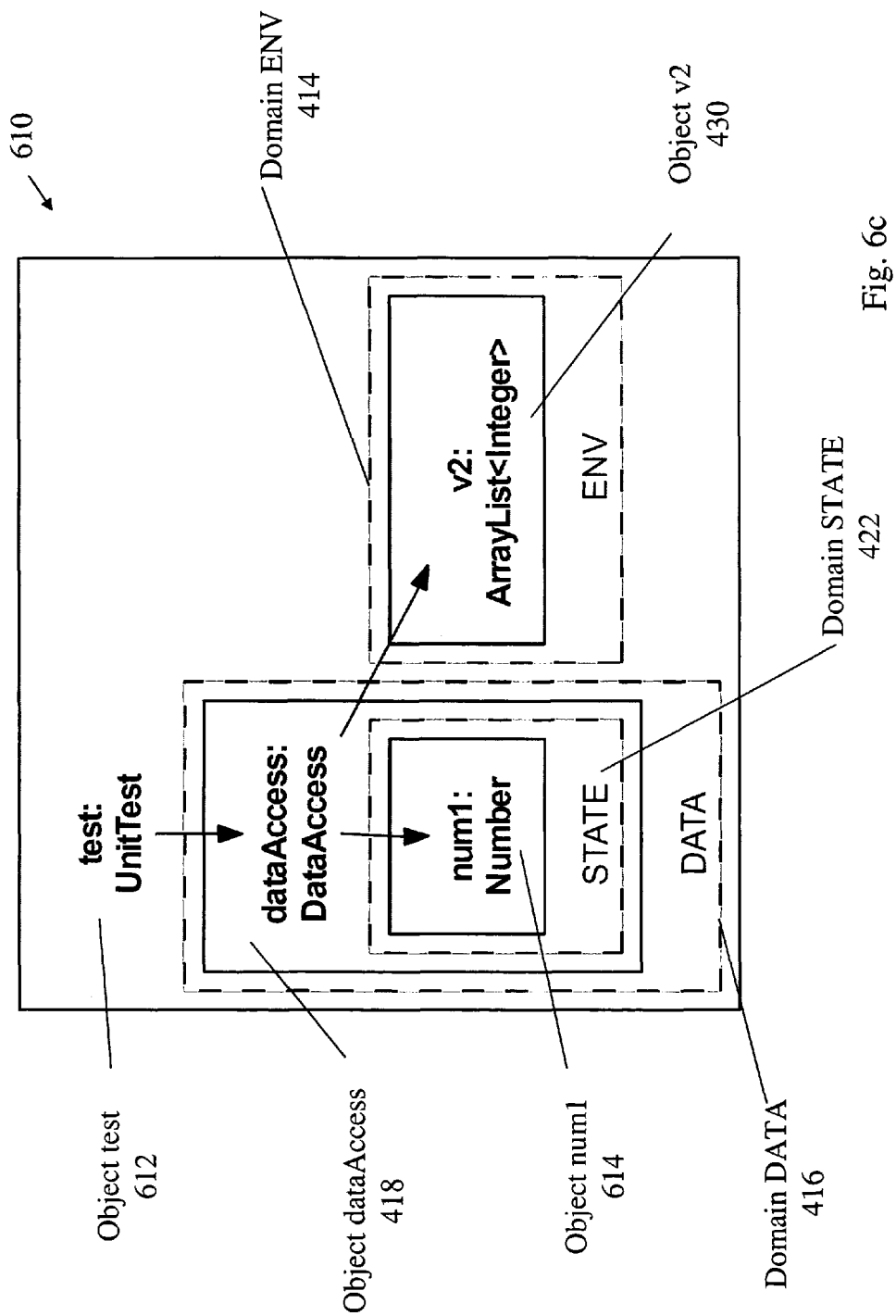
FIG. 6c illustrates a partial runtime graph for the DataAccess example with merging and with pulling.

FIG. 6c illustrates another embodiment of the runtime graph 610 with merging and with pulling. Object v2 430 was pulled from the formal domain parameter PENV (424 in FIG. 4b) to the actual domain ENV 414 in object test 612. This figure no longer displays the PENV formal domain parameter (424 in FIG. 4b) for clarity. Stated another way, FIG. 6b shows object v2 430 in the formal domain parameter PENV (dotted border 424 in FIG. 4b). In FIG. 6c, object v2 430 is pulled from the formal domain parameter PENV (shown as 424 in FIG. 4b) to the actual domain ENV 414 in UnitTest (the former is bound to the latter using the annotation DataAccess<ENV> in FIG. 4a). In most cases, we elide formal domains after pulling, so FIG. 6c no longer displays PENV (424 in FIG. 4b). Similarly, an ArrayList<Integer> object 430 has a domain parameter ELTS that contains Integer objects; those get pulled from ELTS into ENV (See FIG. 10).

Object Edges.

Finally, the analysis adds field reference edges to the RuntimeGraph 610, shown as solid edges in FIG. 6c. For instance, DataAccess declares the two fields int1 and num1 in domain STATE. Objects Int1 and num1 were merged so there is a field reference edge from a DataAccess object to the merged object. It is also possible to add usage edges that show field accesses or method invocations.

3.3 Ownership Object Graph (OOG) (Display Graph)

A display graph (also referred to as the OOG) is a hierarchical, depth limited representation of a runtime graph (See FIG. 5(c)). The degree to which the display graph is depth limited can vary depending on the particular needs and the particular applications of the invention. In other words, the depth of the display graph may be greater than or less than that described herein. Furthermore, in some embodiments, the display graph is not depth-limited, such as when there are no recursive types.

A runtime object can contain itself, so the runtime graph must represent a potentially unbounded ROG with a finite representation. For example, consider a class QuadTree that declares several fields of type QuadTree in its owned domain (owned is a default private domain that need not be declared [J. Aldrich and C. Chambers. Ownership Domains: Separating Aliasing Policy from Mechanism. In ECOOP, 2004.]):

class QuadTree {
owned QuadTree_nwQuadTree;
. . .
}

Since there is a unique canonical object for each type in each domain, the object representing QuadTree in domain owned must also represent the child object of type QuadTree in the owned domain of the parent; it is therefore its own parent in this representation. A finite representation is essential to ensure that the analysis terminates. But, in a hierarchy, no object is its own parent. So the analysis creates the OOG as a finite depth-limited unrolling of the runtime graph. In the example above, we show one QuadTree object within another, down to a finite depth.

FIGS. 5(d), 5(e) and 5(f) show the abstract graph, the runtime graph and the display graph for the QuadTree example.

Cycle Detection.

To break the recursion in the runtime graph, the analysis that generates the OOG stops when, from a given runtime object, it reaches the same runtime object a second time. Unlike the runtime graph, the OOG is a strictly hierarchical structure.

Edge Summaries.

The OOG is depth-restricted but must still show all relations that exist at runtime. Merely truncating the recursion may fail to reveal all relations. For instance, child objects in a hierarchy may have fields that point to external objects, and the child objects may be beyond the visible depth. The analysis automatically adds summary edges from the parent objects to those external objects.

If the user-specified projection depth is d, the analysis projects the runtime graph to a depth of d+n in order to produce summary edges that are due to the nodes below the cutoff depth. Because of the regularity of the projection technique, we hypothesize that: for any graph, there is a fixed depth n that is sufficient to produce all such summary edges, and thus to produce a sound display graph. However, we do not yet have a proof of this nor a way of calculating the constant n.

For example, consider a list of Integer objects in FIG. 7(c). Object test 712 contains two domains, LIST 714 and DATA 716. Domain LIST 714 declares object 1st 718, a list of Integer objects of type IntList. Object IntList has a public domain ITERS 720 for its iterators and a private domain OWNED 722 to hold the representation of the linked list. The DATA domain 716 contains the list elements, i.e., Integer objects. After pulling, the head of the list current refers to an Integer object 724 in the DATA domain 716 containing the list elements. (This is a canonical example to evaluate an ownership type system's expressiveness; the annotated code is in the ownership domains paper [J. Aldrich and C. Chambers. Ownership Domains: Separating Aliasing Policy from Mechanism. In ECOOP, 2004.]).

In FIG. 7(d), the projection depth is reduced to elide the substructure of IntList 718. The analysis adds a summary edge 726 from the IntList object 718 to the pulled Integer object 724. The symbol (+) is appended to the object's label.

Recapitulation.

The OOG is a graph with two types of nodes, objects and domains. The nodes form a hierarchy where each object node has a unique parent domain and each domain node has a unique parent object. The root of the graph is a top-level domain. There are two edge types. Edges between objects correspond to field reference or usage relations. Edges between domains correspond to domain links.

Finally, the OOG handles object merging, object aliasing and object pulling. Compared to earlier definitions of object graphs [J. Potter, J. Noble, and D. Clarke. The Ins and Outs of Objects. In *Australian Softw. Eng. Conf.*, 1998.], the OOG explicitly represents domains (sometimes called "clusters") of objects and edges between these domains (sometimes called "domain links"). In contrast to other object ownership hierarchies [T. Hill, J. Noble, and J. Potter. Scalable Visualizations of Object-Oriented Systems with Ownership Trees. *J. Visual Languages and Computing*, 13(3), 2002.], [A. Potanin, J. Noble, and R. Biddle. Checking Ownership and Confinement. *Concurrency and Computation: Practice and Experience*, 16(7), 2004.], in an OOG, the owner of an object is a domain not another object.

Finally, in the description of the present invention, we sometimes elide the root domain and root object from the displayed OOGs for readability. Often times, the root object is an instance of a fake class whose sole purpose is to declare the top-level domains [M. Abi-Antoun and J. Aldrich. Ownership Domains in the Real World. In *IWACO*, 2007.].

Figure 6D:
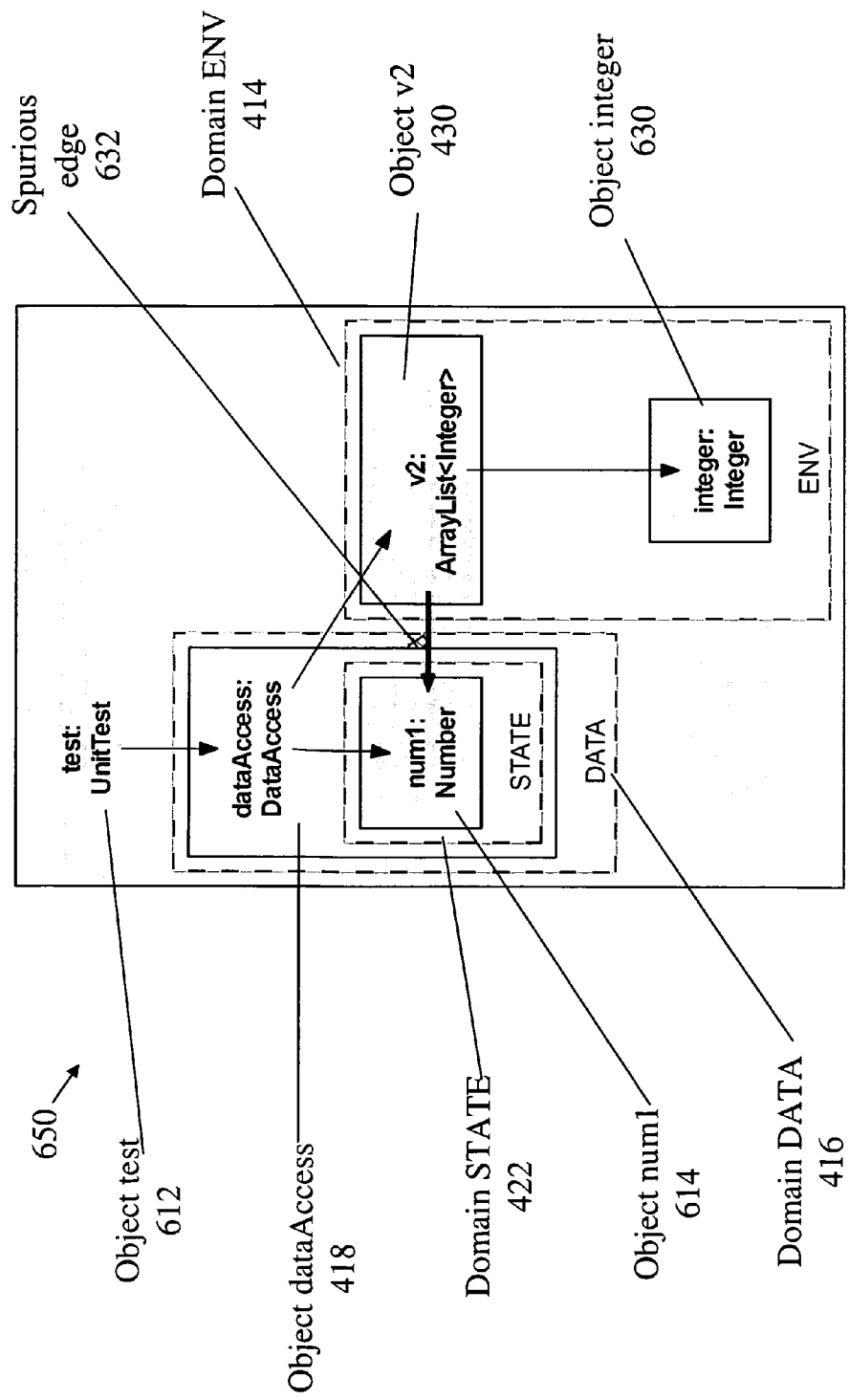
FIG. 6d illustrates the complete OOG for the DataAccess example.

FIG. 6d illustrates one embodiment of the complete dataAccess OOG or display graph 650. In addition to the domains and objects previously discussed, the ENV domain 414 declares an object Integer 630. Object Integer 630 was pulled from the ELTS formal domain parameter (424 in FIG. 4b) to the ENV domain 414. The bold edge 632 marked with the symbol X is an example of an edge that is not added, even though Integer 430 is a subtype of Number 614 because the ELTS formal domain parameter (424 in FIG. 4b) is not bound to the STATE domain 422. This makes OOG edges more precise than those obtained by superimposing field reference edges based on the associations in a class diagram.

3.4 Rewriting Rules

In this section, we formally describe the analysis. We use a labeled record notation for the data type declarations of the AbstractGraph and the RuntimeGraph (FIGS. 8a-8c). In particular, FIGS. 8a-8c illustrate data type declarations and rewriting rules to convert an AbstractGraph into a RuntimeGraph. We use ( . . . ) for a tuple, {o . . . } for a set and [d . . . ] for a sequence. We use <: to denote standard subtyping. We sometimes qualify a domain d by the type T that declares it as T::d. We describe the algorithm to construct a RuntimeGraph from an AbstractGraph using small-step rewriting rules (FIGS. 8a-8c). We refer to each rule by name in the description (using SMALL CAPS).

To help keep the representations distinct, we use English letters (o, d, . . . ) for elements of the AbstractGraph and Greek letters (θ, . . . ) for elements of the RuntimeGraph. The AbstractGraph consists of the AbstractTypes in the program, the AbstractDomains declared in each type and the AbstractObjects declared in each domain. Each AbstractObject maintains bindings, each from a formal to an actual domain, shown as $(d_{format} \rightarrow d_{actual})$ to avoid ambiguity.

To avoid extra copying, we directly add AbstractDomains to the RuntimeGraph. A RuntimeObject knows what AbstractDomain owns it and maintains a set of AbstractObjects it merges. Given the list of all RuntimeObjects ({$o_i$ . . . }, d) in the RuntimeGraph, the RuntimeObjects that are in a given AbstractDomain $d_x$ are those that have $d=d_x$.

The analysis obtains the AbstractDomains inside a RuntimeObject θ from each AbstractObject $o_i$: $T_i$ that θ merges, the declared AbstractType $T_i$ of each $o_i$, and each AbstractDomain $d_j$ that $T_i$ declares.

The RuntimeGraph keeps track of all RuntimeObjects and RuntimeEdges generated to date. The algorithm works by applying these rules until it can no longer generate new facts, i.e., RuntimeObjects and RuntimeEdges. Some rules remove existing facts using a replacement operation. Despite this non-monotonicity, the algorithm is stable because rule preconditions prevent regenerating facts that have been replaced.

For a given input, the rules will always produce the same output, regardless of the (potentially non-deterministic) order in which the re-write rules are applied. A different execution of the algorithm may produce a graph that is labeled differently because an object might have multiple types, and one of those types is picked as the label. Thus, determining that two outputs of the method are the same is a graph homomorphism problem.

Objects and Domains.

The analysis takes as inputs a top-level AbstractDomain $d_{root}$ and a top-level AbstractObject $o_{root}$. Since all the AbstractDomains are represented in the RuntimeGraph, the analysis converts AbstractObjects into RuntimeObjects, starting with $o_{root}$.

Rule R-AUX-COMPAT defines type compatibility: the first two disjuncts are necessary to handle potential aliasing, the third disjunct is a heuristic which we discuss in Section 4.2 and can be turned off.

Before creating a RuntimeObject for an AbstractObject o of type t in AbstractDomain d, the analysis checks if d already has a RuntimeObject θ of type t' where t and t' are compatible according to R-AUX-COMPAT. If not, the analysis creates a new RuntimeObject (R-NEW-OBJECT), which we represent as θ=({o . . . }, d). If a RuntimeObject θ exists, i.e., θ=({$o'_{id}$ . . . }, d), then the analysis replaces θ with a new RuntimeObject that also merges o, i.e., θ=({$o'_{id}$ . . . }, d), using Rule R-MERGE-OBJECTS.

An object about to be created in a domain may have a type that is compatible with two existing RuntimeObjects that are not compatible with each other. In this case, the new object merges (nondeterministically) with one of the existing objects, and then merges with the other using R-MERGE-EXISTING. This fixes an unsoundness triggered by multiple interface inheritance in our earlier algorithm [M. Abi-Antoun and J. Aldrich. Compile-Time Views of Execution Structure Based on Ownership. In *IWACO*, 2007.]. For example, consider the following: $\theta_{Tool} = (\{o_{Tool}, o_{VCL}, \ldots\}, d_C)$ and $\theta_{Cmd} = (\{o_{Cmd}, o_{VCL}\}, d_C)$ with $o_{Cmd}$: Command, $o_{Tool}$: Tool and $o_{VCL}$: VCL Command <: VCL and Tool: VCL but neither Tool <: Command nor Command <: Tool. In JHotDraw, VCL=ViewChangeListener and $d_C$=Controller. R-MERGE-OBJECTS replaces $\theta_{Tool}$ and $\theta_{Cmd}$ with $\theta_{ToolCmd} = (\{o_{Cmd}, o_{Tool}, o_{VCL}, \ldots\}, d_C)$.

Figure 9:
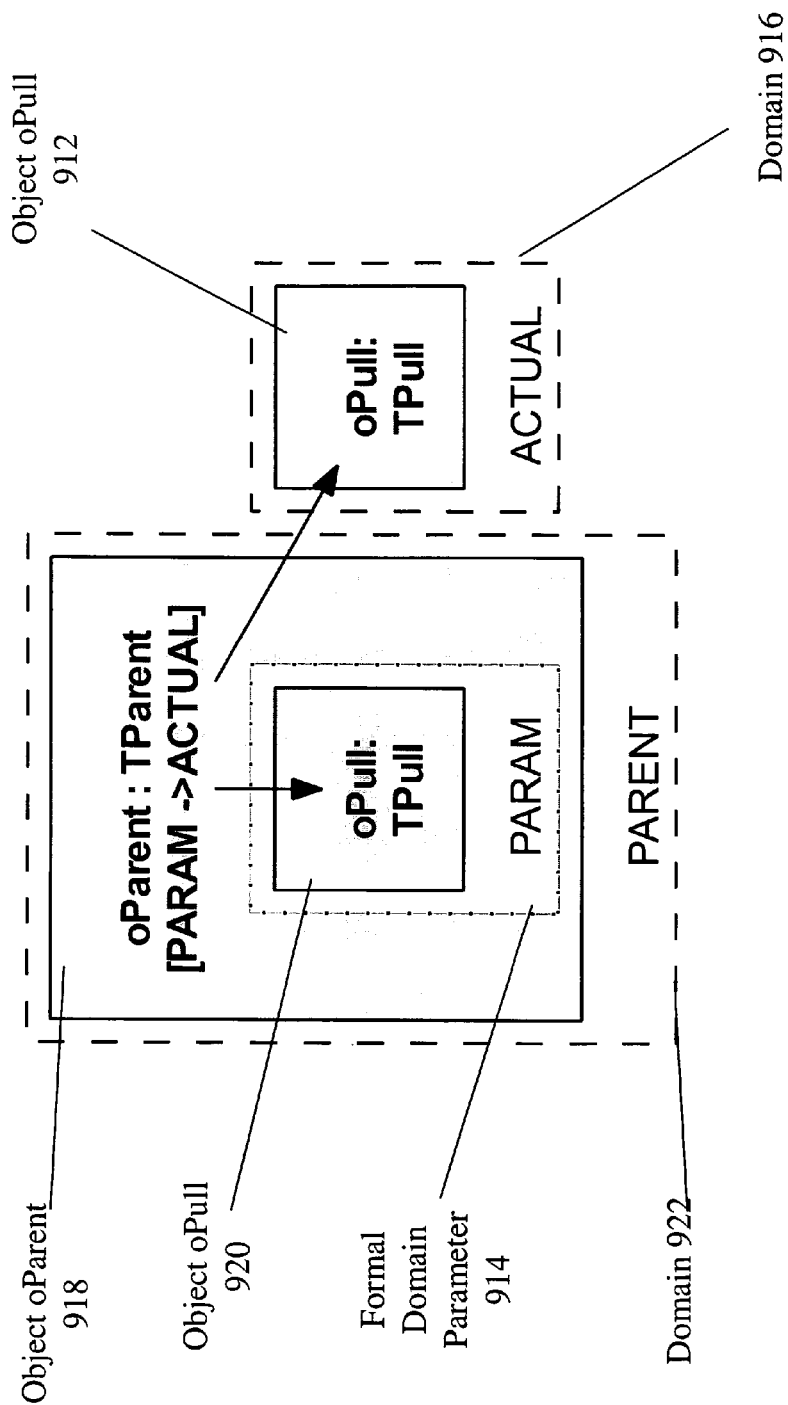
FIG. 9 illustrates the pulling rule.

Finally, the analysis pulls up each RuntimeObject $\theta$ from its owning formal domain $d_f$ into a domain $d_a$ that is bound to $d_f$ (R-PULL-OBJECT), again replacing RuntimeObjects as necessary. FIG. 9 illustrates the rule. In particular, FIG. 9 illustrates the pulling operation. Object oPull 912 is pulled from the formal domain parameter PARAM 914 to the domain ACTUAL 916. The binding information, shown between brackets, binds the formal domain parameter PARAM 914 to the domain ACTUAL 916, and is retrieved from object oParent 918, one of the ancestors of object oPull 920. The domain ACTUAL 916 can be the same as the domain PARENT 922, in which case, object oPull 920 becomes a peer of oParent 918.

Edges.

Because a RuntimeObject may get replaced, a RuntimeEdge is defined as a source path, a source type, a target path and a target type—rather than source and target RuntimeObjects in our earlier pseudocode [M. Abi-Antoun and J. Aldrich. Compile-Time Views of Execution Structure Based on Ownership. In *IWACO*, 2007.]. A path is a sequence of type-qualified domains to traverse to locate an object.

Figure 10:
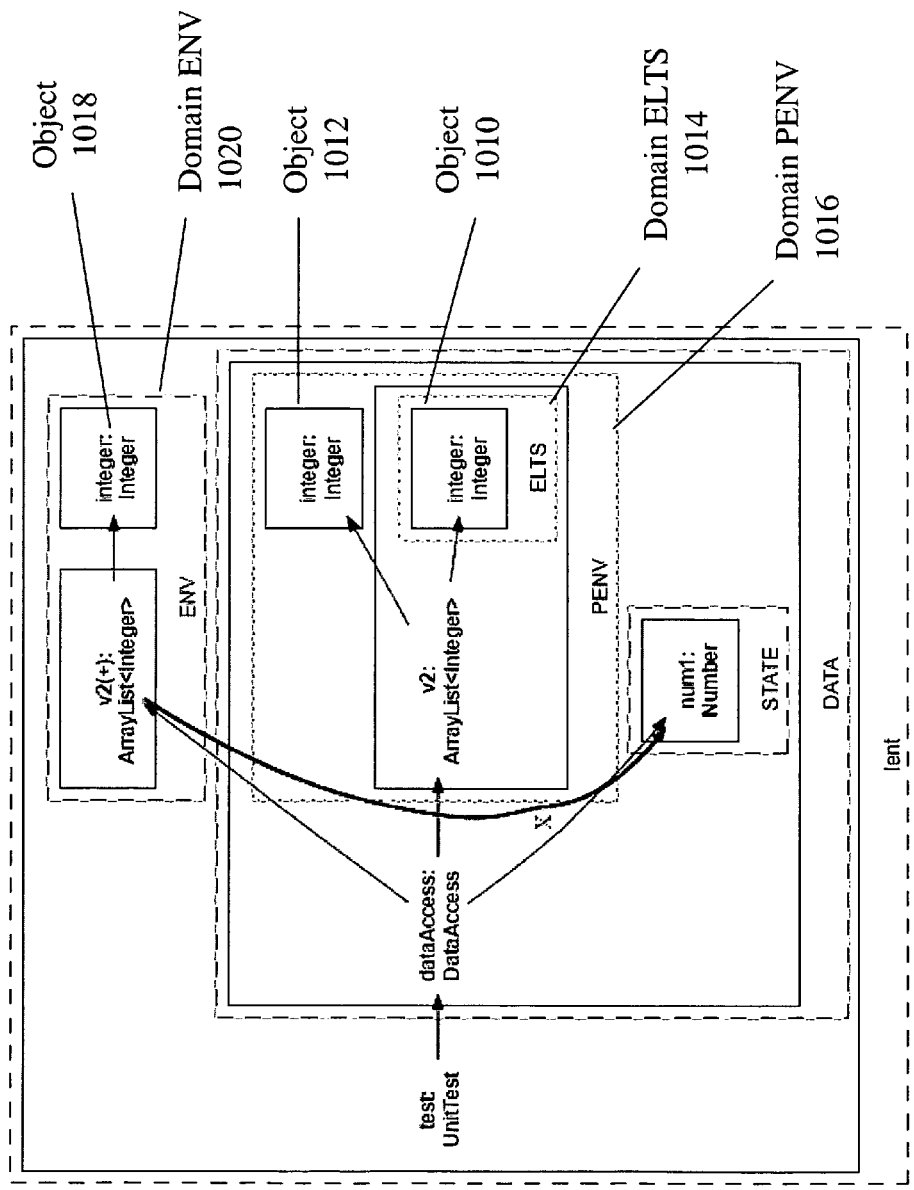
FIG. 10 illustrates the DataAccess OOG with formal domains.

FIG. 10 shows the DataAccess OOG with more formal domains, to illustrate transitive pulling. Object 1010 is in the formal domain parameter ELTS 1014. Object 1012 was pulled from the formal domain parameter ELTS 1014 into the PENV formal domain 1016 parameter since ELTS 1014 is bound to PENV 1016. In turn, Object 1018 was pulled from the formal domain parameter PENV 1016 to the actual domain ENV 1020.

In FIG. 10, the path [::lent,UnitTest::DATA] and the type DataAccess uniquely identify the dataAccess object. For soundness, when creating the OOG, the analysis adds an edge from or to each object in the source or target path that is type compatible with the source or target type (using R-AUX-COMPAT).

The judgement for creating a RuntimeEdge is of the form originObject@[ . . . ]$_{src}$→[ . . . ]$_{dest}$. First, Rule R-NEW-EDGE creates a new RuntimeEdge by prefixing both the source and the destination paths with the owning domain. Rules R-PATH-SUBST-L and R-PATH-SUBST-R substitute formals with actuals in the paths based on the binding information in the origin RuntimeObject. Finally note that a RuntimeEdge can have shorter domain paths as a result of the substitution.

Edges and Path-Dependent Domains.

The ownership domains type system allows path-dependent annotations that are of the form obj1.obj2 . . . DOMAIN, where obj1, obj2, etc., are chains of final fields or variables, and DOMAIN is a public domain declared on the type of the last object in the path. Handling these path-dependent domains requires extending the formal system to define a Binding as a mapping from a formal AbstractDomain to a sequence of AbstractDomains instead of a single AbstractDomain, in order to generate longer paths for RuntimeEdges. We did not include this feature into the core formal system for simplicity, but extending the data structures and the rules is straightforward.

Domain Links.

The analysis adds to the runtime graph RuntimeLinks in a similar manner to RuntimeEdges. Observe, in FIGS. 8*a*-8*c*, a RuntimeLink is a simple kind of RuntimeEdge, one that only has source and destination domain paths without source and destination types. Those are already computed when computing RuntimeEdges. Moreover, the underlying ownership domains type system guarantees that objects communicate only when permitted, so RuntimeEdges cannot violate RuntimeLinks.

Illustrative Example

FIGS. 11*z*-11*c* show a few representative rewrites that the reader can follow along with the OOG in FIG. 10, which shows formal domains to clarify the binding of formals to actuals and the object pulling operation.

The top-half of the diagram shows selected AbstractGraph tuples. The lower-half shows selected RuntimeObjects and RuntimeEdges that the rewriting rules create. ↦ denotes the next generated fact, and ↦ | denotes the fact obtained at the fixed point.

We manually added to FIG. 10 a thick edge labeled X as an example of an imprecise edge that the rules do not generate. Intuitively, ELTS is not bound to STATE so no rule should ever add an edge from v2:ArrayList to num1:Number in STATE—even though Integer is a subtype of Number. The rewriting rules here generate edges that are more precise than our earlier algorithm [M. Abi-Antoun and J. Aldrich. Compile-Time Views of Execution Structure Based on Ownership. In *IWACO*, 2007.].

3.5 Soundness

For the OOG to be most useful, it should be a sound approximation of the true runtime object graph for any program run. We formally revisit the earlier definitions in Section 2.1 and formally prove a key property. Since the OOG is just a depth-limited projection that should preserve the soundness of the runtime graph by adding summary edges, the true runtime object graph (ROG) relates to the RuntimeGraph as follows:

Unique Representatives:

Each object l| in the ROG is represented by exactly one representative in the RuntimeGraph. Similarly, each domain in the ROG is represented by exactly one domain in the RuntimeGraph. Furthermore, if object l| is owned by domain d in the ROG, then the representative of l| is owned by the representative of e in the RuntimeGraph. Similarly, if l| has a domain d in the ROG, then the representative for l| has a representative domain for d in the RuntimeGraph.

Edge Soundness:

If there is a field reference from object $l_1$| to object $l_2$ in the ROG, then there is a field reference edge between RuntimeObjects $\theta_1$ and $\theta_2$ corresponding to $l_1$| and $l_2$ in the RuntimeGraph, and similarly for domain links;

Soundness Proof.

The proof builds on the formalization of ownership domains using Featherweight Domain Java (FDJ) [J. Aldrich and C. Chambers. Ownership Domains: Separating Aliasing Policy from Mechanism. In ECOOP, 2004.]. FIG. 12 shows a subset of the store typing rule T-Store. An overbar represents a sequence. In FDJ, locations represent object identity. A store S maps locations l| to their contents: the class of the object, the actual ownership domain parameters, and the values stored in its fields. A type in FDJ is a class name and a set of actual ownership domain parameters. S[l| ] denotes the store entry for l| . Given an object in the runtime object graph represented by location l, $\Sigma[l] = C < \overline{l',n} > |$. Here, each $l'_{i\cdot i}$ refers to a domain named $n_i$ that is part of the runtime object $l'_i$| . By Rule Aux-Owner, the first actual domain is the owner, i.e., owner(C<$\overline{l',n}$>)=$l'_1.n_1$ (the formal system treats the first domain parameter of a class as its owning domain; the practical system uses a slightly different syntax to emphasize the semantic difference between the owner domain of an object and its domain parameters.). S[l,i] denotes the value in the $i^{th}$ field of S[l] ]. T-Store ensures that the store type 3 gives a type to each location in S, one that is consistent with the classes and actual ownership domain parameters in S. CT is the class table.

Proof of Unique Object Representatives.

The proof is by induction over the ownership tree (from FDJ). If $l_o$ owns l| , the ownership relation has no cycles and is well-founded. The base case for the induction is trivial. The top-level object in the runtime object graph has a unique representative in the RuntimeGraph corresponding to the root RuntimeObject. We strengthen the inductive hypothesis (i.h.) as follows: Each object in the runtime object graph of runtime type C is represented by exactly one RuntimeObject θ that merges an AbstractObject o of type C in the Runtime Graph.

The proof required the following lemmas which are well-formedness rules on the RuntimeGraph.

Lemma: Unique Object per Domain and Type.

If there exists a RuntimeObject θ=({o: T, . . . }, d) and a RuntimeObject θ'=({o: T', . . . }, d) with T'<: T or T <: T', then θ is the same as θ'.

Proof.

Immediate from R-MERGE-OBJECTS. Note, this proof does not reflect the existence of virtual abstract objects. Although those virtual abstract objects appear in the RuntimeGraph (and violate the uniqueness invariant), they are omitted from OOG.

Lemma: Object Pulling.

If ∃ RuntimeObject({o . . . }, $d_{fi}$) and $d_{fi}$↦*$d_{fj}$| then ∃ RuntimeObject({o . . . }, $d_{fj}$).

Proof.

By induction on the length of the binding sequence.

Lemma: Ownership Tree.

Tree structure must follow order of object creation.

Proof.

Because the owner of an object must be set at creation time, and has to be an existing domain on an existing object, the ownership relation is well-founded and has no cycles. Note, this assumes that unique is not part of the system. Having unique could cause the creation of cycles because it leads to the assignment of ownership after creation.

Lemma: Binding Chains.

Given a location l such that Σ[l]=C<$l_o$,$n_1$, . . . >, and $l_o$ | such that Σ[$l_o$]=$T_o$< . . . >|. If the corresponding object creation expression is of the form new C<$\overline{d}$>($\overline{v}$) with $d_1$ a formal domain, there exists a sequence of new $C_1$<$\overline{f_1}$>($\overline{v}$) . . . new $C_n$<$\overline{f_n}$>($\overline{v_n}$), with CT($C_i$)=$C_i$<$\overline{\alpha}$> and a chain of bindings C::$\alpha_1$↦$C_1$::$\alpha_i$, . . . , $C_n$::$\alpha_j$↦$T_o$::$n_1$|.

Proof.

By induction on the evaluation rules (using rules R-New and T-New) in FDJ.

Limitations.

The proof assumes that objects are only created in locally visible domains or domain parameters: it does not reflect the existence of the lent, shared and unique domains [J. Aldrich and C. Chambers. Ownership Domains: Separating Aliasing Policy from Mechanism. In ECOOP, 2004.]. Indeed, the OOG may not reflect an object marked unique until it is assigned to a specific domain. Thus, an inter-procedural flow analysis is needed to track an object from its creation (at which point it is unique) until its assignment to a specific domain. The current tool does not implement this flow analysis, so a unique object returned from a factory method must be annotated with the domain in which it should be displayed.

Similarly, the flow analysis can determine what domain a lent object is really in. Again, objects annotated with lent, except for the root object, are currently missing from the OOG. Objects that are shared would be trivial to display in the OOG but would add many uninteresting edges (the analysis may also excessively merge objects in the shared domain), so we currently exclude them.

Assumptions.

The OOG inherits other properties that are guaranteed by the soundness of the underlying ownership type system. For example, every object is assigned an owning domain which is consistent with all program annotations and does not change over time. These invariants are correct up to the following assumptions:

a. All Sources Available:

The program's whole source code is available, and the program operates by creating some main object and calling a method on it (this justifies the focus on a single root object, although multiple root objects could in principle be shown). The class of that main object is the type of the root of the OOG;

b. No Reflective Code:

Reflection and dynamic code loading may violate the above invariants by introducing unknown objects and edges, and possibly violating the guarantees of the underlying ownership system;

c. Flow Analysis:

Objects annotated with shared and unique are not currently shown in the OOG. Objects that are shared would be trivial to add but would add many uninteresting edges to the OOG. Objects that are unique would require a flow analysis to be handled properly. Usage edges (e.g., method invocations, field accesses) could be generated for a system with only ownership, but a flow analysis is required for usage edges to be sound in the presence of lent objects.

Despite the assumptions about the whole program source being available and restrictions on reflection and dynamic loading, our system is still relatively sound in the presence of these features. In particular, as long as the reflective operations are annotated correctly and consistently with ownership information, then any object referred to by some field in the source code that is available will show up in the OOG, as specified above.

4 Advanced Features

We motivate several advanced features of the analysis using a real system, JHotDraw, that we revisit in the evaluation. Section 5.1 highlights how we annotated JHotDraw.

4.1 Instantiation-Based View

Generics.

Merging abstract objects within a domain based on subtyping (due to possible aliasing) can sometimes lead to excessive merging. To increase the precision, we use generic types where applicable to minimize merging. Generic types on containers prevent the merging objects of type Vector<Handle> and those of type Vector<Figure>, compared to just using the raw type Vector. For our evaluation, we refactored all the subject systems in Section 5 to use generic types. Refactoring to generics has mature tool support [R. M. Fuhrer, F. Tip, A. Kiezun, J. Dolby, and M. Keller. Efficiently Refactoring Java Applications to Use Generic Libraries. In ECOOP, 2005.] and improves the precision of the extracted OOGs.

Interface Declarations.

Figure 14:
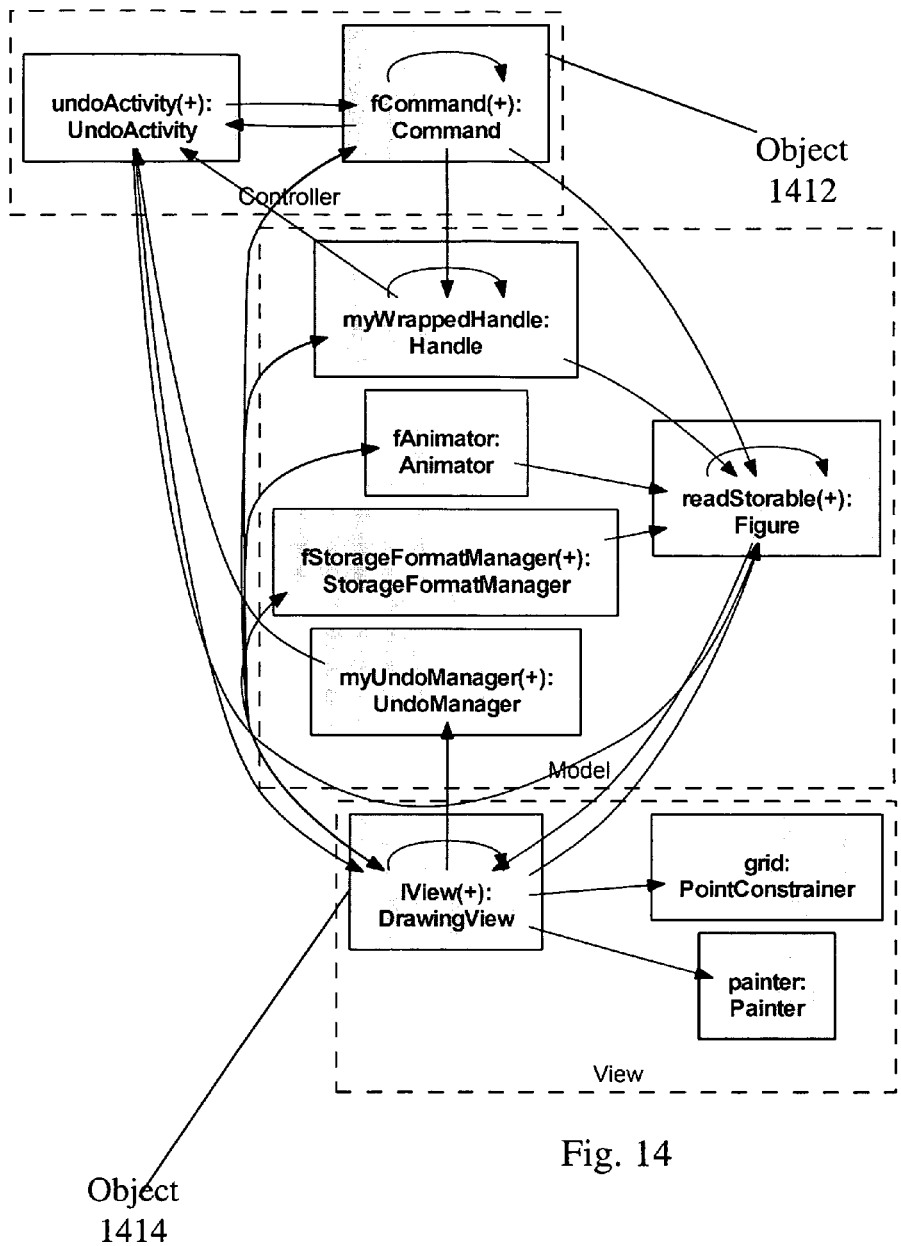
FIG. 14 illustrates the JHotDraw OOG using declarations.

JHotDraw uses inheritance heavily, whereby many types extend or implement listener interfaces to realize the Observer design pattern. For instance, both interfaces Command and Tool are in the Controller domain and both extend the interface ViewChangeListener. As a result, the abstract objects for Command and Tool get merged into the same runtime object. For some applications, the OOG in FIG. 14 will be considered to suffer from too much merging and to be fairly imprecise. More specifically, FIG. 14 illustrates the JHotDraw OOG without using an instantiation-based view. Instances of Command and Tool are in the Controller domain and both interfaces Command and Tool extend the interface ViewChangeListener. As a result, the abstract objects for Command and Tool were merged into the same runtime object, Object 1412. In addition, objects of type DrawingView and DrawingEditor were merged into Object 1414.

A key insight however is that there are no object creations of interface types. To regain some component precision (as defined in Section 2.1), we construct the AbstractGraph differently to include abstract objects for object creations instead of field and variable declarations (See FIG. 13, Lines d,e). Line (e) generates a declaration-based view (DBV) and Line (f) an instantiation-based view (IBV). This technique is similar to how Rapid Type Analysis (RTA) determines the receiver of a method call during the construction of a call graph [D. F. Bacon and P. F. Sweeney. Fast Static Analysis of C++ Virtual Function Calls. In *OOPSLA*, 1996.].

In the example above, the analysis never generates an abstract object of type ViewChangeListener. Rather, it creates abstract objects that are created with types SelectionTool and AlignCommand. When constructing the runtime graph, AlignCommand and SelectionTool are kept distinct since there is no subtyping relation between them, thus achieving the desired goal of keeping Command and Tool distinct. In JHotDraw, SelectionTool <: Tool,ViewChangeListener and AlignCommand <: Command, ViewChangeListener.

Virtual Objects.

The analysis must still handle variable declarations of interface types. In JHotDraw, CommandMenu declares a Vector<Command>. This translates into a Command abstract object inside Vectors ELTS formal domain that stores the elements. The analysis cannot ignore these abstract objects as they must get pulled and carry the binding information to generate the appropriate RuntimeEdges. For instance, ELTS is transitively bound to Controller; after pulling the Command abstract object from ELTS to Controller, the analysis creates a RuntimeEdge from the CommandMenu object inside View to the Command object inside Controller. The analysis cannot add a Command abstract object to domain ELTS either, since this would result in excessive merging.

The analysis handles this case by creating a virtual abstract object, one that potentially gets pulled just like any other. But a virtual abstract object does not affect the object summarization since it is virtually excluded from the list of objects inside an AbstractDomain—except to prevent the analysis from re-adding it to that same domain. Finally, when creating the depth-limited projection of the runtime graph, the analysis omits the virtual abstract objects after they have served their purpose.

Special Cases.

Another corner case arises when the analysis encounters an object creation expression of the form new Object( ). Naively processing this expression would create an abstract object that would cause all the objects in that domain to merge into one runtime object. To avoid this problem, the analysis synthesizes for that abstract object an implicit anonymous class.

Evaluation of the Instantiation-Based View.

FIGS. 15*a* and 15*e*-15*h* illustrate a thumbnail of the JHotDraw OOG based on object instantiations but without any abstraction. This OOG, even if it groups top-level objects into domains, lacks abstraction because it shows objects for RedoCommand, NewViewCommand, and OpenCommand, as well as objects for ConnectionTool, CreationTool, etc. What we really wanted is to merge all Command instances together and all Tool instances together, but not merge Tool and Command instances together. This OOG also suffers from an explosion of imprecise edges: since the analysis relies on only the aliasing information provided by the ownership domains type system, it must add RuntimeEdges from CommandMenu to RedoCommand, NewViewCommand, etc., for soundness. Moreover, a Command wraps another Command, so this results in an almost fully connected graph.

In the following section, we motivate and extricate the type abstraction from the core algorithm, but the rewriting rules already include it (See Rule R-Aux-Compat). The instantiation-based view mainly requires constructing the AbstractGraph differently (See FIG. 13) but the transformation from the AbstractGraph to the RuntimeGraph stays mostly the same.

4.2 Type Abstraction by Trivial Types

To improve abstraction and reduce clutter in the OOG, we defined the following type abstraction heuristic: merge abstract objects whenever they share one or more non-trivial least upper bound types. The resulting runtime object has an intersection type that includes all the least upper bounds.

Merging all the abstract objects in a domain into a single runtime object of type java.lang.Object would result in a sound but uninteresting OOG! So the type abstraction heuristic prevent the analysis from merging abstract objects that only share these trivial types as supertypes. The list of trivial types is user-configurable and can be empty. Typically, types such as Object and Serializable are trivial by default. FIG. 15(*b*) shows the result of using type abstraction on the JHotDraw OOG based on object instantiations with default trivial types. Again, this OOG suffers from the same excessive merging as not using the instantiation-based view.

We can achieve better results for JHotDraw by carefully selecting the trivial types. In particular, when we turn on type abstraction and manually add ViewChangeListener as a trivial type, the analysis merges RedoCommand, NewViewCommand, OpenCommand, etc., because they have a non-trivial least upper bound type Command. Similarly, ConnectionTool, CreationTool, etc., get merged. But ConnectionTool and RedoCommand do not get merged because their only common supertype is ViewChangeListener. FIG. 15(*c*) shows the result of using type abstraction with the more precise trivial types.

Finally, it is worth noting that since type abstraction leads to more merging, it does not compromise soundness (unsoundness would mean showing two separate components for the same runtime object). This heuristic can also be turned off by taking out the last disjunct in Rule R-Aux-Compat (FIGS. 8*a*-8*c*).

4.3 Type Abstraction by Design Intent Types

Type abstraction by trivial types abstracts an OOG obtained from an instantiation-based view, as discussed above. In some cases, a more precise type abstraction method is needed. For instance, using the trivial types as discussed above, the JHotDraw OOG does not show distinct Drawing and Figure objects. Presumably, both Drawing and Figure are architecturally relevant. We examined the type hierarchy and learned that the base class implementing the Drawing interface, StandardDrawing extends CompositeFigure. Thus a Drawing is-a Figure, hence they are merged for soundness, because they are both in the Model tier (Object 1500 in FIG. 15(*c*)).

The other insight is that even though an object may have multiple types, typically some types are more architecturally relevant than others. For instance, class StandardDrawing extends class CompositeFigure and implements the Drawing interface. In turn, class CompositeFigure implements the Figure interface. We may want to view a StandardDrawing object as a Drawing object not as a Figure object. To achieve this precision, we implemented type abstraction by design intent types, which works as follows:

a. Have a user define an ordered list of design intent types;
 b. To decide whether to merge two abstract objects o: t and o': t'
 c. Using the list of design intent types,
 c.1. Find a design intent type $\bar{t}$, such that $\bar{t} <: t$
 c.2. Find a design intent type $\bar{t}'$, such that $\bar{t}' <: t'$
 c.3. Merge objects o and o' if $\bar{t} <: \bar{t}'$ or $\bar{t}' <: \bar{t}$
 d. If the design intent type list does not include a type for t or t', then this heuristic does not apply.

Type abstraction by design intent types is an additional disjunct to Rule R-Aux-Compat, and can also be turned-off. For JHotDraw, the framework package includes classes and interfaces that define the drawing framework and does not provide any concrete implementation classes. We specified the list of design intent types to include all the types in the framework package, with a specific ordering (from most to least important). For instance, Drawing appears before Figure in the design intent types map.

Figure 15B:
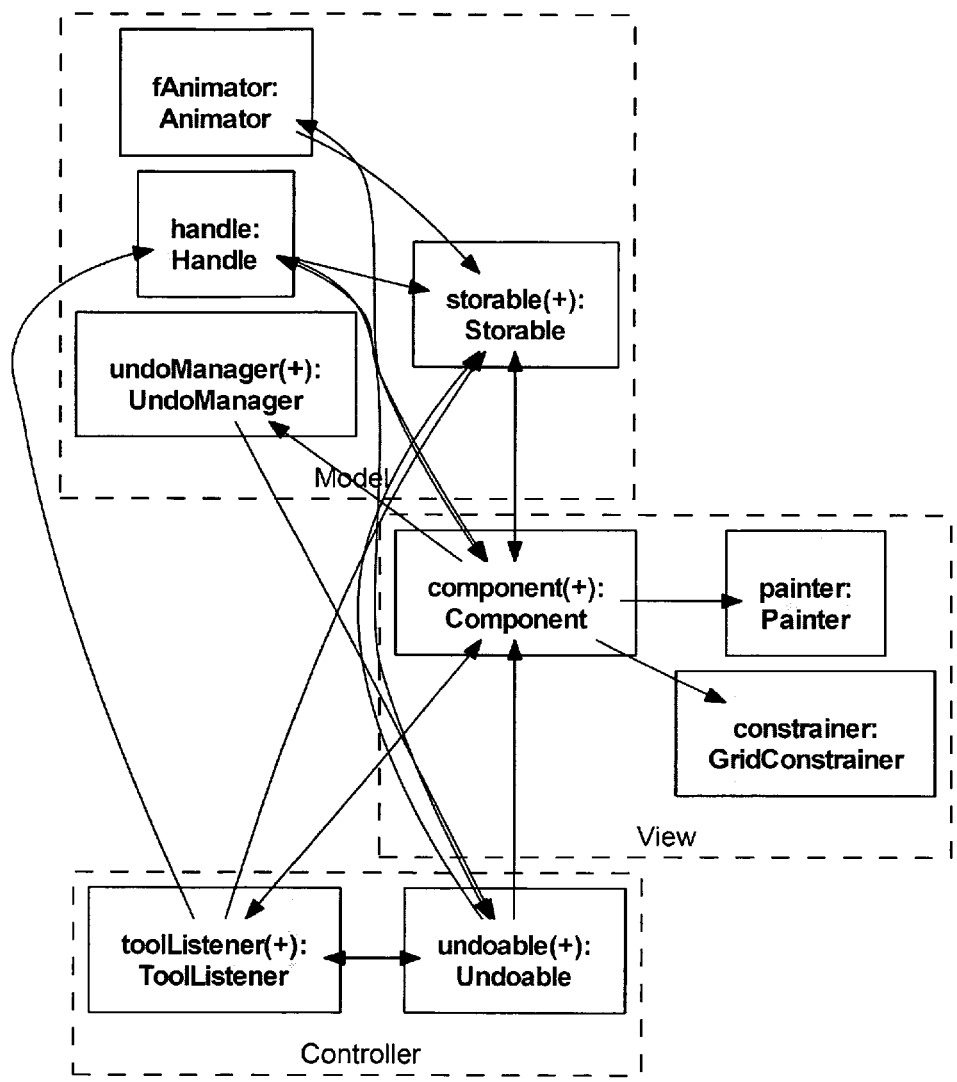
FIG. 15b illustrates the JHotDraw OOG based on object instantiations and type abstraction using the default trivial types.
Figure 15C:
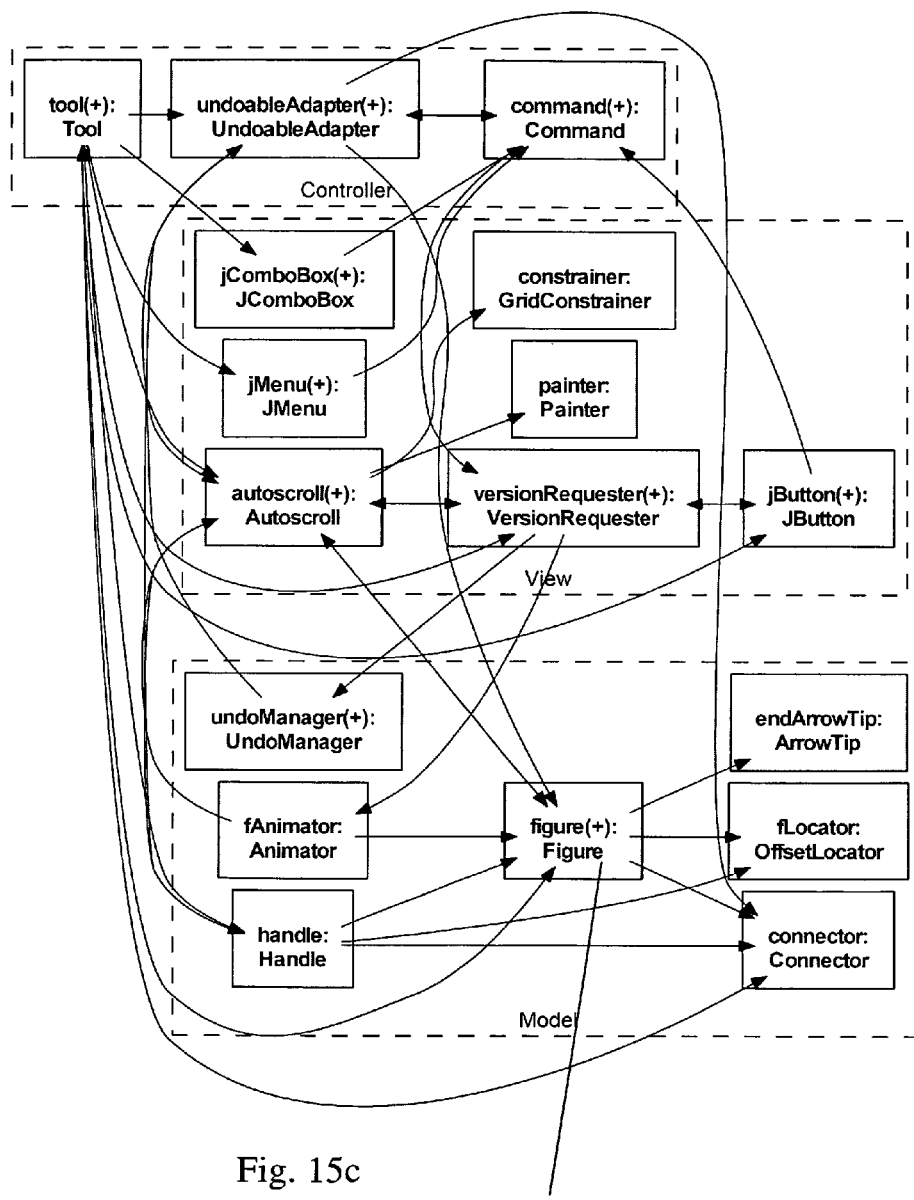
FIG. 15c illustrates the JHotDraw OOG based on object instantiations and type abstraction using more precise trivial types from a user-specified list.
Figure 15D:
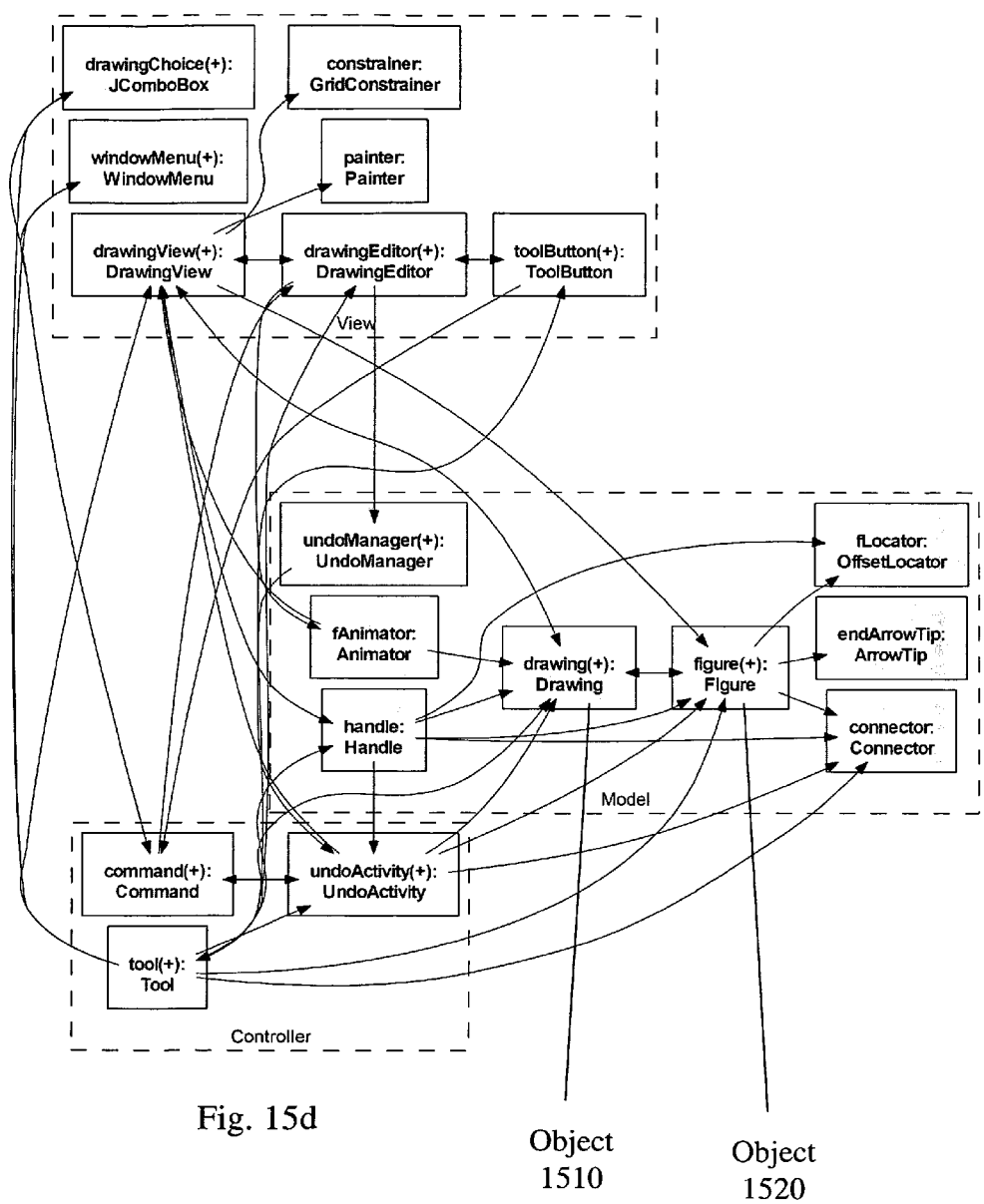
FIG. 15d illustrates the JHotDraw OOG based on object instantiations and type abstraction using user-specified design intent types.
Figure 15E:
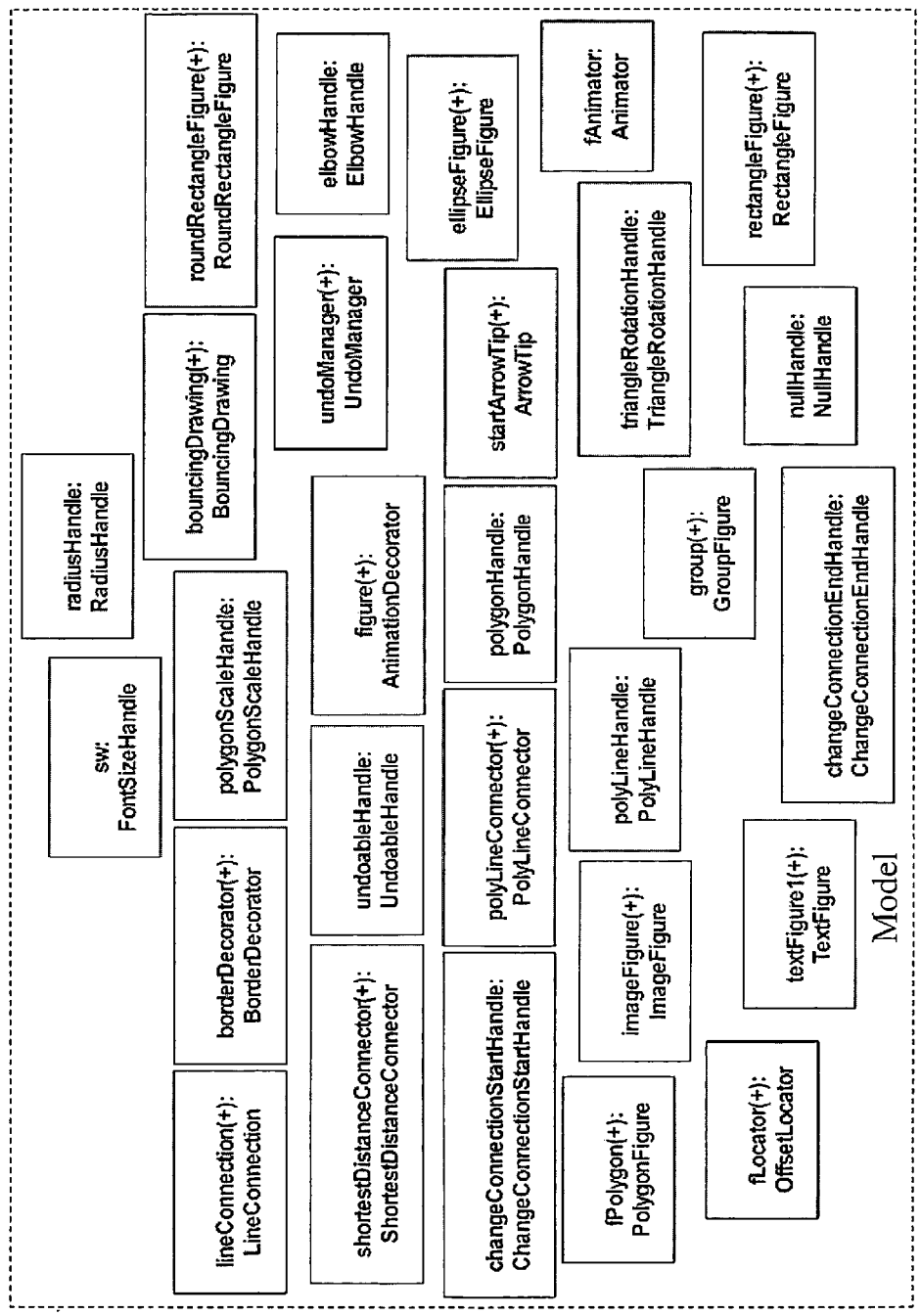
Figure 15G:
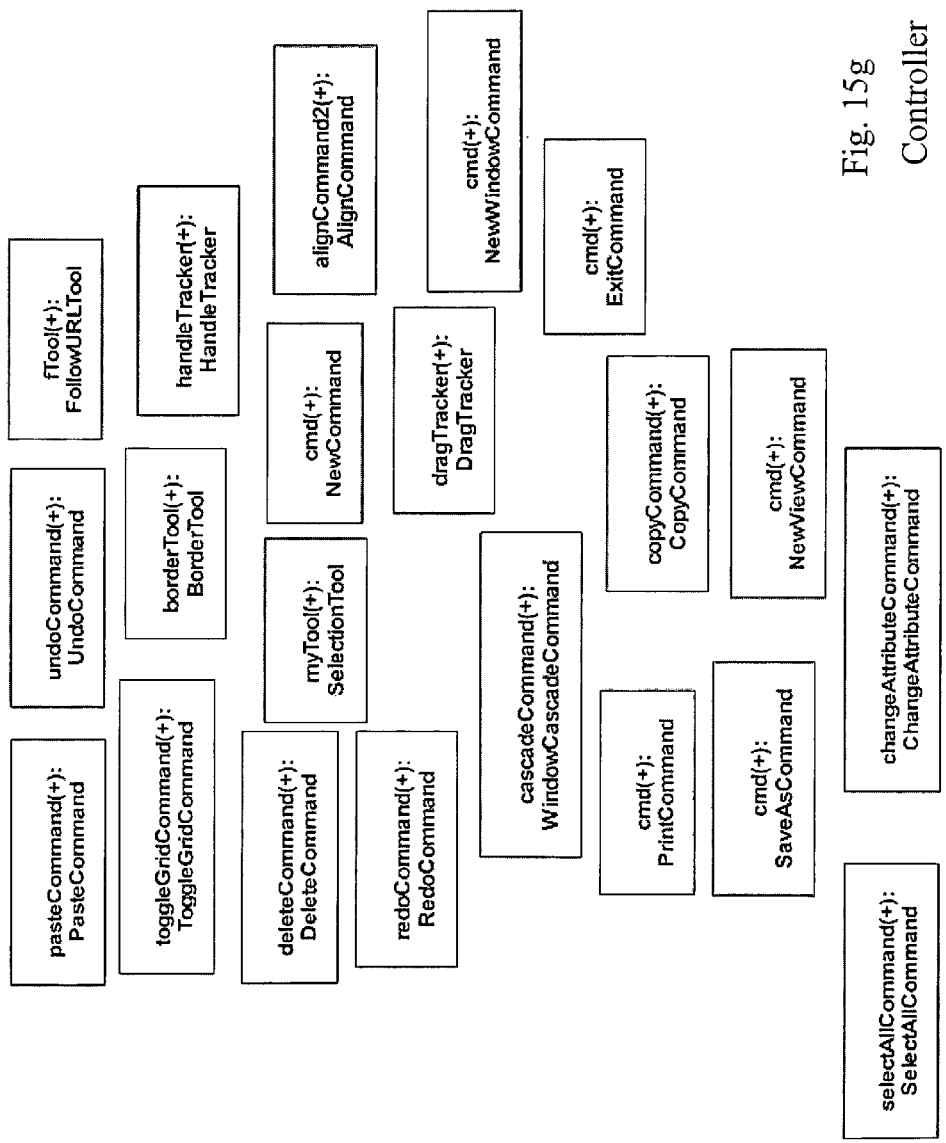
Figure 15H:
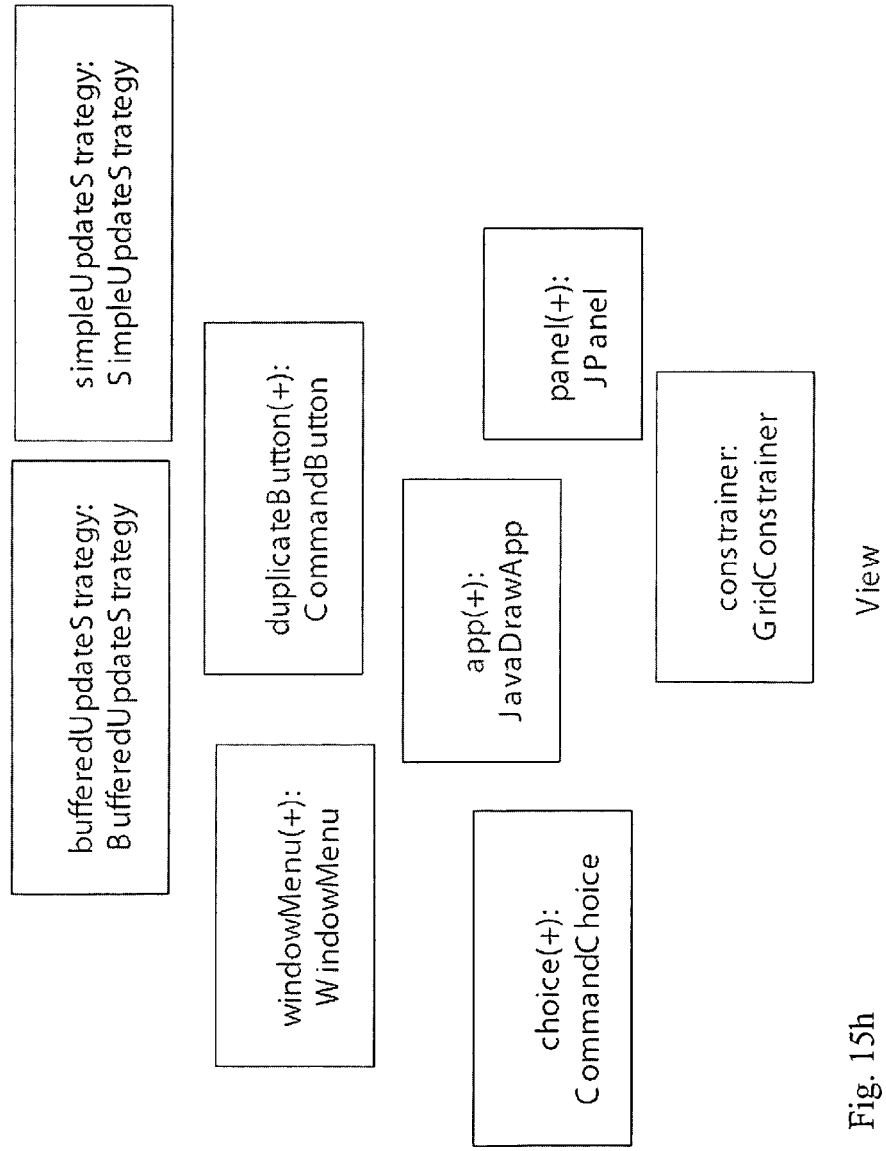

FIG. 15*d* shows the result of using type abstraction with design intent types on the JHotDraw OOG based on object instantiations. There, we can see that objects of type StandardDrawing and BouncingDrawing are merged with objects of type Drawing into one object (Object 1510). Objects of type AbstractFigure, CompositeFigure, and TriangleFigure, etc., are merged with objects of type Figure (Object 1520), hence keeping objects of type Drawing and Figure distinct in the Model domain.

4.4 Mapping a Display Graph to a C&C Architecture

A runtime architecture of a system is often represented as a standard component-and-connector (C&C) view, represented in an Architecture Description Language (ADL). To increase the level of abstraction of the extracted runtime architecture, a separate analysis converts an OOG into a standard C&C architecture. We illustrate the mapping to C&C views using the Acme general purpose ADL [Garlan, D., Monroe, R., and Wile, D. Acme: Architectural Description of Component-Based Systems. In *Foundations of Component-Based Systems*, Leavens, G. T., and Sitaraman, M., Eds., Cambridge University Press, 2000.]. This is just one example of a standard ADL, and most of the following Acme elements are also available in other ADLs:

a. Component: unit of computation and state;
 b. Port: point of interaction on a Component;
 c. Connector: interaction among components;
 d. System: configuration of Components and Connectors;
 e. Representation: nested sub-architecture;
 f. Group: named grouping of elements, such as an architectural runtime tier;
 g. Property: a (name,value) pair associated with an element.

The mapping to a C&C architecture works as follows.
 A. The root object maps to a System;
 B. Each object in the OOG maps to a Component;
 C. References between objects create Ports as follows.
 If object A has a field reference of type T to object B:
  a. The corresponding Component A has a Port that requires services and has name B;
  b. The Component corresponding to B has a Port that provides services and has name T;
  c. A Connector connects A to B;
  d. Architecturally uninteresting self-edges can be excluded.
 D. An ownership domain d in the OOG maps to a Group g.
  a. If an object o in a domain d, the corresponding Component is in Group g.
 E. The OOG hierarchy maps to system decomposition in Acme.
  a. If an OOG object declares domains, the corresponding Component has a Representation;
  b. The corresponding Component has a sub-architecture inside that Representation.
 F. Finally, the analysis populates the details property for an element with traceability information from the OOG, that other tools can use to trace from a element in the C&C view to the code.

Figure 23:
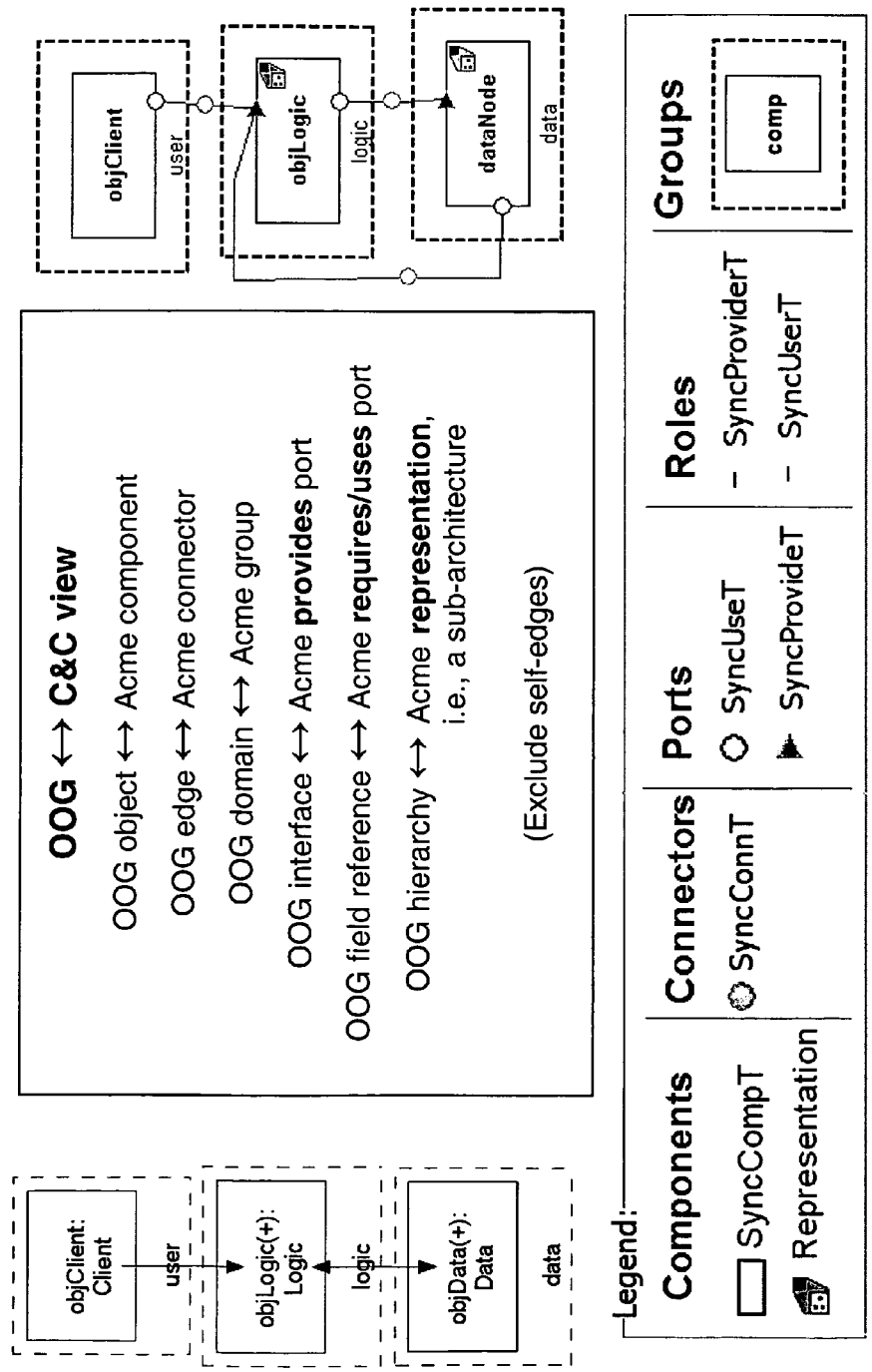
FIG. 23 illustrates the mapping to a C&C architecture.

FIG. 23 shows the mapping between an OOG and a C&C view represented in the Acme Architecture Description Language.

We section presented one set of possible rules to map an OOG to a C&C view that an automated analysis can apply. There are other modeling choices, including giving a developer greater control of the mapping. For instance, a developer may merge two components in the OOG into one component in the C&C view. It is also possible to map an entire domain to a Component. It is also possible to have the user map the implementation types to architectural types, to generate an as-built view with richer types, styles and properties [M. Abi-Antoun, J. Aldrich, N. Nahas, B. Schmerl, and D. Garlan. Dif-ferencing and Merging of Architectural Views. *Automated Softw. Eng.*, 15(8), 2008.].

In follow-up work, we check and measure the structural conformance of the extracted C&C view with an as-designed architecture [M. Abi-Antoun and J. Aldrich. Checking and Measuring the Architectural Structural Conformance of Object-Oriented Systems. CMU-ISRI-07-119, 2007.]. The present invention focuses on architectural extraction, although the present invention is not so limited.

4.5 Analyzing a Computer Program Module

The present invention allows analyzing a computer program module, understood to mean part or all of a computer program.

Stop-Analysis Configuration Files.

An ownership type system often makes a closed world assumption. This requires analyzing all the classes that are transitively referenced (through constructor calls, field references, etc.), including classes in external library code. It is often desirable to analyze a computer program module. To this effect, we define a stop-analysis configuration file to allow the user to specify the list of classes, packages or compilation units that must not be analyzed. The user to exclude zero or more entire packages, zero or more types or zero or more compilation units, using regular expressions, as follows:

ExcludePackage:nameregex // Exclude name package
ExcludeType:nameregex // Exclude type
ExcludeCompUnit:Test*.java // Exclude compilation units for unit tests This technique is also supported by other tools such as Womble [D. Jackson and A. Waingold. Lightweight Extraction of Object Models from Bytecode. *TSE*, 27(2), 2001.].

Annotations.

The annotations can be stored in the computer program files using language support for annotations or as comments. They can also be stored in external files. The present embodiment provides tool support for associating ownership domain annotations with any Java source file or Java bytecode file using an external file, Typically, we add the ownership information directly as annotations to the files that are part of the computer program modules that are being analyzed. And we store in external files any annotations for the computer program modules that are not analyzed using.

Library Code.

There are two approaches to support adding annotations to the standard Java libraries and other third-party libraries. The first involves annotating the sources of the library (when available) and pointing the tool to the annotated sources. The second involves placing the annotations in external files. The tool can support both methods. The latter approach is often preferable since it does not require changing the library or third-party code—which may not be available and when it is, tends to evolve separately. Other annotation based systems also support storing the annotations in external files [M. D. Ernst and D. Coward. JSR 308: Annotations on Java types. http://pag.csail.mit.edu/jsr308/, 2006.].

Virtual Fields.

When parts of a computer program are excluded from the analysis, the annotation must soundly summarize the parts that are not being analyzed, in order to preserve the soundness of the extracted architecture.

If the user of the tool knows about fields in missing code or external library code, and would like to take them into consideration, he can use virtual fields [McCamant, S., and Ernst, M. D. Early Identification of Incompatibilities in Multi-component Upgrades. In ECOOP, 2004.] or ghost variables [Flanagan, C., Leino, K. M., Lillibridge, M., Nelson, G., Saxe, J. B., and Stata, R. Extended Static Checking for Java. In PLDI, 2002.]. A virtual field holds information that is closely related to the meaning of an object, but need not be kept directly in the object in a particular implementation [ME04]. These annotations do not affect the execution of the system at runtime but are treated as an object's actual fields by the analysis.

5 Evaluation

We evaluated the quality of the extracted OOGs on several extended examples of medium-sized representative programs to answer the following research questions:

Can an OOG have a meaningful level of abstraction (or does it suffer from too much or too little merging)?

Based on an OOG, can a developer learn what annotations she can adjust to get a desired architectural view?

Can an automatically extracted OOG be related to a runtime architecture manually drawn by a developer?

Methodology.

The tool support for architectural extraction consists of two Eclipse plugins. JavaDomains is a typechecker to validate ownership domain annotations that a developer inserts as Java 1.5 annotations [M. Abi-Antoun and J. Aldrich. Ownership Domains in the Real World. In *IWACO*, 2007.]. OOG Wizard is a plugin to extract an OOG. It allows the developer to select the projection depth, elide substructure on selected objects and set the trivial types. FIGS. 16a-16e are snapshots of the Ownership Object Graph Tool as of this writing. The left pane shows the ownership tree and the right pane shows the depth-limited projection. The tool tracks the abstract objects that are merged into a runtime object. Since abstract objects are associated with elements of the program's Abstract Syntax Tree (AST), this allows tracing from an element in the OOG to the corresponding variable declarations in the code. The slider control sets the projection depth. The tool allows the user to set the type abstraction property using trivial types or design intent types. The tool displays a static type hierarchy of the types of the abstract objects that are merged into a runtime object to assist the user with selecting the trivial types and the design intent types. Finally, the tool can generate a component-and-connector runtime architecture. The OOG is laid out automatically using GraphViz [E. R. Gansner and S.C. North. An Open Graph Visualization System and its Applications to Software Engineering. *Softw. Practice & Exp.*, 30(11), 2000.].

The study's subject (one of us, hereafter "we") developed the OOG Wizard but none of the subject systems. He mostly learned their architectural structure from iteratively annotating the code, examining the extracted OOGs and relating the OOGs to diagrams of the code architecture drawn by others. For one system (JHotDraw), he had access to a tutorial by the original designers, but for a slightly older version than the one he annotated. The tutorial discusses the design patterns that JHotDraw implements but does describe the system's runtime architecture. We previously studied another subject system (HillClimber) by re-engineering it to ArchJava. The re-engineering case study also produced a version that cleaned up the original code, for instance by making most class fields as private. For this case study, we started from the refactored Java version and added ownership domain annotations to it.

We discuss in detail the annotation process of the subject systems elsewhere. In addition, we discuss the differences between adding ownership annotations to the plain Java program, compared to the re-engineered ArchJava program, for the HillClimber subject system [M. Abi-Antoun and J. Aldrich. Ownership Domains in the Real World. In *IWACO*, 2007.].

5.1 JHotDraw

JHotDraw is rich with design patterns, uses composition and inheritance and has evolved through several versions. Version 5.3 has 200 classes and 15,000 lines of Java.

Figure 17:
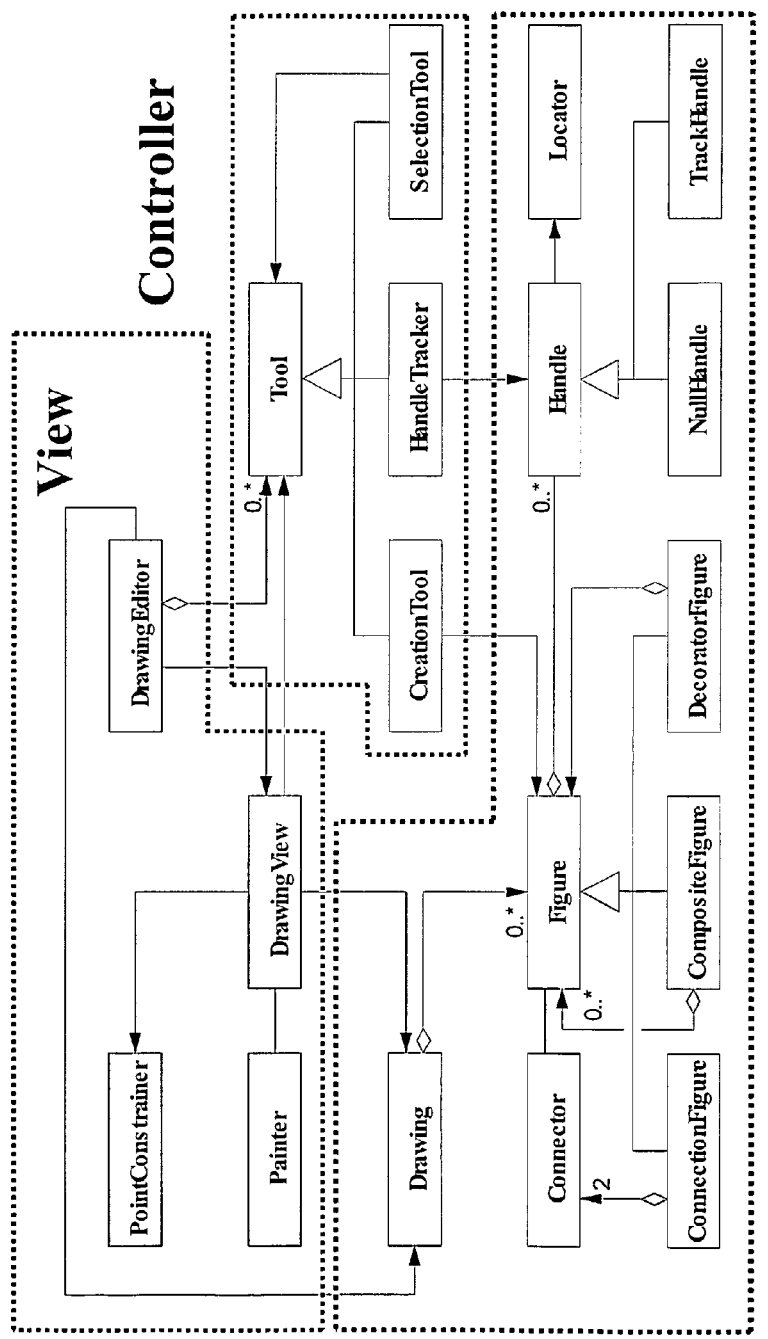
FIG. 17 illustrates JHotDraw class diagram.
Figure 18A:
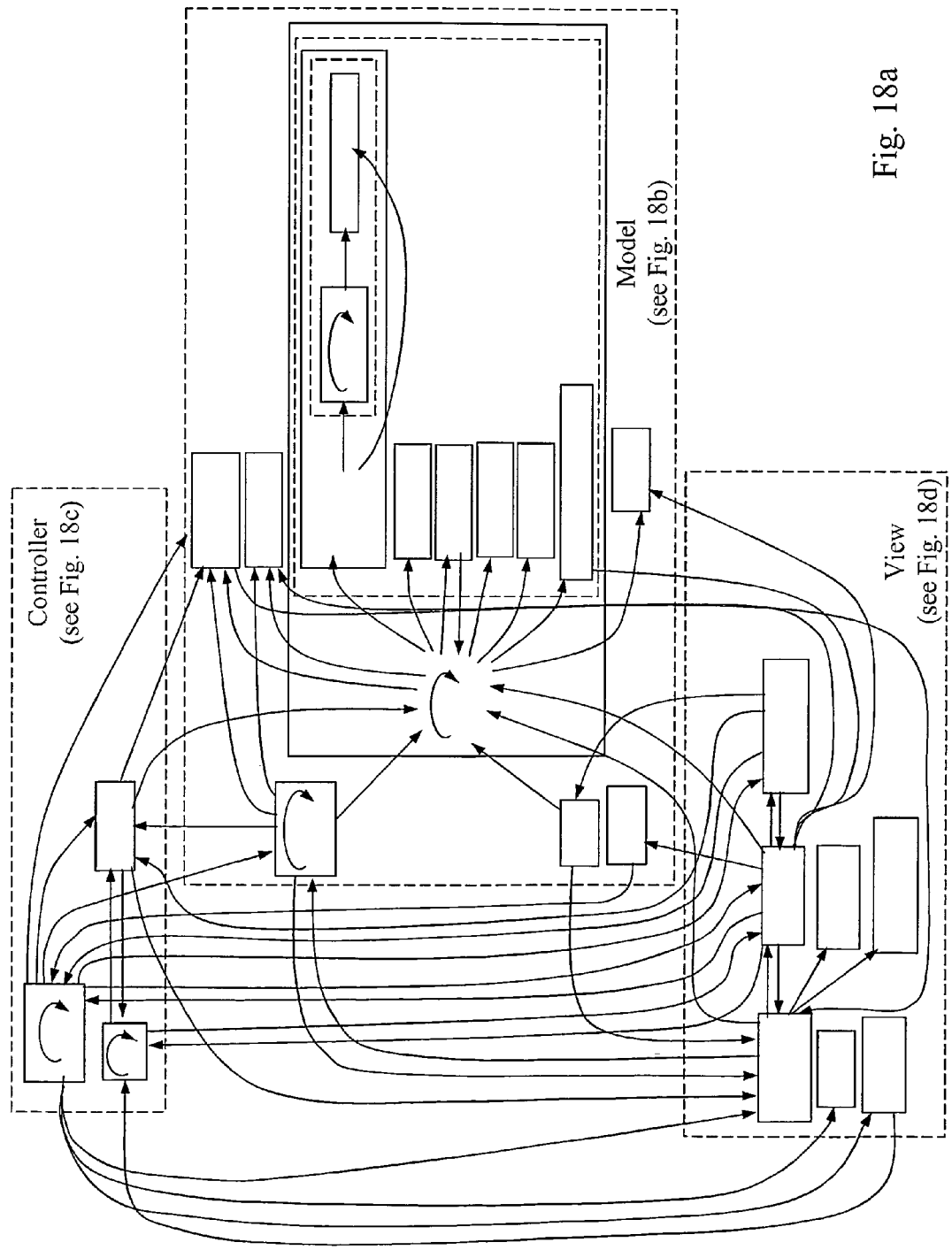
FIGS. 18a-18d illustrate the top-level JHotDraw OOG.
Figure 18B:
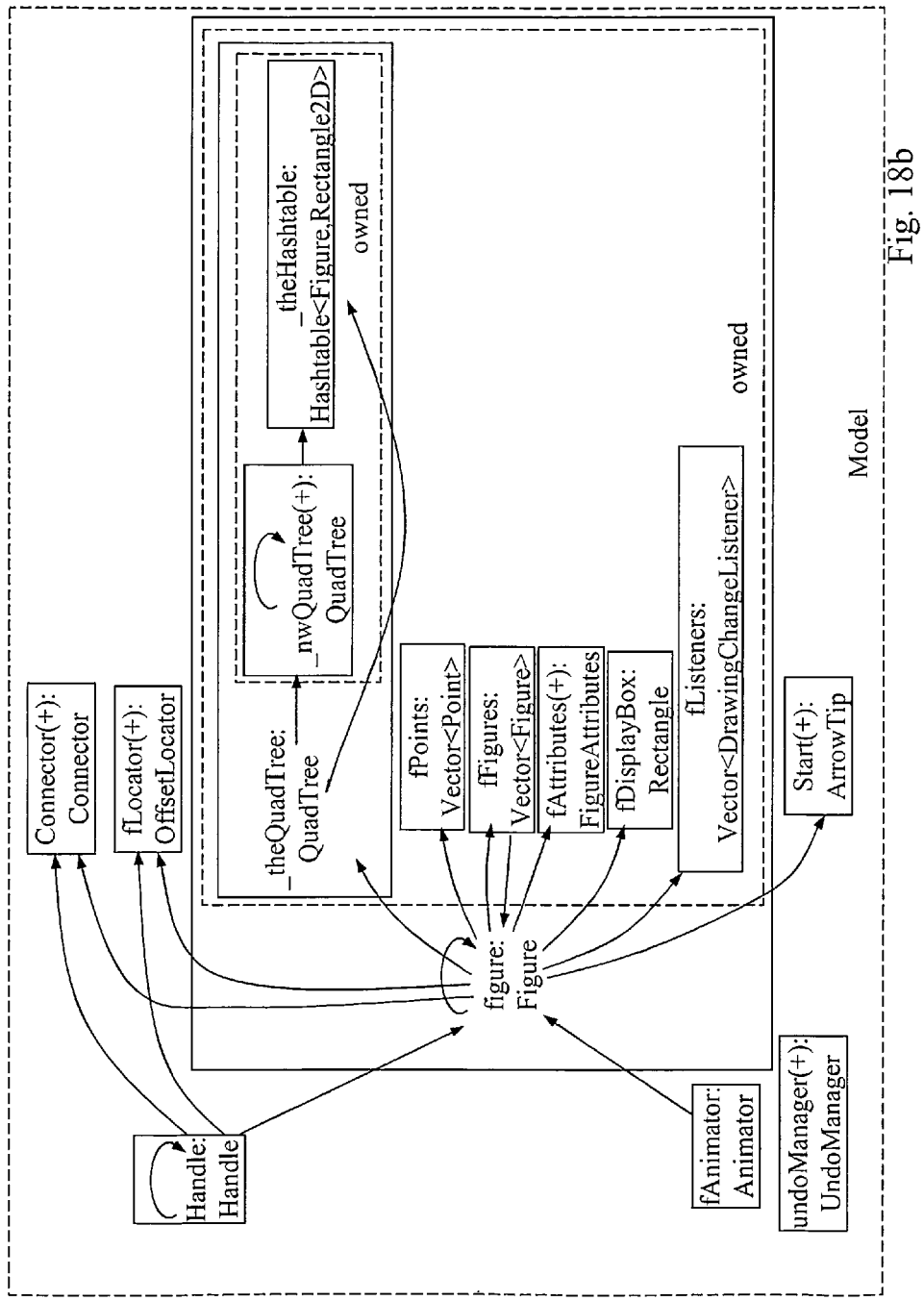
Figure 18C:
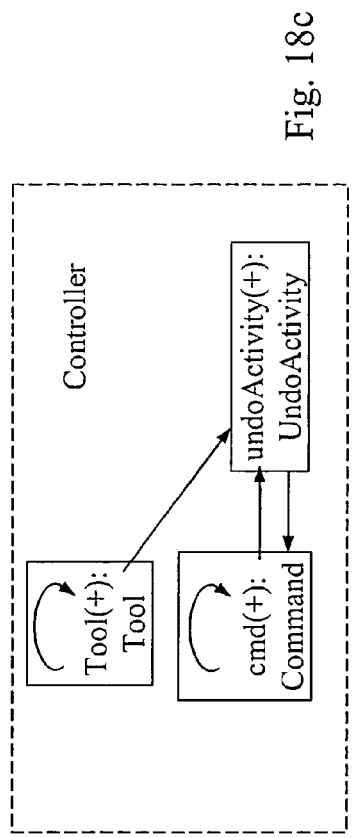
Figure 18D:
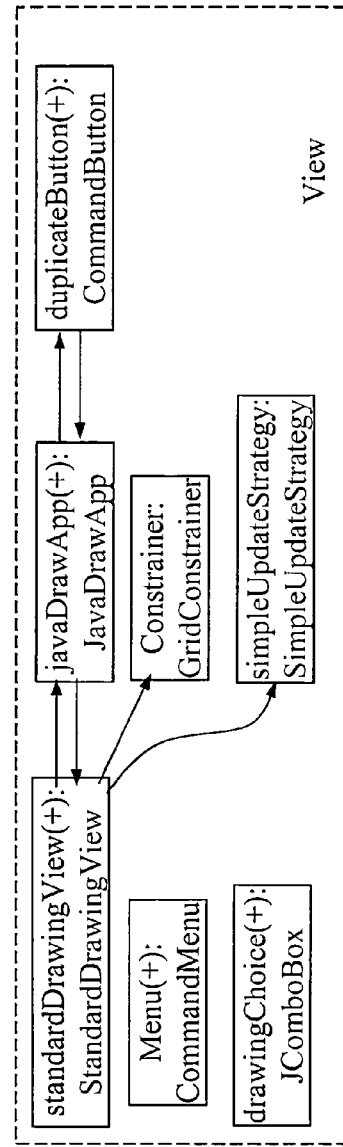

Design documentation for JHotDraw is available, e.g., [E. Gamma. Advanced Design with Patterns and Java (Tutorial). In *JAOO*, 1998. JHotDraw version 5.1.], [D. Riehle. *Framework Design: a Role Modeling Approach*. PhD thesis, 2000.], [W. Kaiser. Become a Programming Picasso with JHotDraw. JavaWorld, 2001]. FIG. 17 is a manually generated JHotDraw class diagram showing how we annotated instances of the selected types (Source: [D. Riehle. *Framework Design: a Role Modeling Approach*. PhD thesis, 2000.]). The class diagram in FIG. 17 shows some of the core types. An often cited article [W. Kaiser. Become a Programming Picasso with JHotDraw. JavaWorld, 2001.] discusses how JHotDraw follows the Model-View-Controller design pattern (the package structure does not reveal that fact since all the types in FIG. 17 are in one framework package).

Annotations.

We defined the following three top-level domains and organized instances of the core types as follows:

Model: has instances of Drawing, Figure, Handle, etc. A Drawing is composed of Figures. A Figure has Handles for user interactions;

View: DrawingEditor, DrawingView, etc., instances;

Controller: has instances of Tool, Command and Undoable. A DrawingView uses a Tool to manipulate a Drawing. A Command represents an action to be executed—the Command pattern without undo.

Evaluation.

In Section 4, we showed some earlier OOGs we extracted for JHotDraw. The OOG is in FIG. 14 suffered from too much merging: it merged DrawingView and DrawingEditor and made it hard to recognize many of the key abstractions from the class diagram in FIG. 17. Moreover, the OOG in FIG. 15 was unreadable and required type abstraction.

Type Abstraction by Trivial Types.

The user selects the trivial types as follows. First, he graphically selects an object which appears to merge too many objects. The OOG Wizard then displays an inheritance hierarchy of the types of the abstract objects that are merged into the selected object. The general principle is that the user must select a type that would cut the path from an interesting leaf type in the inheritance hierarchy up to an uninteresting common ancestor.

For JHotDraw, we started with the list of default trivial types, which includes several interfaces from the Java Standard Library such as Serializable, Cloneable, etc. Many of these types are marker interfaces that do not declare any methods. Others are constant interfaces that only define constants, such as SwingConstants (inheriting from a constant interface is a bad coding practice, the Constant Interface antipattern [J. Bloch. *Effective Java*. Addison-Wesley, 2001, Item #17], and Java 1.5 supports static imports for this purpose.). JHotDraw had its own list of interfaces that many classes implement such as Storable and Animatable. We also included several listener interfaces, such as ViewChangeListener (as discussed in Section 4.1). Because of JHotDraw's complex inheritance hierarchy, the list of trivial types needed fine-tuning to achieve the desired level of abstraction—more so than the other subject systems. We did not use type abstraction on the last subject system (Section 5.3).

Riehle previously studied JHotDraw and produced the code architecture in FIG. 17. Riehle posited that the original JHotDraw designers used the following techniques to present the JHotDraw design in their tutorials: a) merge interface and abstract implementation class—although important for code reuse, such a code factoring is often unimportant from a design standpoint; and b) subsume a set of similar classes under a smaller set of representative classes—showing many similar subclasses that vary only in minor aspects often leads to needless clutter [D. Riehle. *Framework Design: a Role Modeling Approach*. PhD thesis, 2000., pp. 139-140].

The OOG type abstraction seems to produces similar results to the above heuristics. For instance, all runtime Handle objects referenced in the program by the Handle interface, its abstract implementation class AbstractHandle, or any of its concrete subclasses ElbowHandle, NullHandle, etc., appear as one Handle component in the Model tier. Type abstraction can sometimes lead to a precision loss: not all Handle classes have a field reference to a Locator as FIG. 17 indicates. Only NullHandle and its subclasses do. But since they were all merged into Handle, the OOG shows an edge from Handle to Locator in FIG. 18b. FIGS. 18a-18d illustrate the top-level OOG for the JHotDraw subject system. There are three top-level domains: Model, View and Controller. Object Figure merges objects of type Figure, TriangleFigure, etc. Because a Drawing is implemented as a Figure, object Figure also merges objects of type Drawing, StandardDrawing, etc. The DrawingView interface extends the DrawingChangeListener interface. Hence the edge from object fListeners inside object Figure to the DrawingView object. Inside object Figure, object fFigures contains the composite Figure objects. Object Handle merges objects of type NullHandle, GroupHandle, etc. Point objects are immutable and passed linearly, hence they do not appear in the OOG.

We were slightly surprised when we inadvertently added interface Handle as a trivial type. This resulted in an OOG with one object for NullHandle (which directly implements Handle) and another object for all instances of the concrete subclasses that implement Handle by extending AbstractHandle. While this result seemed counter-intuitive, that OOG was sound: there is no runtime object that can have both types NullHandle and AbstractHandle, so one runtime object does not appear as two in the OOG.

Potential Design Flaw.

We were surprised that the OOG did not show distinct Drawing and Figure objects, presumably core types in the class diagram in FIG. 17.

We used the tool to determine that one object in the Model domain merged both Drawing and Figure. We examined the type hierarchy and learned that the base class implementing the Drawing interface, StandardDrawing extends CompositeFigure. Thus a Drawing is-a Figure. We researched this finding and found a brief mention in the Version 5.1 Release Notes. Still, in the framework package, interface Drawing does not extend Figure! We then checked the JHotDraw tutorial. Indeed, the JHotDraw designers explicitly asked to "not commit to the CompositeFigure implementation since some applications need a more complicated representation" [E. Gamma. Advanced Design with Patterns and Java (Tutorial). In *JAOO*, 1998. JHotDraw version 5.1., Slide #16].

OOG=Architecture?

The OOG in FIGS. 18a-18d seem to have the right level of abstraction since we recognize in it most of the core types from FIG. 17.

A key issue in architectural extraction is distinguishing between architecturally relevant and non-architecturally relevant objects. The OOG provides architectural abstraction by folding lower-level objects into higher-level architectural components. As a result, the OOG does not show non-architecturally relevant objects in the top-level domains. Collapsing many nodes into one is a classic approach to shrink a graph. However, the OOG statically collapses nodes based on the actual execution and ownership structure, and not according to where objects were declared in the program, or according to some naming convention.

There are two ways to control the level of detail. One is to control the OOG projection depth, which affects the depth of object substructure uniformly for all objects starting from the root of the ownership tree using the slider control in the OOG Wizard in FIG. 16c. Because one object's substructure may be more interesting than that of some other object, the OOG Wizard tool allows the user to collapse the internals of a selected object; in that case, the tool appends the (+) symbol to that object's label. In FIGS. 18a-18d, we manually elided the substructure of all the objects in the top-level domains except for Drawing because we wanted to highlight the Composite pattern. Inside Drawing, the owned domain shows several objects. We recognize a Vector<Figure>, fFigures, that maintain the list of sub-figures, and a summary edge from fFigures to figure:Figure in Model.

5.2 HillClimber

By many accounts, JHotDraw is the brainchild of object-oriented analysis and design (GOAD) experts. The second subject system HillClimber is a 15,000 line Java application that was developed by undergraduates. HillClimber is also interesting because it uses a framework and its architectural structure had degraded over the years [M. Abi-Antoun and J. Aldrich. Ownership Domains in the Real World. In *IWACO*, 2007.]. Our goal was to evaluate the OOG of a program that was not well-designed by GOAD experts. In HillClimber, the application window uses a canvas to display nodes and edges of a graph to show the output of a computational engine.

Annotation.

The ownership annotations organized objects into a data domain to store the graph, a ui domain to hold user interface objects, and a logic domain to hold the engine, search objects, and associated objects. While adding annotations to Hill-Climber, we refactored the code to reduce coupling between ui and data objects [M. Abi-Antoun and J. Aldrich. Ownership Domains in the Real World. In *IWACO*, 2007.].

Evaluation.

Figure 16B:
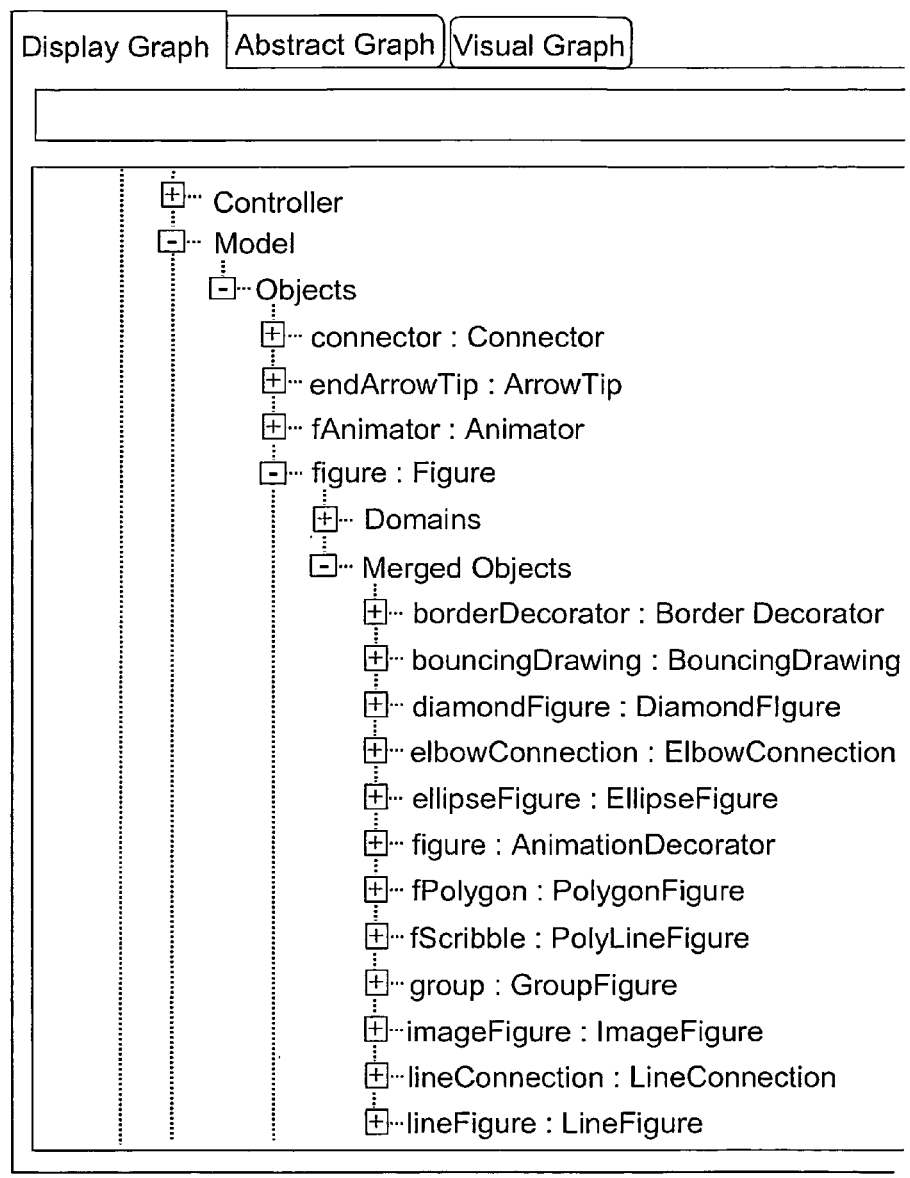
Figure 16C:
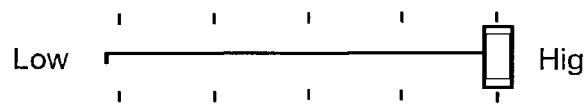
Figure 16D:
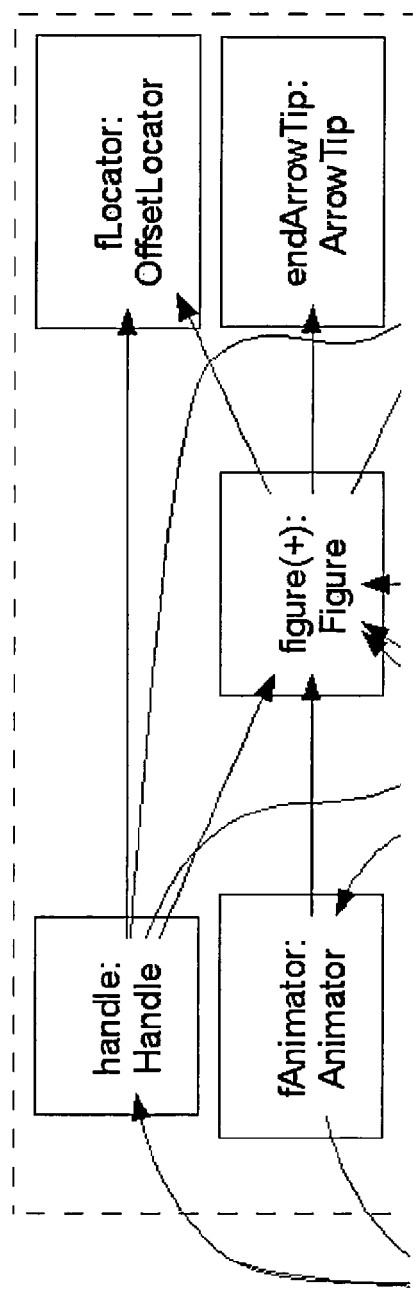
Figure 16E:
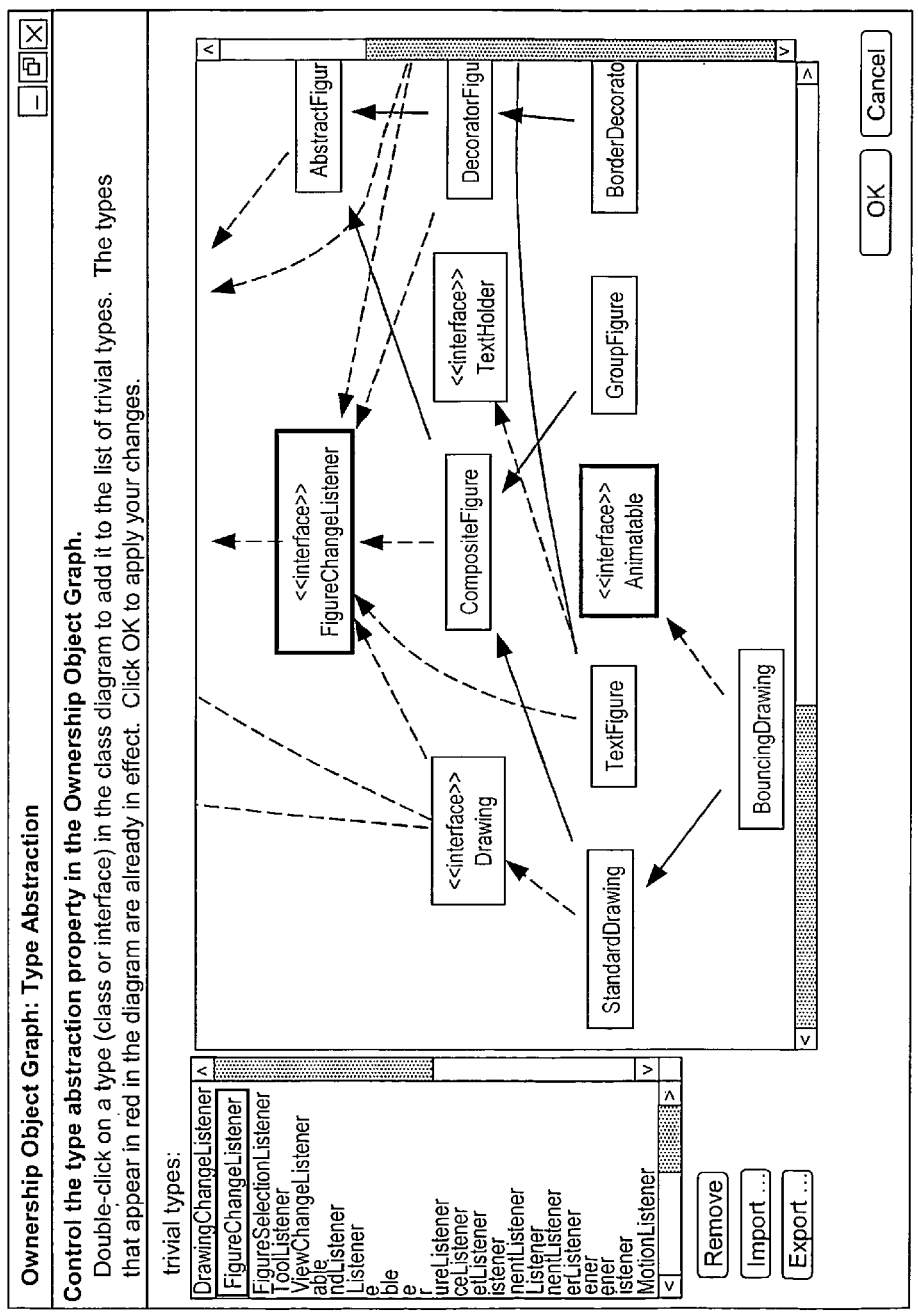
Figure 19:
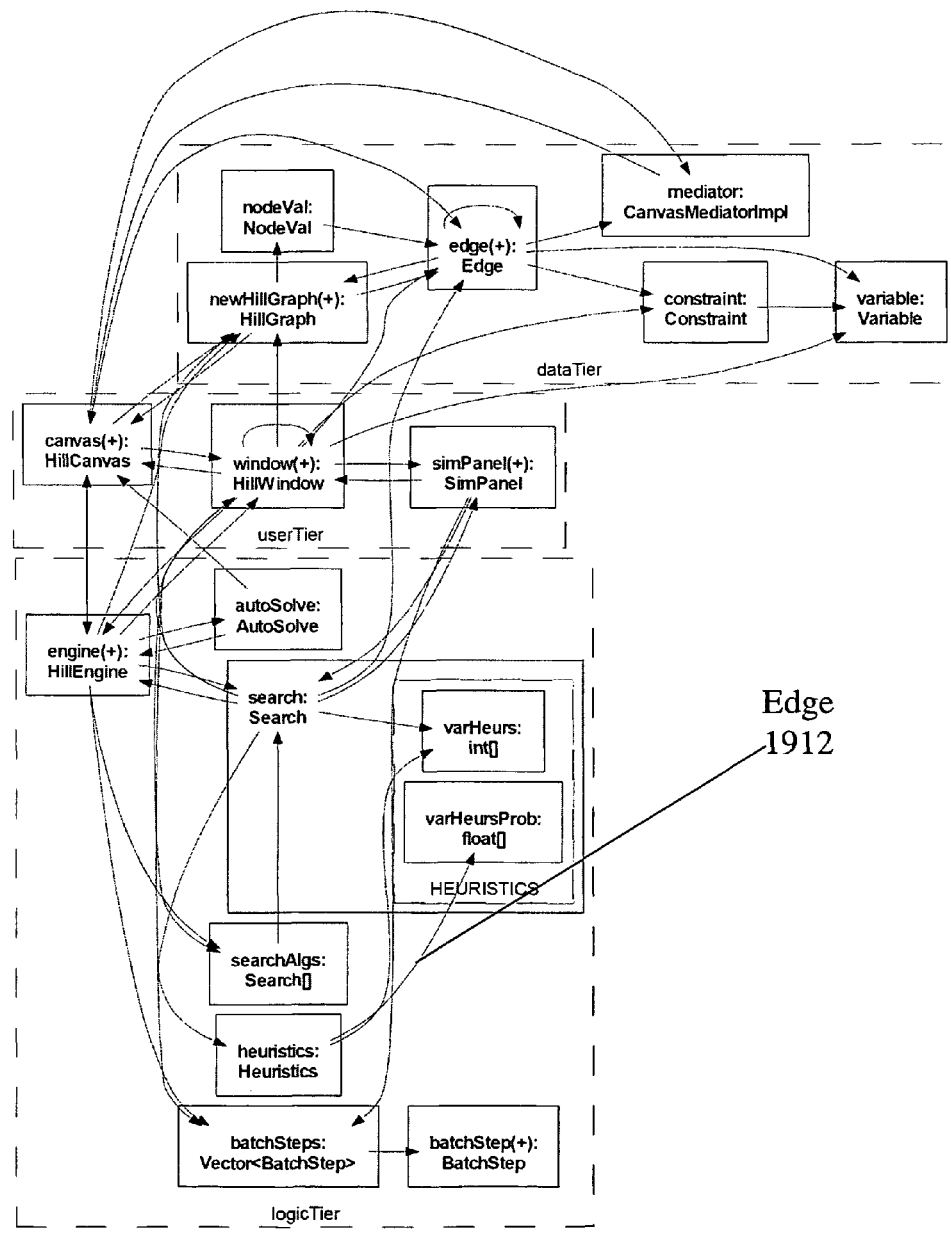
FIG. 19 illustrates the top-level HillClimber OOG.

FIG. 19 illustrates the top-level OOG for the HillClimber subject system. There are three top-level domains, dataTier, userTier and logicTier. The objects in the top-level domains are collapsed, except for object search inside the logicTier domain. Object search has a HEURISTICS public domain with two array objects inside it. Object heuristics which is a peer of object search inside logicTier accesses those array objects directly. Such an edge 1912 would not be possible in a strict owner-as-dominator type system. The tool shows the abstract objects merged into a runtime object (FIG. 16b). We used that information to learn what abstract objects in the program required different annotations. We refined those annotations using the following two strategies.

Strategy #1: Use Encapsulation.

We reduced the clutter in the dataTier by pushing more objects into private domains of other objects. For instance, we placed heap:HillHeap inside a private domain of graph:Hill-Graph. We also pushed several Vectors into private domains and ensured that the other references to them were unique (they were actually passed linearly between objects). In a few cases, we changed the code to prevent representation exposure by returning a copy of an internal list instead of an alias.

Strategy #2: Use Logical Containment.

We defined public domains to reduce the number of top-level objects. A public domain groups related objects, pushes the inner objects it contains down the ownership tree and removes them from the top-level domains, while keeping those inner objects accessible to objects that can access the outer object. Object search has a HEURISTICS public domain with two array objects inside it; its peer object heuristics inside logicTier accesses those array objects directly. Note, such an edge that would not be possible in an owner-as-dominator type system [D. Clarke, J. Potter, and J. Noble. Ownership Types for Flexible Alias Protection. In *OOPSLA*, 1998.].

5.3 Aphyds

Aphyds is an 8,000 line circuit layout application that Aldrich et al. studied previously [J. Aldrich, C. Chambers, and D. Notkin. ArchJava: Connecting Software Architecture to Implementation. In *ICSE*, 2002.]. Aphyds follows the Document-View style where the views are user interface objects, and the model consists of a circuit and computational objects to partition and route the circuit.

Annotations—Round 1.

We initially organized the Aphyds objects into two top-level domains:

UI: containing a CircuitViewer object and several subsidiary user interface objects;

Model: holds a Circuit object and a set of computational objects that act on it, such as Floorplanner and Partitioner.

Evaluation—Round 1.

Figure 20A:
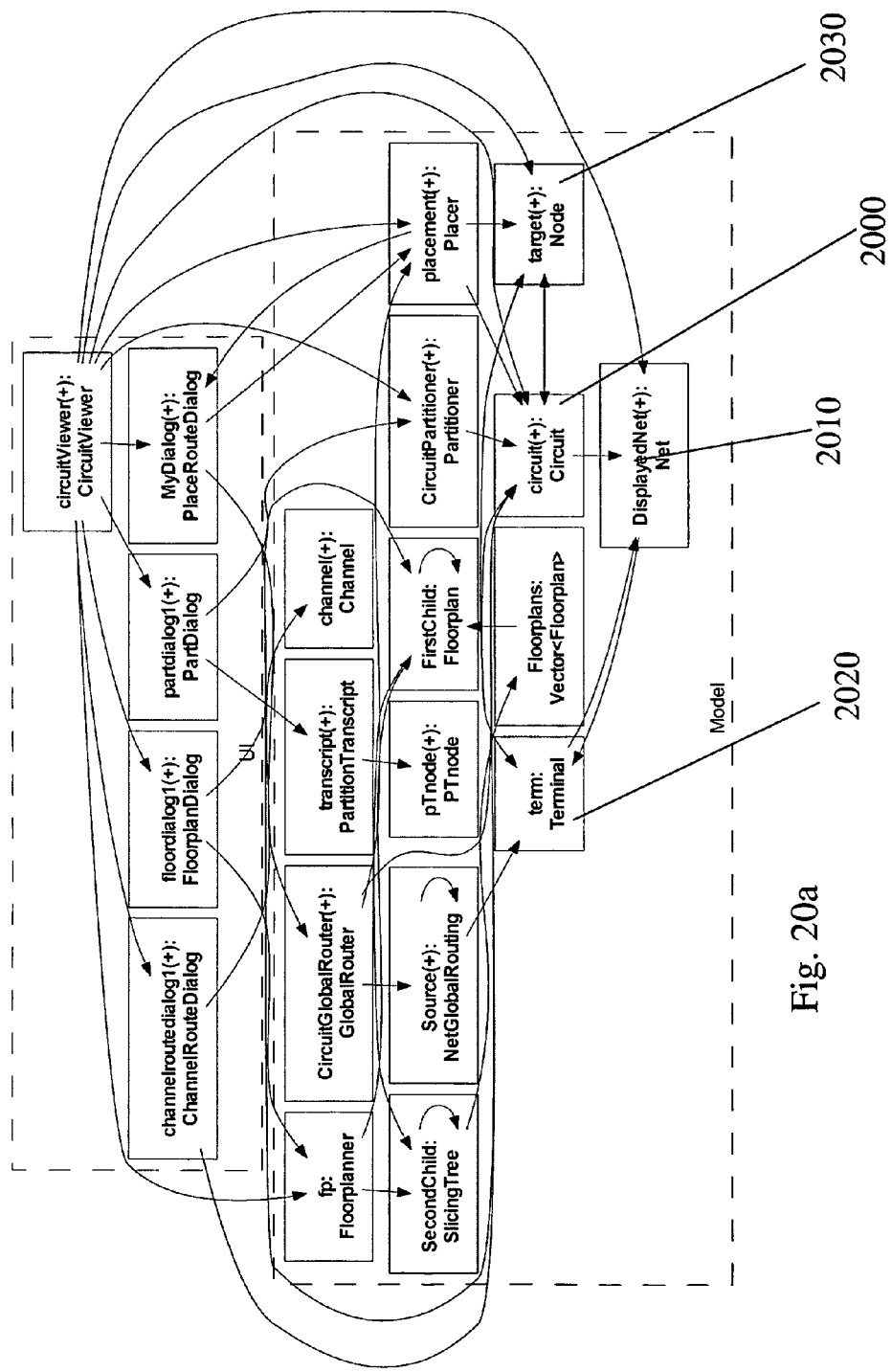
FIG. 20a illustrates the Aphyds OOG obtained without using public domains.

These annotations produced an OOG with too many components in the top-level domains (FIG. 20(a)).

FIG. 20a shows the top-level OOG for the Aphyds subject system. There are two top-level domains, UI and Model. This OOG is not very comparable to the diagram drawn by the original Aphyds developer (FIG. 1). Note, in particular, that objects Circuit 2000, Net 2010, Terminal 2020 and Node 2030 are all at the same level.

Annotations—Round 2.

We examined the OOG and determined which runtime objects needed to be pushed down the hierarchy. Using the tool, we learned what abstract objects declared in the program required different annotations. For instance, we needed to push Net and Node objects underneath Circuit. Using FIG. 1 as a guide, we created public domains as follows:

A. CircuitViewer.DISPLAY: a public domain on the CircuitViewer to hold a Displayer object that all the other UI objects had references to;

B. Circuit.DATABASE: a public domain on the Circuit object, that includes the objects associated with the Circuit, such as Net, Node, and Terminal;

C. Partitioner.DATABASE: a public domain on Partitioner to hold PartitionTranscript and PTnode objects;

D. Floorplanner.DATABASE: a public domain on Floorplanner for the floorplanning objects, such as SlicingTree;

E. GlobalRouter.DATABASE: a public domain on GlobalRouter to hold NetGlobalRouting objects.

Just as with HillClimber, we also reduced the clutter by pushing objects such as Vector<Floorplan> into private domains or by passing them linearly between objects.

Evaluation—Round 2.

Figure 20B:
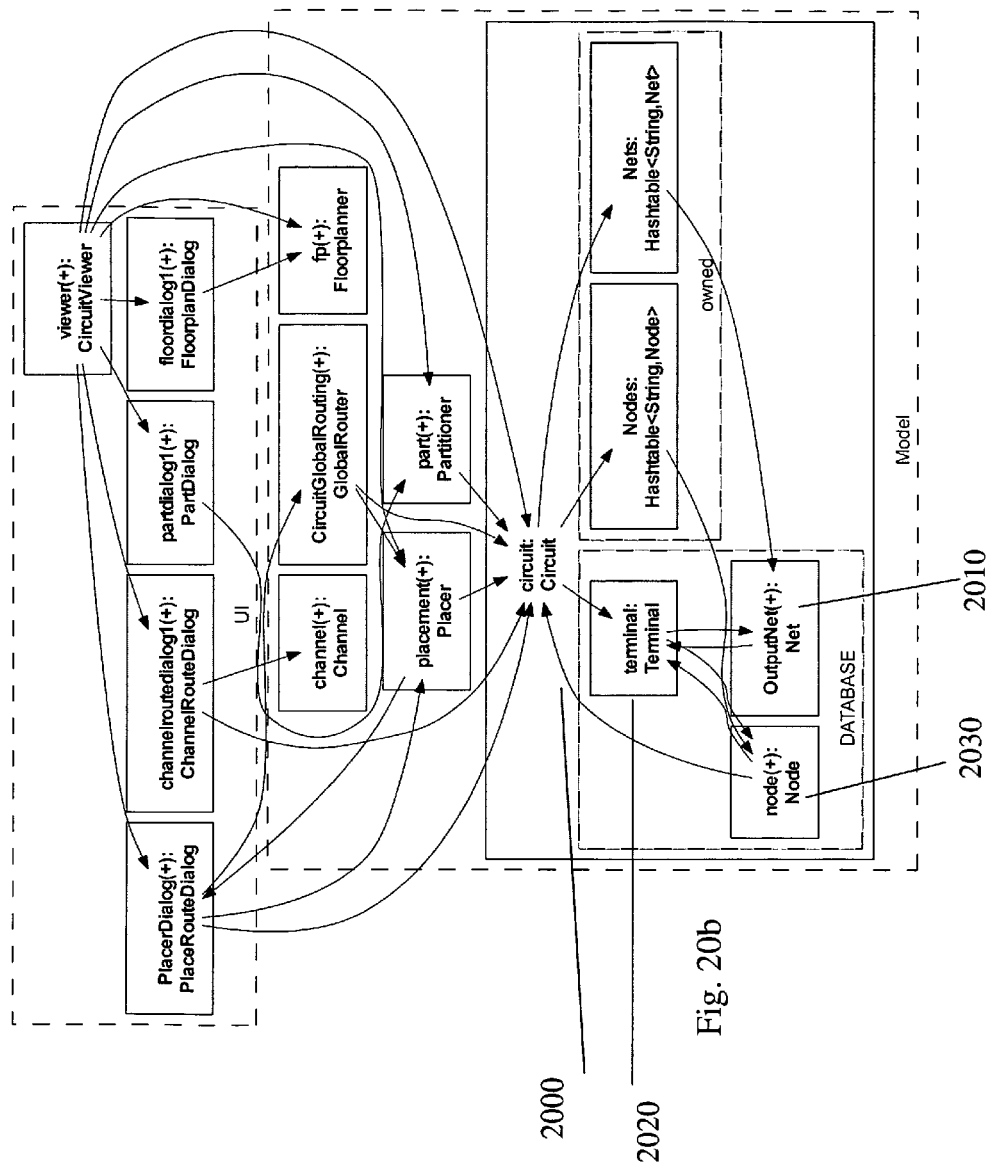
FIG. 20b illustrates the Aphyds OOG obtained using public domains.

The Aphyds OOG with the revised annotations is in FIG. 20(b). FIG. 20b illustrates the top-level OOG for the Aphyds subject system. There are two top-level domains, UI and Model. Many objects that were in the Model domain were moved into public domains of other objects in the Model domain, such as Channel, GlobalRouter, Partitioner and Circuit. Those public domains are elided except for the Circuit object. Inside object Circuit 2000, public domain DATABASE has Node 2030, Net 2010 and Terminal 2020 objects inside it. The owned domain inside Circuit stores Hashtable objects. We also collapsed most substructures except for the Circuit object. Indeed, this OOG is very comparable to the developer diagram of the Aphyds runtime architecture (FIG. 1). For instance, viewer, circuit and fp in the OOG map to circuitViewer, Circuit and FloorPlanner in FIG. 1. Objects Node, Net in the DATABASE public domain map to node and net inside circuit's sub-architecture in FIG. 1.

As to be expected from a manually generated diagram, FIG. 1 omitted several edges between UI and Model objects as well as edges between objects in the Model tier. The OOG has an additional object in UI, Part Dialog, which connects to the Partitioner. Upon a closer examination of the OOG, we noticed a reference from placer in Model to PlacerDialog in UI. This was a potential red flag since Aphyds is a multi-threaded application: a worker thread executing long running operations cannot carelessly call back into the user interface thread. The traceability information in the OOG helped us relate this callback to a field of type PlaceRouteDialog declared in class Placer. We did verify however that the code correctly handled the callback.

Discussion.

When Aldrich et al. re-engineered Aphyds to specify its architecture in ArchJava, they used component classes to create the hierarchy [J. Aldrich, C. Chambers, and D. Notkin. ArchJava: Connecting Software Architecture to Implementation. In *ICSE*, 2002.]. Here, we used public domains to create logical containment. The information we gleaned from the OOG is consistent with what Aldrich et al. found [J. Aldrich, C. Chambers, and D. Notkin. ArchJava: Connecting Software Architecture to Implementation. In *ICSE*, 2002.], but did not require re-engineering the application. There was a mismatch between the edges that the developer diagram intended to show and the ones that the OOG currently shows field references). We plan to add control and data flow edges to the OOG.

6 Discussion

Field Studies.

We have conducted additional evaluation in the form of a field study where we used the present invention to analyze a 30 KLOC module of a commercial proprietary computer software program totaling 250 KLOC.

As expected, the Java program was currently under active development, and already used Java 1.5 generics, so we did not have to refactor the code. Using the present invention, we were able to extract meaningful runtime architectures of the computer program module in under 40 hours. Most of the time was spent adding annotations to the computer program module.

Performance.

The following table measures the execution time of the static analysis on several subject systems. The OOG time includes parsing the program's abstract syntax tree to retrieve the annotations, build the abstract graph, convert it into a runtime graph, and then into a display graph. Note that the IBV time is lower because when using the instantiation-based view, there are fewer abstract objects that the analysis must manipulate.

Table 1: OOG measures the extraction time on an Intel Pentium 4 (3 GHz) with 2 GB of memory. WARN is the remaining annotation warnings. IBV indicates if the instantiation-based view was used. TABS indicates if type abstraction were used.

| System | LOC | OOG | TABS | IBV | WARN |
|---|---|---|---|---|---|
| JHotDraw | 15,000 | 2'18" | No | No | 60 |
| JHotDraw | 15,000 | 0'16" | Yes | Yes | 60 |
| HillClimber | 15,000 | 0'26" | No | No | 42 |
| HillClimber | 15,000 | 0'09" | Yes | Yes | 42 |
| Aphyds | 8,000 | 0'24" | No | No | 72 |

Annotation Overhead.

We currently add the ownership domains annotations manually so we used medium-sized programs for the evaluation. The annotation cost could be reduced by ownership inference [J. Aldrich, V. Kostadinov, and C. Chambers. Alias Annotations for Program Understanding. In *OOPSLA*, 2002.], [K.-K. Ma and J. S. Foster. Inferring Aliasing and Encapsulation Properties for Java. In *OOPSLA*, 2007.] and amortized over other uses of ownership, e.g., for program verification [Y. Lu, J. Potter, and J. Xue. Validity Invariants and Effects. In *ECOOP*, 2007.]. On the other hand, the annotations allow the developers to obtain meaningful architectural abstractions, rather than automatically inferred ones that are likely to be poor matches to the desired software architecture.

For the proposed approach to be adoptable, better ownership inference must be developed. Existing ownership inference tools adopt restrictive notions of ownership, do not map their results to a type system, do not infer ownership parameters [K.-K. Ma and J. S. Foster. Inferring Aliasing and Encapsulation Properties for Java. In *OOPSLA*, 2007.] or infer imprecise ones [J. Aldrich, V. Kostadinov, and C. Chambers. Alias Annotations for Program Understanding. In *OOPSLA*, 2002.].

Annotations vs. Language Extensions.

Adding ownership annotations to an existing program is easier than re-engineering it to ArchJava. Both authors previously re-engineered existing systems to ArchJava. The restrictions that ArchJava imposes on existing programs are fairly onerous. For instance, ArchJava prohibits returning references to instances of component classes when most object-oriented code returns object references liberally. In addition, ArchJava does not allow a component class to have public fields. In contrast, it is possible to annotate such fields with public domains (private domains cannot be used, of course).

For Aphyds, Aldrich et al. converted dynamic connections into static ones and inadvertently injected several defects to produce a system with over 20 components and 80 "ports" in the code [J. Aldrich, C. Chambers, and D. Notkin. ArchJava: Connecting Software Architecture to Implementation. In *ICSE*, 2002.]. Aldrich et al. previously added ownership annotations to a subset of the Aphyds subject system (around 3,500 lines) in "three hours and 40 minutes—less than a quarter of the time that it took the same programmer to express the control-flow architecture of the same part of Aphyds" in ArchJava [J. Aldrich, C. Chambers, and D. Notkin. ArchJava: Connecting Software Architecture to Implementation. In *ICSE*, 2002.]. Similarly, when we re-engineered HillClimber, we initially introduced runtime exceptions due to disconnected ports and changed the application's initialization order [M. Abi-Antoun, J. Aldrich, and W. Coelho. A Case Study in Re-engineering to Enforce Architectural Control Flow and Data Sharing. *JSS*, 80(2), 2007.].

What are "Good" Annotations?

Just as there are multiple architectural views of a system, there is no single right way to annotate a program. Good annotations minimize the number of top-level components in the OOG by pushing more objects underneath other objects. The best annotations produce an OOG that is comparable to what an architect might draw for the as-designed architecture, as long as the program supports them!

The OOG can guide a developer to refine the annotations. For JHotDraw, we initially placed Handle instances in the Controller domain and later moved them to the Model domain since Handle is related to Figure.

How is the Process Iterative?

Obtaining an OOG is a semi-automated iterative process, which involves the following steps:

A. Decide on the right top-level domains;

B. Decide on the right top-level object in the top-level domains. This may involve moving objects between the top-level domains;

C. Achieve an adequate number of objects in each top-level domain:

C(a). Push secondary objects underneath primary objects, using:

C(a)(i). Strict encapsulation (private domains);

C(a)(ii). Logical containment (public domains);

C(b). Pass low-level objects linearly between objects;

C(c). Use type abstraction to merge fewer or more objects in each domain, using:

C(c)(i). Trivial types;

C(c)(ii). Design intent types;

D. Achieve an appropriate level of visual detail:

D(a). Hide or show the substructure of a selected object;

D(b). Change the projection depth;

The tool adds any summary edges corresponding to the elided substructure.

Why was One System Refactored?

Adding the annotations to HillClimber highlighted refactoring opportunities [M. Abi-Antoun and J. Aldrich. Ownership Domains in the Real World. In *IWACO*, 2007.], [M. Abi-Antoun, J. Aldrich, and W. Coelho. A Case Study in Re-engineering to Enforce Architectural Control Flow and Data Sharing *JSS*, 80(2), 2007.]. Without refactoring, the annotations would enforce a degraded architecture. We did not refactor JHotDraw or Aphyds, except to use generic types. These were code bases that were developed prior to Java 1.5. Most Java code is being refactored to use generics using available tool support [R. M. Fuhrer, F. Tip, A. Kiezun, J. Dolby, and M. Keller. Efficiently Refactoring Java Applications to Use Generic Libraries. In *ECOOP*, 2005.]. When adding annotations, one must choose between enforcing a degraded architecture or refactoring to reduce tight coupling, e.g., by programming to an interface, or introducing a mediator object [M. Abi-Antoun and J. Aldrich. Ownership Domains in the Real World. In *IWACO*, 2007.]. E.g., in HillClimber, the mediator object was introduced during a refactoring.

Why Ownership Domains?

The approach was presented in terms of the ownership domains type system, where each object contains one or more public or private domains, and each object is in exactly one domain. In principle, the approach also applies to ownership type systems that assume a single context per object [D. Clarke, J. Potter, and J. Noble. Ownership Types for Flexible Alias Protection. In *OOPSLA*, 1998.]. However, in an owner-as-dominator type system, any access to a child object must go through its owning object [D. Clarke, J. Potter, and J. Noble. Ownership Types for Flexible Alias Protection. In *OOPSLA*, 1998.]. In contrast, the ownership domains type system supports pushing any object underneath any other object in the ownership hierarchy: a child object may or may not be encapsulated by its parent object. A child object can still be referenced from outside its owner if it is part of a public domain of its parent, or if a domain parameter is linked to a private domain [J. Aldrich and C. Chambers. Ownership Domains: Separating Aliasing Policy from Mechanism. In *ECOOP*, 2004.]. This expressiveness makes it possible to avoid an architecture that has too many top-level objects, as in the first Aphyds OOG (FIG. 20(*a*)). If making an object owned by another object restricts access to the owned object, this forces more objects to be peers.

Dynamism.

The OOG is an approximation of the actual runtime architecture, one that is conservative and may include more than actually will be there by virtue of using a sound static analysis. However, the experimental evidence we have gathered on several extended examples, as well as many other smaller examples, indicates that the extracted architectures do not suffer from too much or too little abstraction. In comparison, Rayside et al. reported that a static object graph analysis based on RTA produced unacceptable over-approximations for most non-trivial programs [D. Rayside, L. Mendel, R. Seater, and D. Jackson. An Analysis and Visualization for Revealing Object Sharing. In *Eclipse Technology eXchange (ETX)*, 2005.]. Finally, the approach currently describes a static component-and-connector architecture of a system, but offers no facilities for specifying runtime architectural changes [P. Oreizy, N. Medvidovic, and R. N. Taylor. Architecture-Based Runtime Software Evolution. In *ICSE*, 1998.], as in dynamic architecture description languages. As a result, approach does not address dynamic architectural reconfiguration [J. Magee and J. Kramer. Dynamic Structure in Software Architectures. In *FSE*, 1996.].

Overview of Apparatus and Methods Embodiments

There are many variations and embodiments of the present invention. This section will discuss some, but not all, embodiments and variations of the invention. Several embodiments and variations of the apparatuses of the present invention will be discussed with regard to FIG. 21, and several embodiments and variations of the methods of the present invention will be discussed with regard to FIG. 22.

FIG. 21 illustrates one embodiment of a system 2110 according to the present invention. In that embodiment, the system 2110 includes a processor 2112, memory 2114, an input device 2116, and an output or display device 2118, such as a monitor. The processor 2112 is connected to the memory 2114, the input device 2116, and the output device 2118. The memory 2114 includes computer readable instructions, such as computer hardware, software, firmware, or other forms of computer-readable instructions which, when executed by the processor 2112, cause the processor 2112 to perform certain functions, as described herein.

The processor 2112 performs certain functions, as described herein. The processor 2112 may also receives input from the input device 2116 (such as from a user, from another computer, or from some other source), and provides signals to control the output device 2118.

The memory 2114 can be any for of computer-readable memory, and may store information in magnetic form, optical form, or other forms. The memory includes computer readable instructions which, when executed by the processor 2112, cause the processor 2112 to perform certain functions, as described herein. The memory 2114 may be separate from the processor 2112, or the memory 2114 may be integrated with the processor 2112. The memory 2114 may also include more than one memory device, which may be integrated with the processor 2112, separate from the processor 2112, or both.

The input device 2116 may be a keyboard, a touchscreen, a computer mouse, or other forms of inputting information from a user.

The output device 2118 may be a video display or other forms of outputting information to a user. Many variations are possible with the system 2110 according to the present invention. For example, more than one processor 2112, memory 2114, input device 2116, and output device 2118 may be present in the system 2110. In addition, devices not shown in FIG. 1 may also be included in the system 2110, and devices shown in FIG. 21 may be combined or integrated together into a single device, or some devices may be omitted.

For example, the present invention may be embodied as a computer, a plurality of computers or a computer system, computer-readable instructions, or other variations thereof. In one embodiment the present invention is an apparatus including a processor 2212 and memory 2114. The memory includes computer readable instructions which, when executed by the processor, cause the processor to create an abstract graph from the computer program module and from containment information corresponding to the computer program module, wherein the abstract graph has nodes including types and objects, and wherein the abstract graph relates an object to a type, and wherein for a specific object the abstract graph relates the specific object to a type containing the specific object. The computer readable instructions also cause the processor to create a runtime graph from the abstract graph, wherein the runtime graph is a representation of the true runtime object graph, wherein the runtime graph represents containment information such that, for a specific object, the runtime graph relates the specific object to another object that contains the specific object.

In another embodiment, the present invention is embodied as computer readable instructions which, when executed, cause a processor to perform the steps, or variations of the steps, described above.

Many variations are possible for the computer readable instructions, such as computer readable instructions embodied on optical media, computer readable instructions embodied on magnetic media, and computer readable instructions embodied in solid state memory.

Figure 22:
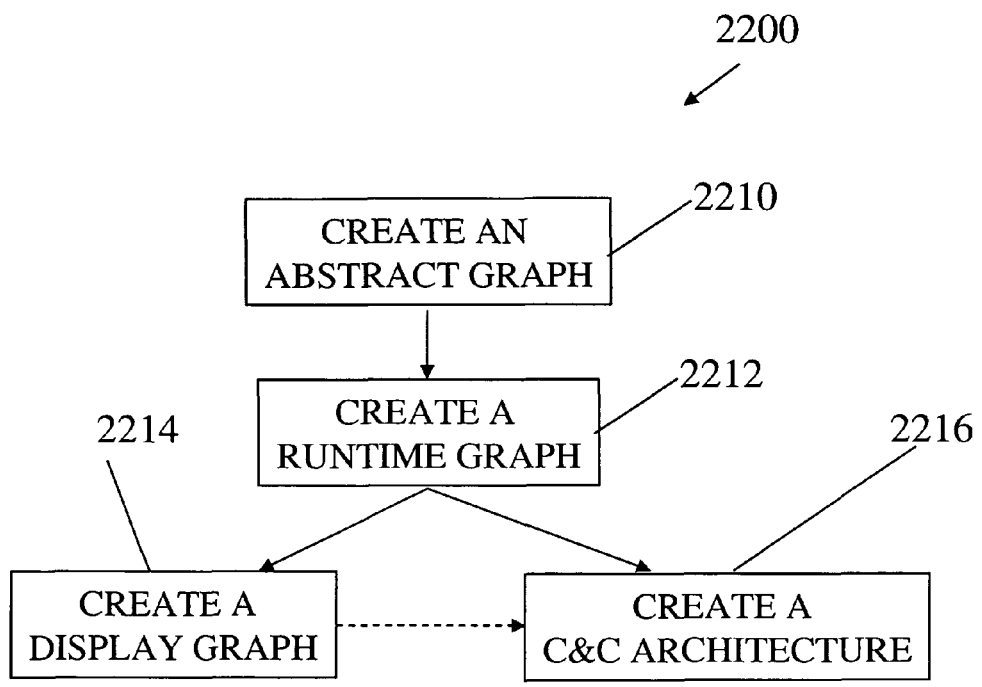
FIG. 22 illustrates one embodiment of a method according to the present invention.

FIG. 22 is a flow chart illustrating one embodiment of the method 2200 according to the present invention. According to that embodiment, the method 2200 includes creating an abstract graph 2210, creating a runtime graph 2212 from the abstract graph, and creating a display graph 2214 from the runtime graph. However, in some embodiments, the present invention may omit the step of creating the display graph 2214, and include only creating the abstract graph 2210 and creating the runtime graph 2212. In addition, the C&C architecture 2216 can be generated from the runtime graph 2212 or from the display graph 2214. Furthermore, the method, and the steps of the method, may include additional steps, limitations, and other modifications beyond those illustrated in FIG. 22.

For example, according to one embodiment, the method 2200 of the present invention produces a representation of a true runtime object graph from a computer program module. The method 2200 includes creating 2210 an abstract graph from the computer program module and from containment information corresponding to the computer program module, wherein the abstract graph has nodes including types and objects, and wherein the abstract graph relates an object to a type, and wherein for a specific object the abstract graph relates the specific object to a type containing the specific object. The method 2200 also includes creating a runtime graph 2212 from the abstract graph 2210, wherein the runtime graph 2212 is a representation of the true runtime object graph, wherein the runtime graph 2212 represents containment information such that, for a specific object, the runtime graph 2212 relates the specific object to another object that contains the specific object.

Many other variation and modifications are possible with the present invention. For example, another embodiment of the present invention includes the further step of creating the display graph 2214 that is a hierarchical representation of the runtime graph 2212.

According to another embodiment of the method 2200, creating the runtime graph 2212 includes creating a component-and-connector architectural view of the runtime graph wherein at least one object is represented as at least one component, and wherein relations between the plurality of objects are represented as at least one connector.

Another embodiment of the method 2200, creating the runtime graph 2212 includes producing at least one containment relationship between a runtime object A and a runtime object B when a type in the abstract graph corresponding to runtime object A contains an object in the abstract graph 2210 corresponding to runtime object B.

In another embodiment of the method 2200, the containment information in the abstract graph 2210 specifies at least one owner-as-dominator relation between two objects in the true runtime object graph.

In another embodiment of the method 2200, the containment information in the abstract graph 2210 specifies at least one logical containment relation between two objects in the true runtime object graph, without prohibiting access to the object that is contained.

In another embodiment of the method, the containment information denotes, for a variable in the computer program, a relationship between the an object referred to by that variable and the object referred to by the "this" variable.

The method 2200 according to the present invention may also include obtaining the containment information at compile-time without executing the computer program module.

In another embodiment of the method 2200, the containment information is not executed when the computer program module runs. For example, one embodiment of the invention include storing the containment information, wherein storing the containment information is selected from a group comprising storing the containment information as annotations inside the computer program module, such that the annotations are not executed when the computer program module runs, and storing the containment information externally to the computer program module.

In another embodiment the method 2200 further includes domains that represent conceptual groups of objects.

In another embodiment, the abstract graph 2210 includes edges between the domains.

In another embodiment, the runtime graph 2212 includes edges that represent relations between objects.

In another embodiment, the runtime graph 2212 further includes domains that represent conceptual groups of objects. In that embodiment, for example, the runtime graph 2212 may further comprises edges between the domains.

In embodiments including the step of creating a display graph 2214, the display graph may be a depth-limited projection of the runtime graph 2212. In other embodiments, the display graph 2214 may not be depth limited. Furthermore, in some embodiments the display graph 2214 may further contain, for two objects A and B that are related in a further unfolding of the runtime graph 2212, an edge between objects A' and B', wherein A' is the object from which A is unfolded and B' is the object from which B is unfolded.

In embodiments creating a component and connector architectural view, the component-and-connector view may further include a nested sub-architecture for a component based on the containment information of the group of objects that correspond to said component. In addition, or alternatively, the component-and-connector view may further include domains of components into runtime tiers based on the domains of objects that correspond to the components.

In another embodiment, creating the runtime graph 2212 includes merging at least two objects from the abstract graph 2210 into a single object in the runtime graph 2212. Furthermore, the merged objects may have the same containing object in the abstract graph 2210. Alternatively, or in addition, the nodes in the runtime graph 2212 may further comprise domains of nodes and the merged objects may be part of the same domain. Also, the type of one of the merged objects may be a subtype of the type of the other merged object. In some embodiments, merging at least two objects from the abstract graph includes merging at least two objects that share at least one least upper bound type. Furthermore, merging at least two objects from the abstract graph may include merging at least two objects that share at least one least upper bound type that is not in a user-specified list of trivial types. In another embodiment, the method 2200 may also include marking the merged object as having an intersection type that includes all of the least upper bound types of said objects. In another embodiment, merging at least two objects from the abstract graph includes merging at least two objects that have at least one type that maps to the same user-specified design intent type.

In another embodiment, the nodes in the abstract graph include domains, and creating an abstract graph includes creating at least one object that is located in a domain that is declared as a formal parameter of a type, and creating the runtime graph includes copying the object declared inside the formal domain in the abstract graph into at least one domain in the runtime graph to which the formal domain of the object is transitively bound.

In another embodiment, the runtime graph 2212 represents objects and relations between objects that exist at runtime.

In another embodiment there exists, for a true runtime object graph of the computer program, a map from a true runtime object to an object in the runtime graph, such that a true runtime object is mapped to exactly one object in the runtime graph.

In another embodiment, there exists, for a true runtime object graph of the computer program, a map from a true runtime relation between objects o1 and object o2 in the true runtime object graph, and there is a relation between the runtime objects corresponding to said objects o1 and o2 in the runtime graph.

Figure 24:
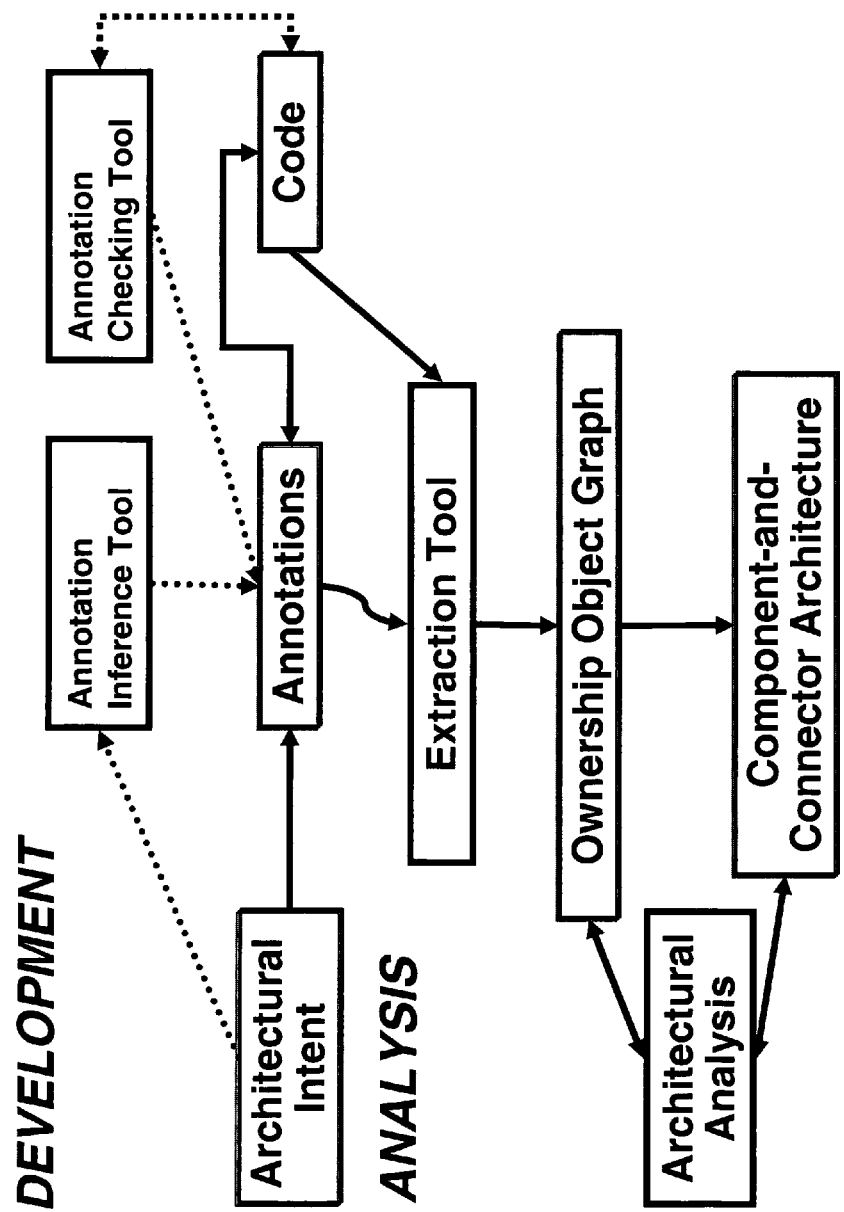
FIG. 24 illustrates one embodiment of a system according to the present invention.

FIG. 24 illustrates another embodiment of a system according to the present invention. Architectural intent is captured using annotations. If the annotations are added manually, a tool checks the annotations and the code for consistency. An inference tool can also help produce the annotations automatically or semi-automatically. An extraction tool uses the code and the annotations to extract an Ownership Object Graph. Another tool generates a Component-and-Connector Architecture from the Ownership Object Graph. Various software assurance techniques can be applied to the Ownership Object Graph or the Component-and-Connector Architecture. For instance, they can be used in architectural reviews. Various architectural-level analyses can analyze runtime quality attributes such as performance, dynamic coupling, security, or reliability. Another analysis can check and measure the structural conformance of the extracted C&C view, which represents the as-built actual architecture, with an as-designed target architecture.

Those and other variations of the methods according to the present invention are possible.

7 Related Work

Architectural Recovery.

There is a large body of research on architectural recovery or architectural extraction. Most approaches use a mix of dynamic and static information such as naming conventions and, directory structures [T. Richner and S. Ducasse. Recovering High-Level Views of Object-Oriented Applications from Static and Dynamic Information. In *ICSM*, 1999.]. The extractors often play detective and use trial and error with clustering algorithms [R. Kazman and S. J. Carriere. Playing Detective: Reconstructing Software Architecture from Available Evidence. *Automated Softw. Eng.*, 6(2), 1999.]. Even so, existing compile-time approaches mostly obtain abstracted module architectures [I. T. Bowman, R. C. Holt, and N. V. Brewster. Linux as a Case Study: its Extracted Software Architecture. In *ICSE*, 1999.], not runtime architectures.

In many of these tools, the abstraction mechanism is hard-coded in the tool and cannot be controlled with user-specified annotations.

Some of these clustering methods are complementary to this method and may help in the process of adding the annotations to a computer program module. For instance, if a clustering method derives how classes in a package interact with other classes in the another package, this may suggest creating two top-level domains corresponding roughly to the two packages. A small cluster that interacts with almost all other packages may indicate a possible library or utility package, and often times, objects in such a package are considered shared.

Mapping Source to High-Level Models.

Murphy el al. produce a mapping of a source to a high-level model using the Reflexion Models (RM) approach [G. C. Murphy, D. Notkin, and K. J. Sullivan. Software Reflexion Models: Bridging the Gap between Design and Implementation. *IEEE TSE*, 27(4), 2001.]. In RM, the developer assigns component families to classes using an external file. Then the tool checks the relationships between these components and reports any differences to the user. There are several important differences with RM.

First, the object-oriented version of the RM method (embodied in the jRMTool) maps classes to components. Such a mapping is not appropriate for an object-oriented runtime architecture and is more suitable for the code architecture. A runtime architecture models runtime entities and their potential interactions. Thus, in an object-oriented system, a component is one or more objects. More specifically, RM cannot map the same code entity to multiple design elements, depending on the context of where they were used. A runtime view of an object-oriented system may distinguish between two instances of the same class in two different contexts. For instance, a dataAccess component may connect to a settingsDB component to read trusted configuration settings, and a dataDB component to access untrusted user data. A security analysis that operates on that runtime view may assign a High trustLevel for settingsDB and a Low trustLevel for dataDB. In contrast, a module view would show one element, assuming that the components are implemented as two instances of the same java.io.File class. RM can only map the java.io.File class to a single node in the high-level model.

Second, RM does not extract a complete abstraction to avoid obtaining a model that developers do not recognize. In our method, the OOG represents a complete model, but developer-specified annotations help obtain meaningful abstractions.

Finally, RM uses non-hierarchical high-level models and maps, whereas our method produces hierarchical representations. A developer writing the map manually must ensure that a type and its subtypes are mapped to the same entity in the high-level model. When mapping field or local variables, the developer must also ensure that all objects that may be aliased are mapped to the same high-level entity. In contrast, in our method, a type system checks that the annotations are consistent, and that the code is consistent with the annotations. And the construction of the runtime graph handles aliasing and inheritance. Producing the mapping file in the RM approach appears more straightforward than adding ownership annotations, but it is not amenable to type inference. The more sophisticated source abstraction method is needed to handle the runtime architectures of object-oriented systems soundly, in the presence of inheritance and aliasing.

Dynamic Analyses.

There are several dynamic analyses for visualizing runtime structures [B. Schmerl, J. Aldrich, D. Garlan, R. Kazman, and H. Yan. Discovering Architectures from Running Systems. *IEEE TSE*, 32(7), 2006.], [C. Flanagan and S. N. Freund. Dynamic Architecture Extraction. In *FLoC FATES-RV*, 2006.]. As mentioned earlier, a static analysis is often preferred to a dynamic analysis. First, runtime heap information does not convey design intent. Second, a dynamic analysis may not be repeatable, i.e., changing the inputs or executing different use cases might produce different results. Compared to dynamic ownership analyses I which are descriptive and show the ownership structure in a single run of a program, the OOG obtained at compile time is prescriptive and shows ownership relations that will be invariant over all program runs. Third, a dynamic analysis cannot be used on an incomplete program still under development or to analyze a framework separately from a specific instantiation. Finally, some dynamic analyses carry a significant runtime overhead—a 10×-50× slowdown in one case [C. Flanagan and S. N. Freund. Dynamic Architecture Extraction. In *FLoC FATES-RV*, 2006.], which must be incurred each time the analysis is run, whereas the main cost of adding annotations is incurred once.

A closely related dynamic analysis, DiscoTect [B. Schmerl, J. Aldrich, D. Garlan, R. Kazman, and H. Yan. Discovering Architectures from Running Systems. *IEEE TSE*, 32(7), 2006.], recovers a non-hierarchical C&C view from a running program, one that shows one component for each instance created at runtime. Such views must be manually post-processed to consolidate multiple components into one. The present invention described an automated analysis that can convert an OOG into a C&C view that is hierarchical and does not require manual post-processing.

Visualization.

Software visualization research shows different aspects of the execution structure of a running program [M. Sefika, A. Sane, and R. Campbell. Architecture Oriented Visualization. In *OOPSLA*, 1996.], [W. De Pauw, E. Jensen, N. Mitchell, G. Sevitsky, J. M. Vlissides, and J. Yang. Visualizing the Execution of Java Programs. In *Software Visualization*, 2002.]. Compared to our approach, dynamic visualization approaches do not require source code annotations and allow more fine-grained user interaction in producing abstractions. But these analyses often work at the granularity of an object or a class and produce task-specific views. The present invention offers advantages such as having developer-specified ownership annotations drive a sound static extraction of a system's runtime architecture.

Dynamic Ownership Analyses.

More closely related are dynamic analyses that infer the runtime ownership structures. These techniques do not require program annotations but assume a strict owner-as-dominator model which cannot represent many design idioms.

Rayside et al. produce matrix displays of the ownership structure [D. Rayside, L. Mendel, and D. Jackson. A Dynamic Analysis for Revealing Object Ownership and Sharing. In *Workshop on Dynamic Analysis (WODA)*, 2006. 31]. Similarly, Mitchell uses lightweight ownership inference to examine a single heap snapshot rather than the entire program execution, and scales the approach to large programs through extensive graph transformation and summarization [N. Mitchell. The Runtime Structure of Object Ownership. In *ECOOP*, 2006.]. Noble, Potter, Potanin et al. showed both matrix and graph views of ownership structures and demonstrated that ownership is effective at organizing runtime object structures F. Hill, J. Noble, and J. Potter. Scalable Visualizations of Object-Oriented Systems with Ownership Trees. *J. Visual Languages and Computing*, 13(3), 2002.1, [A. Potanin, J. Noble, and R. Biddle. Checking Ownership and Confinement. *Concurrency and Computation: Practice and Experience*, 16(7), 2004.]. We use the same key insight but in a static analysis that must address additional challenges.

Object Graph Analyses.

Several static analyses produce non-hierarchical object graphs without using annotations. Pangaea [A. Spiegel. *Automatic Distribution of Object-Oriented Programs*. PhD thesis, FU Berlin, 2002.] produces a flat object graph without an alias analysis and is unsound (the Pangaea output for JHotDraw is even more complex than FIG. 2). WOMBLE [ ] D. Jackson and A. Waingold. Lightweight Extraction of Object Models from Bytecode. *TSE*, 27(2), 2001.] uses syntactic heuristics and abstraction rules for container classes to obtain an object model including multiplicities. The Womble analysis is unsound and aliasing-unaware by design. Ajax [R. W. O'Callahan. Generalized Aliasing as a Basis for Program Analysis Tools. PhD thesis, CMU, 2001.] uses an alias analysis to build a refined object model as a conservative static approximation of the heap graph reachable from a given set of root objects. However, Ajax does not use ownership and produces flat object graphs. Its output was manually post-processed to remove "lumps" with more than seven incoming edges [R. W. O'Callahan. Generalized Aliasing as a Basis for Program Analysis Tools. PhD thesis, CMU, 2001, p. 248]. In our approach, we often suppress shared objects and their associated edges since they often add needless clutter. Even though excluding shared objects makes the resulting diagram unsound, the use of the shared annotation is entirely under the control of the developer adding the annotations. A developer can easily avoid the shared annotation if she is interested in reasoning about all objects in the system: shared is an escape hatch mainly designed to easily interoperate with legacy code or third-party libraries [J. Aldrich, V. Kostadinov, and C. Chambers. Alias Annotations for Program Understanding. In *OOPSLA*, 2002.]. Finally, Ajax's heavyweight but precise alias analysis does not scale to large programs. Flat objects graphs do not provide architectural abstraction and do not scale, because the number of top-level objects in the architecture increases with the program size.

Lam and Rinard [P. Lam and M. Rinard. A Type System and Analysis for the Automatic Extraction and Enforcement of Design Information. In *ECOOP*, 2003.] proposed a type system and a static analysis (which we refer to here as LR) whereby developer-specified annotations guide the static abstraction of an object model by merging objects based on tokens. LR supports two kinds of tokens. The first kind, token parameters, are a loose adaptation of ownership type parameters that predate them [D. Clarke, J. Potter, and J. Noble. Ownership Types for Flexible Alias Protection. In *OOPSLA*, 1998.], and correspond roughly to domain parameters. Compared to Reflexion Models, LR can map a a single code element to multiple design elements. However, token parameters lack semantics. For instance, they do not give any precision about aliasing. The second kind, global static tokens correspond loosely to top-level domains. In LR, each token parameter C<p1> is bound to another B<p2>, and transitively to a global token. In ownership domains, a class C can declare a private or a public domain D. Each instance of C gets a fresh instance of D, so $obj_1.D \neq obj_2.D$ for fresh $obj_1$ and $obj_2$. In addition to binding to another domain parameter B<$d_2$>, a domain parameter C<d> can bind a locally declared domain, e.g., objB:D. These local domains create the OOG hierarchy. As a result, an analysis based on LR can only extract non-hierarchical representations of object models. Recall in our evaluation of Aphyds, we used private domains in Round1—note the (+) sign on most objects for the elided substructure in FIG. 20(*a*). To get the OOG in FIG. 20(*b*), one that is comparable to the as-designed architecture in FIG. 1, we used public domains in Round 2, thus confirming that hierarchy is indispensable. Lam and Rinard do not mention inheritance in their paper and their formal system omits inheritance entirely [P. Lam and M. Rinard. A Type System and Analysis for the Automatic Extraction and Enforcement of Design Information. In *ECOOP*, 2003, FIG. 10]. The description of the present invention discussed the challenges that multiple interface inheritance introduces and how our method addresses them. Lam and Rinard gave no soundness proof of the underlying type system or of the extracted object model. Finally, the LR system was evaluated on one 1.7 KLOC system, whereas we evaluated the OOG extraction on several systems of 8-16 KLOC each. The LR type system is only descriptive, despite the use of the word "enforcement" in the title, and does not enforce a tiered architecture in code like the ownership domains type system [J. Aldrich and C. Chambers. Ownership Domains: Separating Aliasing Policy from Mechanism. In *ECOOP*, 2004.], [M. Abi-Antoun and J. Aldrich. Ownership Domains in the Real World. In *IWACO*, 2007.]. Our approach does not require special annotations just to extract a design [P. Lam and M. Rinard. A Type System and Analysis for the Automatic Extraction and Enforcement of Design Information. In *ECOOP*, 2003.] but leverages well-researched ownership types [D. Clarke, J. Potter, and J. Noble. Ownership Types for Flexible Alias Protection. In *OOPSLA*, 1998.], [J. Aldrich and C. Chambers. Ownership Domains: Separating Aliasing Policy from Mechanism. In *ECOOP*, 2004.] that also have uses in program verification [Y. Lu, J. Potter, and J. Xue. Validity Invariants and Effects. In *ECOOP*, 2007.]. Finally, work on ownership inference could reduce the annotation cost [J. Aldrich, V. Kostadinov, and C. Chambers. Alias Annotations for Program Understanding. In *OOPSLA*, 2002.], [Y. Liu and A. Milanova. Ownership and Immutability Inference for UML-based Object Access Control. In *ICSE*, 2007.], [K.-K. Ma and J. S. Foster. Inferring Aliasing and Encapsulation Properties for Java. In *OOPSLA*, 2007.].

8 Conclusion

We proposed a novel approach to statically extract a sound hierarchical runtime architecture from object-oriented programs, written in existing languages, using existing libraries and general design idioms. The approach relies on ownership domain annotations to specify and enforce in code the architectural intent related to object encapsulation and communication.

We evaluated the approach using several real medium-sized programs. From an annotated program, a tool can quickly extract a runtime architecture that conveys meaningful abstractions and gives various insights by identifying undocumented information or contradicting manual documentation.

Those and other variations and modifications of the present invention are possible and contemplated, and it is intended that the foregoing specification and the following claims cover such modifications and variations.

The invention claimed is:

1. A method for producing a representation of a true runtime object graph from a static computer program module, comprising:

creating an abstract graph from the static computer program module and from containment information corresponding to the static computer program module, wherein the abstract graph has nodes including types, domains and objects wherein the abstract graph relates an object to a type, wherein the abstract graph relates a domain to a type containing the domain, wherein the abstract graph relates an object to a domain containing the object, and wherein creating an abstract graph includes creating at least one object that is located in a domain that is declared as a formal parameter of a type;

creating a runtime graph from the abstract graph, wherein the runtime graph is an approximation of the true runtime object graph, wherein the runtime graph instantiates the objects from the abstract graph and represents containment information such that each runtime object contains runtime domains and each runtime domain contains runtime objects, and wherein creating the runtime graph includes copying the object declared inside the formal domain in the abstract graph into at least one domain in the runtime graph to which the formal domain of the object is transitively bound.

2. The method of claim 1, further comprising creating a display graph that is a hierarchical representation of the runtime graph.

3. The method of claim 1, further comprising creating a component-and-connector architectural view of the runtime graph wherein at least one object is represented as at least one component, and wherein relations between the plurality of objects are represented as at least one connector.

4. The method of claim 1, further comprising producing at least one containment relationship in the runtime graph between a runtime object A and a runtime object B when a type in the abstract graph corresponding to runtime object A contains an object in the abstract graph corresponding to runtime object B.

5. The method of claim 1, wherein the containment information specifies at least one owner-as-dominator relation between two objects in the true runtime object graph.

6. The method of claim 1, wherein the containment information specifies at least one logical containment relation between two objects in the true runtime object graph, without prohibiting access to the object that is contained.

7. The method of claim 1, wherein the containment information denotes, for a variable in the computer program, a relationship between the object referred to by that variable and the object referred to by the "this" variable.

8. The method of claim 1, further comprising, prior to creating the abstract graph, a step selected from a group comprising: storing the containment information as annotations inside the computer program module, such that the annotations are not executed when the computer program module runs; storing the containment information externally to the computer program module; and retrieving the containment information at compile-time from a source external to the computer program module and without executing the computer program module.

9. The method of claim 1, wherein domains represent conceptual groups of objects.

10. The method of claim 9, wherein the abstract graph includes edges between the domains.

11. The method of claim 1, wherein the runtime graph includes edges that represent relations between objects that will exist at runtime.

12. The method of claim 1, wherein the runtime graph further comprises edges between the domains.

13. The method of claim 2, wherein the display graph is a depth-limited projection of the runtime graph.

14. The method of claim 2, wherein the display graph further contains, for two objects A and B that are related in a further unfolding of the runtime graph, an edge between objects A' and B', wherein A' is the object from which A is unfolded and B' is the object from which B is unfolded.

15. The method of claim 3, wherein the component-and-connector view further includes a nested sub-architecture for a component based on the containment information of the group of objects that correspond to said component.

16. The method of claim 3, wherein the component-and-connector view further includes runtime tiers of components based on the domains of objects that correspond to the components.

17. The method of claim 1, wherein creating the runtime graph includes merging at least two objects from the abstract graph into a single object in the runtime graph.

18. The method of claim 17, wherein merging at least two objects is selected from a group comprising: merging at least two objects that have a common containing object in the abstract graph; and merging at least two objects that are part of the same domain; and merging at least two objects where one object has a type that is a subtype of a type of the other merged object.

19. The method of claim 17, wherein merging at least two objects from the abstract graph includes merging at least two objects that share at least one least upper bound type that is not in a list of types selected from a group comprising: empty; having user-specified values; and having default values.

20. The method of claim 17, wherein merging at least two objects from the abstract graph includes merging at least two objects, such that each of the two objects has at least one type, but they both map to the same user-specified design intent type.

21. An apparatus, comprising:
a processor;
memory including computer readable instructions which, when executed by the processor, cause the processor to:
create an abstract graph from the static computer program module and from containment information corresponding to the static computer program module, wherein the abstract graph has nodes including types, domains and objects wherein the abstract graph relates an object to a type, wherein the abstract graph relates a domain to a type containing the domain, wherein the abstract graph relates an object to a domain containing the object, and wherein creating an abstract graph includes creating at least one object that is located in a domain that is declared as a formal parameter of a type;
create a runtime graph from the abstract graph, wherein the runtime graph is an approximation of the true runtime object graph, wherein the runtime graph instantiates the objects from the abstract graph and represents containment information such that each runtime object contains runtime domains and each runtime domain contains runtime objects, and wherein creating the runtime graph includes copying the object declared inside the formal domain in the abstract graph into at least one domain in the runtime graph to which the formal domain of the object is transitively bound.

22. Computer readable instructions, stored on a non-transitory medium, which, when executed, cause a processor to:
create an abstract graph from the static computer program module and from containment information corresponding to the static computer program module, wherein the abstract graph has nodes including types, domains and objects wherein the abstract graph relates an object to a type, wherein the abstract graph relates a domain to a type containing the domain, wherein the abstract graph relates an object to a domain containing the object, and wherein creating an abstract graph includes creating at least one object that is located in a domain that is declared as a formal parameter of a type;
create a runtime graph from the abstract graph, wherein the runtime graph is an approximation of the true runtime object graph, wherein the runtime graph instantiates the objects from the abstract graph and represents containment information such that each runtime object contains runtime domains and each runtime domain contains runtime objects, and wherein creating the runtime graph includes copying the object declared inside the formal domain in the abstract graph into at least one domain in the runtime graph to which the formal domain of the object is transitively bound.

* * * * *